United States Patent
Omasa

(10) Patent No.: US 7,318,885 B2
(45) Date of Patent: Jan. 15, 2008

(54) HYDROGEN-OXYGEN GAS GENERATOR AND HYDROGEN-OXYGEN GAS GENERATING METHOD USING THE GENERATOR

(75) Inventor: Ryushin Omasa, Fujisawa (JP)

(73) Assignee: Japan Techno Co. Ltd., Tokyo (JP)

(*) Notice: Subject to any disclaimer, the term of this patent is extended or adjusted under 35 U.S.C. 154(b) by 620 days.

(21) Appl. No.: 10/497,448

(22) PCT Filed: Sep. 24, 2002

(86) PCT No.: PCT/JP02/09770

§ 371 (c)(1),
(2), (4) Date: Jun. 1, 2004

(87) PCT Pub. No.: WO03/048424

PCT Pub. Date: Jun. 12, 2003

(65) Prior Publication Data
US 2005/0011765 A1 Jan. 20, 2005

(30) Foreign Application Priority Data
Dec. 3, 2001 (JP) ............................. 2001-369297

(51) Int. Cl.
*C25B 9/12* (2006.01)

(52) U.S. Cl. ...................... 204/273; 204/261; 204/278; 204/278.5

(58) Field of Classification Search ................ 204/261, 204/273, 278.5, 278, 672, 673; 205/755, 205/756
See application file for complete search history.

(56) References Cited

U.S. PATENT DOCUMENTS

| | | | |
|---|---|---|---|
| 4,806,224 A | 2/1989 | Bruun et al. | |
| 5,730,856 A | 3/1998 | Omasa | |
| 6,126,794 A * | 10/2000 | Chambers | 204/230.5 |

FOREIGN PATENT DOCUMENTS

| | | |
|---|---|---|
| EP | 1 398 395 A | 3/2004 |
| JP | 6-304461 A | 11/1994 |
| JP | 8-281272 A | 10/1996 |
| JP | 08281272 * | 10/1996 |
| JP | 9-40482 A | 2/1997 |

* cited by examiner

*Primary Examiner*—Bruce F. Bell
(74) *Attorney, Agent, or Firm*—Frommer Lawrence & Haug LLP; Ronald R. Santucci

(57) ABSTRACT

A hydrogen-oxygen gas generator comprises an electrolytic bath (10A), a pair of electrodes composed of an anode member (2x) and cathode member (2y) both disposed in the bath, a power supply (34) for applying voltage between the anode and cathode members, vibratory mixing means (16) for vibratively mixing the electrolyte (14) in the bath, and gas collecting means for collecting the hydrogen-oxygen gas generated by the electrolysis using the electrolyte. The gas collecting means includes a lid member (10B) annexed to the electrolytic bath (10A) and a hydrogen-oxygen gas collecting pipe (10B") connected to the hydrogen-oxygen gas output port (10B'). The vibratory mixing means (16) includes a vibrating motor (16d) vibrating at 10 Hz to 500 Hz and vibrating blades (16f) attached to a vibrating rod (16e) not rotatably but vibrating in the electrolytic bath interlockingly with the vibrating motor. The vibrating blades of the vibratory mixing member (16) are so arranged as to oppose the surfaces of the anode and cathode members (2x, 2y).

54 Claims, 45 Drawing Sheets

HYDROGEN-OXYGEN GAS GENERATOR AND HYDROGEN-OXYGEN GAS GENERATING METHOD USING THE GENERATOR

This application is a 371 of PCT/JP02/09770 filed on Sep. 24, 2002, published on Jun. 12, 2003 under publication number WO 03/048424 A1 which claims priority benefits from Japanese Patent Application Number 2001-369297 filed Dec. 3, 2001.

BACKGROUND OF THE INVENTION

1. Field of the Invention

The present invention relates to an apparatus and method for generating hydrogen-oxygen gas by electrolysis, and relates in particular to an hydrogen-oxygen gas generator and hydrogen-oxygen gas generating method for generating hydrogen gas and oxygen gas with high efficiency and collecting the hydrogen and oxygen gas separately or as a gas mixture to generate a gas with a high flame temperature.

2. Description of the Related Art

Electrolysis or electrolytic technology was pioneered by the scientist Faraday. The electrolysis of water is known to produce hydrogen-oxygen gas in a ratio of two parts hydrogen to one part oxygen. Research on hydrogen-oxygen gas has continued up to the present time. One example of a practical technology is a gas generating apparatus developed by Dr. Yull Brown of Brown Energy System Technology PTY. LTD. of Australia. A patent document relating to this technology is disclosed in Japanese Utility Model Registration 3037633.

In this technology, the structure of the electrolytic cell for generating the hydrogen-oxygen gas is comprised of multiple electrode plates formed with mutually perpendicular electrolytic fluid flow holes and gas flow holes at the top and bottom in the center, and formed with bolt holes on four sides; multiple alternately coupled spacers formed with bolt housing holes protruding outwards between the electrode plates, and O-rings inserted on the spacer inner circumferential surface for sealing the filled electrolytic fluid; and electrolytic cell cover plates holding electrical current conducting bolts and gas coupling nipples and electrolytic fluid coupling nipples are mounted on both sides of the electrode plates, and an electrode plate tightened by nuts to a stay bolt enclosed by bolt holes of the electrolytic cell cover plates and spacer bolt housing holes, electrode plate bolt holes, with the spacer and electrolytic cell cover plates mutually joined together. However, no method up until now has succeeded in generating a gas mixture of hydrogen gas and oxygen gas for industrial use.

A patent document relating to a gas generator device was disclosed in Japanese patent No. 3130014.

However, in this method of the related art, the shortest possible distance between the adjacent electrode plates within this kind of electrolytic cell was a gap of 50 millimeters just sufficient to prevent electrical shorts. An even shorter distance between electrode plates tended to cause accidents due to excessive current flow. The efficiency of the apparatus and method of the related art was therefore limited when producing hydrogen-oxygen gas by increasing the electrical current density. The related art therefore had the problem that it could not generate gas with high efficiency. The related art also could not provide an adequate mixture of hydrogen and oxygen, creating the danger of the gas igniting and was not therefore suited for producing gas in large quantities.

On the other hand, since the size of each electrolytic cell was limited, the amount of hydrogen-oxygen gas produced by one hydrogen-oxygen gas generator was also limited. To meet practical needs, preferably a device with as small a size as possible, preferably produces as much hydrogen-oxygen gas as possible per unit of time. However, the apparatus of the related art could not satisfy the dual needs of both a compact size and generation of larger amounts of hydrogen-oxygen gas.

In the method for electrolyzing water disclosed in international patent W095/06144 on the other hand, an electrode inserted in the water is vibrated at a characteristic oscillation to resonate with any or any one of the oxygen molecules, hydrogen molecules or water molecules. More specifically, the electrode is vibrated at 6,000 to 120,000 times per minute (100 to 200 times per second). In an alternative method for electrolyzing water, the electrode may be vibrated at a harmonic or multiple of the characteristic frequency, and the magnetic pole magnetized in a magnetic field.

Whereupon, the present invention provides a device and method for generating hydrogen gas and oxygen gas with high efficiency and collecting the hydrogen and oxygen gas separately or as a gas mixture to generate a gas with a high flame temperature by improving the electrolysis conditions to increase the amount of hydrogen gas or oxygen gas generated per electrode surface area per unit of time, and with a more compact device produce higher quantities of hydrogen-oxygen gas per device (in other words, per unit of surface area of the electrolyte cell), and collect these gases separately or as a gas mixture, to allow generating a mixture of hydrogen gas and oxygen gas with a high flame temperature when combustion is safe, and generate hydrogen gas and oxygen gas separately with high efficiency by using film separation.

SUMMARY OF THE INVENTION

To achieve the objects of the invention, the present invention provides a hydrogen-oxygen gas generator comprising an electrolytic cell (A);

an electrolysis means (B) containing an electrode pair made up of an anode member and a cathode member installed to contact the electrolytic fluid stored within the electrolytic cell and, a power supply to apply a voltage across the anode and the cathode;

a vibration-stirring means (C) for stirring and agitating the electrolytic fluid stored in the electrolytic cell and comprising at least one vibration generating means and, a vibration member made up of at least one vibrating rod linked to the vibrating generating means and at least one vibrating blade attached to a vibrating rod for vibrating within the electrolytic cell, or an insulated vibration stirring means (C') for stirring and agitating the electrolytic fluid stored in the electrolytic cell and comprising at least one vibration generating means, and at least one vibrating blade attached to a vibrating rod for vibrating within the electrolytic cell, and at least one vibrating blade attached to a vibrating rod, and an insulated vibration stirring member made from an electrically insulated area formed on a connecting section lining the vibration generating means with the vibrating rod, or formed on a section nearer to the connecting section than the section where the vibrating blade of the vibrating rod is installed; and a gas trapping means (D) for collecting separately or as a mixture, the hydrogen gas and oxygen gas generated by electrolysis of the electrolytic fluid stored within the electrolyte cell by the electrolysis means; wherein the vibration stirring member of the vibration-stirring means (C) or the insulated vibration stirring member of the insulated vibration-stirring means (C') are installed so at least one surface of the anode member and cathode member of the electrolysis means (B) are facing each other.

In one aspect of the present invention, the gap between at least one of the cathode member or anode member of the electrolysis means (B) and the vibration stirring member of the vibration-stirring means (C), or the insulated vibration stirring member of the insulated vibration-stirring means (C) is 20 to 400 millimeters. In an aspect of the present invention, the insulated vibration stirring member of the insulated vibration-stirring means (C') installed to face the surface of the anode member, is connected to the positive electrode of the power supply of electrolysis means (B). In an aspect of the present invention, the insulated vibration stirring member of the insulated vibration-stirring means (C') installed to face the surface of the cathode member, is connected to the negative electrode of the power supply of electrolysis means (B).

In an aspect of the present invention, an electrically conductive line is connected on the side of the electrical insulated area where the vibrating blades are installed on the vibrating rod of the insulated vibration stirring member of the insulated vibration-stirring means (C'), and this electrically conductive line is connected to the power supply of electrolysis means (B). In an aspect of the present invention, an anode member or a cathode member electrically connected to an electrical line by way of the vibrating rod is installed on the side of the electrically insulated area where the vibrating blades are installed on the vibrating rod of the insulated vibration stirring member of the insulated vibration-stirring means (C'). In an aspect of the present invention, at least one of the vibrating blades functions as an anode member or as a cathode member. In an aspect of the present invention, electrode support blades electrically connected to the electrical line by way of the vibrating rod are installed on the electrical insulation area side on the vibrating rod of the insulated vibration stirring member of the insulated vibration-stirring means (C'). In an aspect of the present invention, the electrode support blades are installed on the vibrating rod so that the electrode support blade positions alternate with the vibrating blade positions. In an aspect of the present invention, the surface area of the electrode support blades is larger than the surface area of the vibrating blades, and the tips of the electrode support blades protrude farther than the tips of the vibrating blades.

In an aspect of the present invention, the power supply for the electrolysis means (B) is a direct current pulse power supply. In an aspect of the present invention, at least one of either the anode member or cathode member of the electrolysis means (B) is porous (multi-hole). In an aspect of the present invention, the vibration generating means of vibration stirring means (C) or the vibration generating means of the insulated vibration-stirring means (C') contains a vibration motor, and the vibration stirring means (C) or the insulated vibration-stirring means (C') contains an inverter to regulate the motor to rotate at a frequency of 10 to 500 Hz.

In an aspect of the present invention, the gas trapping means (D) is comprised of a lid member installed on the electrolytic cell, and a hydrogen-oxygen gas extraction tube connecting to the hydrogen-oxygen gas extraction outlet formed on that lid member. In an aspect of the present invention, the vibrating rod extends through the lid member, and a sealing means between the lid member and the vibrating rod allows vibration of the vibrating rod and also prevents the passage of hydrogen-oxygen gas.

To achieve the objects of the invention the present invention provides a hydrogen-oxygen gas generator comprising:

an electrolytic cell (A);

an electrolysis means (B) formed from a pair of electrodes made up of an anode member and a cathode member mutually installed in contact with the electrolytic fluid stored in the electrolytic cell, and a power supply for applying a voltage across the anode member and the cathode member;

an insulated vibration-stirring means (C') for vibration stirring of the electrolytic fluid stored in the electrolytic cell and containing at least one vibration generating means and, formed from at least one vibrating rod for vibrating in the electrolytic cell while linked to the vibration generating means, and at least one vibrating blade installed on that vibrating rod, and an insulated vibration stirring member comprised of an electrically insulated area installed on a link section linking the vibrating rod with the vibrating generating means, or on a section nearer the link section than the section where the vibrating blade is installed on the vibrating rod; and a gas trapping means (D) for collecting separately or as a mixture the hydrogen gas and the oxygen gas generated by electrolyzing the electrolytic fluid stored within the electrolytic cell; wherein, the insulated vibration member of the insulated vibration-stirring means (C') contains at least one first insulated vibration stirring member and at least one second insulated vibration stirring member, and at least a portion of the side of the section where the vibrating blade is installed on the electrically insulated area of the first vibration stirring member functions as an anode for the electrolysis means (B), and at least a portion of the side of the section where the vibrating blade is installed on the electrically insulated area of the second vibration stirring member functions as a cathode for the electrolysis means (B).

In another aspect of the present invention, the gap between the anode member and the cathode member is 5 to 400 millimeters. In another aspect of the present invention, an electrical line is connected to the side of the electrical insulation area on the section where the vibrating blades are installed on the vibrating rod of the insulated vibration stirring member of insulated vibration-stirring means (C'), and the electrical line is connected to the power supply of the electrolysis means (B). In another aspect of the present invention, the anode member and/or the cathode member electrically connected by an electrical line via the vibrating rod, is installed on the side of the electrical insulation area on the section where the vibrating blades are installed on the vibrating rod of the insulated vibration stirring member of the insulated vibration-stirring means (C').

In another aspect of the present invention, at least one among the vibrating blades functions as the anode member or as the cathode member. In another aspect of the present invention, electrode support blades electrically connected to the electrical line by way of the vibrating rod are installed on the electrical insulation area side on the vibrating rod of the insulated vibration stirring member of the insulated vibration-stirring means (C'). In another aspect of the present invention, the electrode support blades are installed on the vibrating rod so that the electrode support blade positions alternate with the vibrating blade positions. In another aspect of the present invention, the surface area of the electrode support blades is larger than the surface area of the vibrating blades, and the tips of the electrode support blades protrude farther than the tips of the vibrating blades.

In another aspect of the present invention, the power source for the electrolysis means (B) is a direct current pulse power supply. In another aspect of the present invention, at least one of either the anode member or cathode member of the electrolysis means (B) is porous (multi-hole). In another aspect of the present invention, the vibration generating means of the insulated vibration-stirring means (C') contains a vibration motor, and the insulated vibration-stirring means (C') contains an inverter to regulate the motor to rotate at a frequency of 10 to 500 Hz.

In another aspect of the present invention, the gas trapping means (D) is comprised of a lid member installed on the electrolytic cell, and a hydrogen-oxygen gas extraction tube connecting to the hydrogen-oxygen gas extraction outlet formed on that lid member. In an aspect of the present invention, the vibrating rod extends through the lid member, and a sealing means between the lid member and the vibrating rod allows vibration of the vibrating rod and also prevents the passage of hydrogen-oxygen gas.

To further achieve the above objects, the present invention provides a hydrogen-oxygen gas generator comprising:

an electrolytic cell (A);

an electrolysis means (B) formed from a pair of electrodes made up of an anode member and a cathode member mutually installed in contact with the electrolytic fluid stored in the electrolytic cell, and a power supply for applying a voltage across the anode member and the cathode member;

an insulated vibration-stirring means (C') for vibration stirring of the electrolytic fluid stored in the electrolytic cell and containing at least one vibration generating means and, formed from at least one vibrating rod for vibrating in the electrolytic cell while linked to the vibration generating means, and at least one vibrating blade installed on that vibrating rod, and an insulated vibration stirring member comprised of an electrically insulated area installed on a link section linking the vibrating rod with the vibrating generating means, or on a section nearer the link section than the section where the vibrating blade is installed on the vibrating rod; and a gas trapping means (D) for collecting separately or as a mixture the hydrogen gas and the oxygen gas generated by electrolyzing the electrolytic fluid stored within the electrolytic cell; wherein, an electrical line is connected to the side of the section where the vibrating blades are installed on the electrical insulation area of the vibrating rod of insulated vibration-stirring means (C'), the vibrating blades are formed on multiple vibrating rods, the cathode member and the anode member of the electrolysis means (B) are respectively connected to the multiple vibrating rods, the anode member is electrically connected to the power supply by way of at least one among the multiple vibrating rods and an electrical line connected to the vibrating rod, and the cathode member is electrically connected to the power supply by way of at least one among the multiple vibrating rods and an electrical line connected to the vibrating rod.

In another aspect of the present invention, the vibrating blade electrically connected to the power supply by way of the electrical line and the vibrating rod function as the cathode member or as the anode member. In another aspect of the present invention, electrode support blades are installed on the vibrating rods on the side of the electrical insulation area where the vibrating blades are installed, and are electrically connected to the power supply by way of an electrical line and the vibrating rod, and the electrode support blades function as the cathode member or as the anode member.

In another aspect of the present invention, the vibrating blade electrically connected to the power supply by way at least one among the multiple vibrating rods and the electrical line connected to the vibrating rod functions as the anode member, and/or the vibrating blade electrically connected to the power supply by way of at least another one among the multiple vibrating rods and the electrical line connected to that vibrating rod functions as the cathode member.

In another aspect of the present invention, the electrode support blades are installed on the multiple vibrating rods on the side of the electrical insulation area where the vibrating blades are installed, and the electrode support blade connected electrically to the power supply by way of at least another one among the multiple vibrating rods and the electrical line connected to that vibrating rod functions as the anode member, and/or the electrode support blade electrically connected to the power supply by way of at least another one among the multiple vibrating rods and the electrical line connected to that vibrating rod functions as the cathode member.

In another aspect of the present invention, the gap between the anode member and the cathode member is 5 to 400 millimeters. In another aspect of the present invention, the electrode support blades are installed on the vibrating rod so that the electrode support blade positions alternate with the vibrating blade positions. In another aspect of the present invention, the surface area of the electrode support blades is larger than the surface area of the vibrating blades, and the tips of the electrode support blades protrude farther than the tips of the vibrating blades.

In another aspect of the present invention, the power source for the electrolysis means (B) is a direct current pulse power supply. In another aspect of the present invention, at least one of either the anode member or cathode member of the electrolysis means (B) is porous (multi-hole). In another aspect of the present invention, the vibration generating means of the insulated vibration-stirring means (C') contains a vibration motor, and the insulated vibration-stirring means (C') contains an inverter to regulate the motor to rotate at a frequency of 10 to 500 Hz.

In another aspect of the present invention, the gas trapping means (D) is comprised of a lid member installed on the electrolytic cell, and a hydrogen-oxygen gas extraction tube connecting to the hydrogen-oxygen gas extraction outlet formed on that lid member. In an aspect of the present invention, the vibrating rod extends through the lid member, and a sealing means between the lid member and the vibrating rod allows vibration of the vibrating rod and also prevents the passage of hydrogen-oxygen gas.

To still further achieve the above objects, the present invention provides a hydrogen-oxygen gas generating method wherein said method utilizes a hydrogen-oxygen gas generator as described above, and utilizes electrolytic fluid consisting of 5 to 30 percent weight by volume of electrolytic material at pH7 through 10, at 20 to 100 degrees centigrade to perform electrolysis of the electrolytic fluid to reach an electrical current density of 7 $A/dM^2$ to 40 $A/dm^2$.

In another aspect of the invention, the electrolytic material is a water-soluble alkali metal hydroxide or an alkali rare-earth metal hydroxide. In another aspect of the present invention, that power supply is a direct current pulse power supply. In an aspect of the present invention, the vibrating blades have a vibration width of 0.1 to 30 millimeters and further are made to vibrate at a frequency of 200 to 12,000 times per minute.

In the present invention, the hydrogen-oxygen gas is a mixture of hydrogen gas and oxygen gas, or is hydrogen gas and oxygen gas separated and in separate forms.

In the present invention, the vibrating blades of the vibration-stirring means cause a powerful vibrating flow movement in the electrolytic fluid so that the electrolytic fluid can make contact with the electrodes with ample, satisfactory uniformity and also with an adequate supply quantity. Therefore even if the gap between the anode and the cathode is drastically reduced to a distance even smaller than in the related art, ions can still be supplied in an adequate quantity required for electrolysis, and the electrolytic heat generated in the electrodes can be quickly dissipated. Electrolysis can therefore be performed at a high electrical current density so that hydrogen-oxygen gas can be collected with high efficiency. Also, by reducing the distance between the cathode and anode as described above, the effective surface area of the electrodes can be sufficiently increased per volumetric unit so that ample quantities of hydrogen-oxygen gas can be generated even if the electrolytic cells are made more compact.

In particular, when performing electrolysis by vibrating and agitating the electrolytic fluid using the vibration-stirring means, the hydrogen and oxygen generated in the vicinity of the electrodes is carried to the electrolytic fluid surface and transitions to a gaseous state before forming gas bubbles. Therefore, there is no problem with the hydrogen and oxygen generated in the electrolytic fluid adhering to the surface of the electrodes and increasing the electrical resistance. Consequently, electrolysis with a high electrical current density as described above can easily be achieved.

DETAILED DESCRIPTION OF THE PREFERRED EMBODIMENTS

Figure 1:
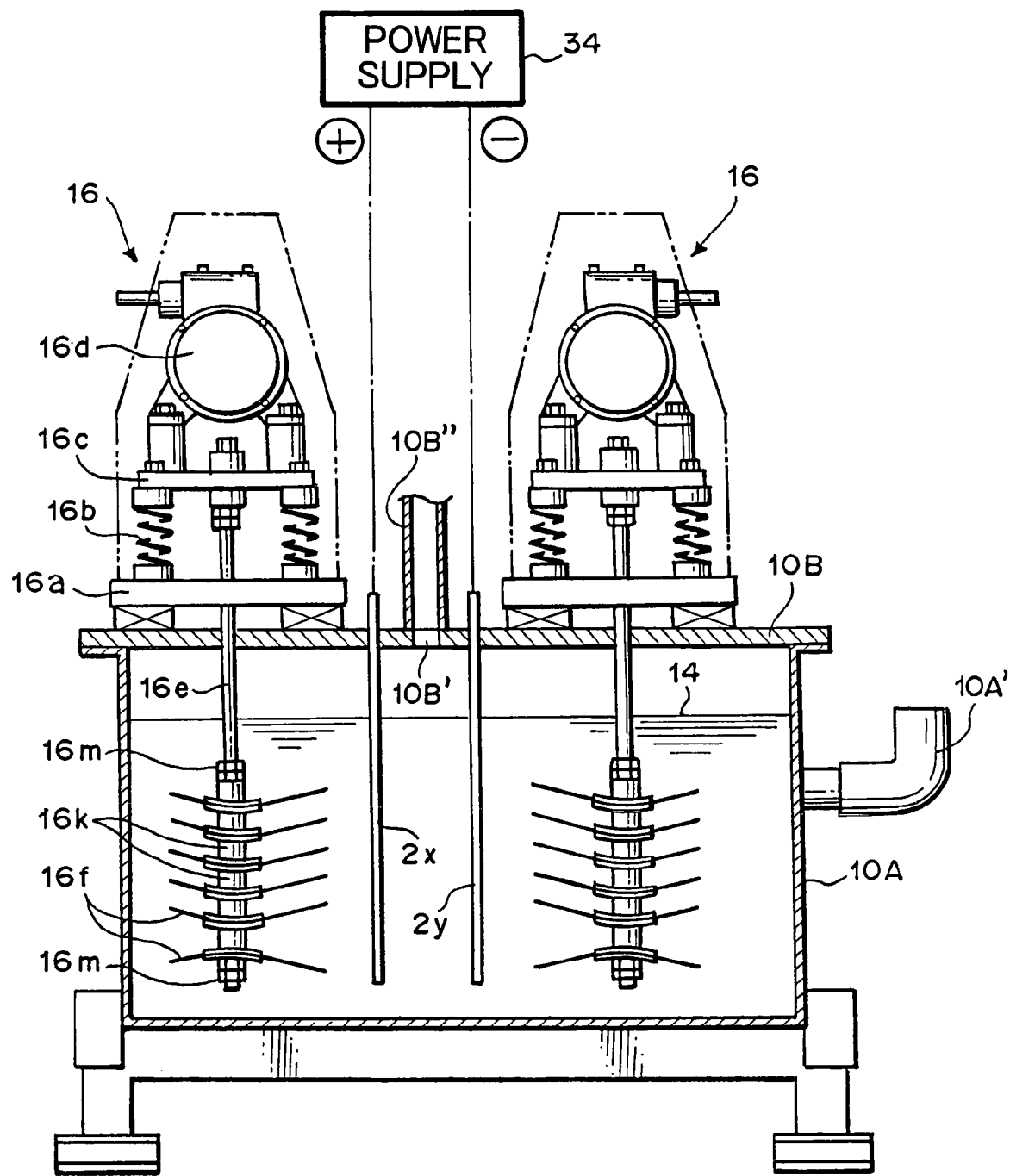
FIG. 1 is a cross sectional drawing showing the hydrogen-oxygen gas generator of the present invention.

The preferred embodiments of the present invention are described next while referring to the drawings. In the drawings, members or sections having identical functions are assigned the same reference numerals.

Figure 2:
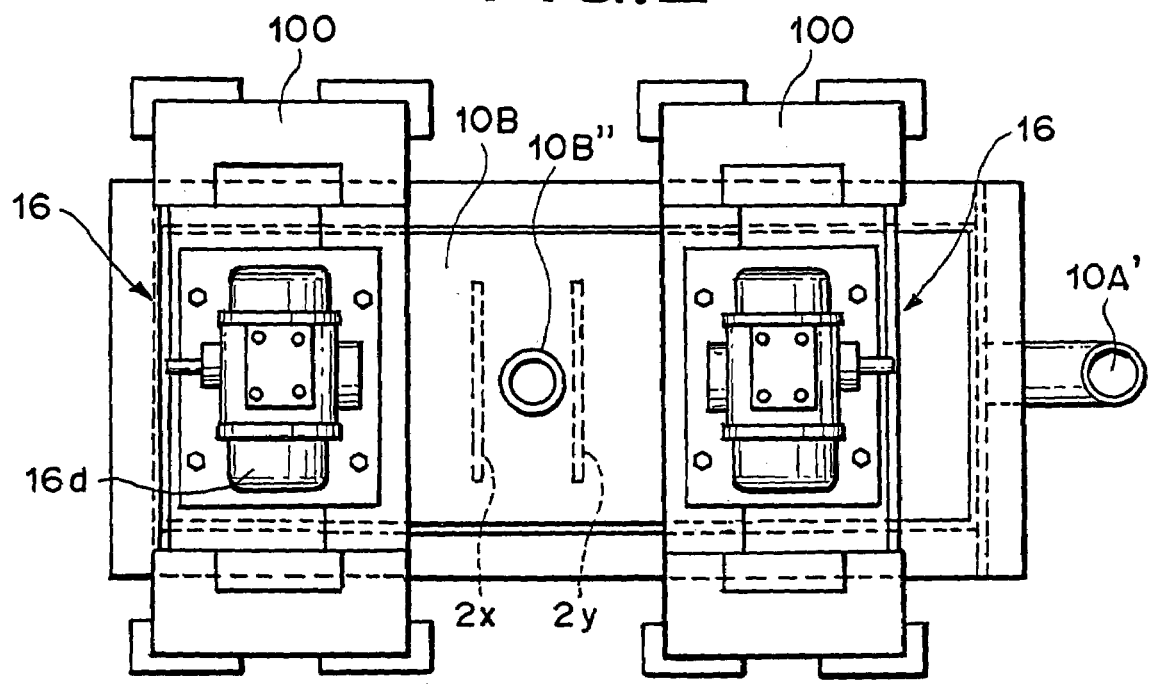
FIG. 2 is a flat view of the apparatus of FIG. 1.
Figure 3:
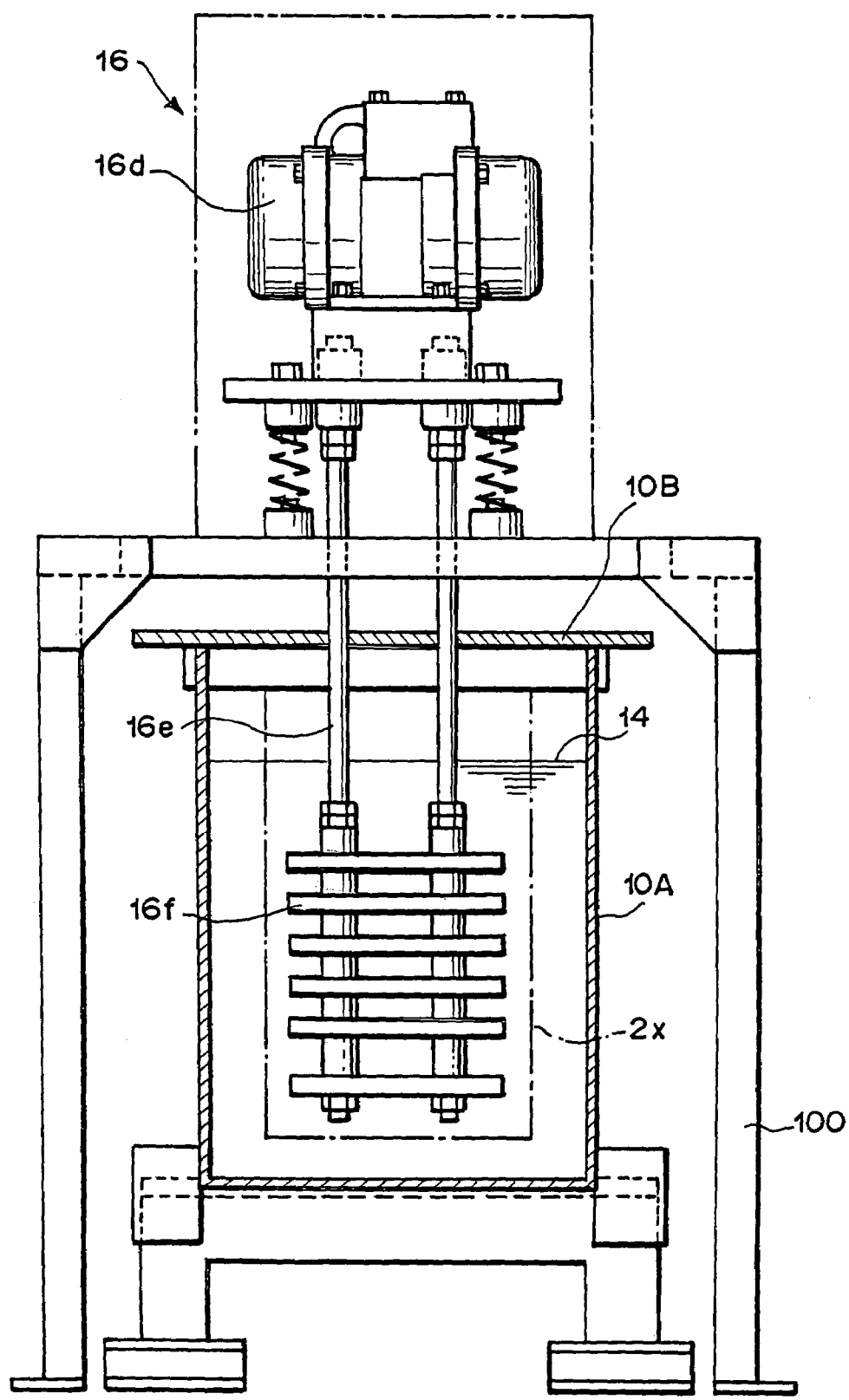
FIG. 3 is a side view of the apparatus of FIG. 1.

FIG. 1 through FIG. 3 are drawings showing the structure of the embodiment of the hydrogen-oxygen gas generator for implementing the hydrogen-oxygen gas generating method of the present invention. Of these figures, FIG. 1 is a cross sectional view, FIG. 2 is a flat view, and FIG. 3 is a cross sectional view.

In these figures, reference numeral 10A denotes the electrolytic cell. The electrolytic cell contains electrolytic fluid 14. Reference numeral 16 is the vibration-stirring means. The vibration-stirring means 16 is comprised of a base 16a installed via anti-vibration rubber onto a support bed 100 separate from the electrolytic cell 10a, a coil spring 16b as a vibration absorbing material installed with the bottom edge clamped to the base (16a), a vibration member 16c clamped to the top edge of that coil spring, vibration motor 16d installed on that vibration member, a vibrating rod (vibration transmission rod) 16e installed on the top edge of the vibration member 16c, and a vibrating blade 16f incapable of rotation, and installed at multiple levels at a position immersed in the electrolytic fluid 14 at the lower half of the vibrating rod 16. A vibration generating means contains a vibration motor 16d and a vibration member 16c. That vibration generating means is linked to the vibrating rod 16e. The vibration stirring means is comprised of a vibrating stirring member and a vibrating generating member, and the vibrating stirring member is comprised of a vibrating rod 16e and a vibrating blade 16f. A rod-shaped guide member is clamped to the installation bed 40 is installed (positioned) within the coil spring 16b as shown among other item in FIG. 11 described later on. Besides the general-purpose mechanical vibrating motor used as the vibration generating source, a magnetic vibrating motor or an air-vibrating motor may be utilized as the vibration stirring means.

The vibration motor 16d may vibrate (oscillate) for example at 10 to 500 hertz, or preferably 10 to 120 hertz, or even more preferably 20 to 60 hertz under control of an inverter. The vibration generated by the vibration motors 16d is transmitted to the vibrating blade 16f by way of the vibrating member 16c and the vibrating rod 16e. The tips of the vibrating blades 16f vibrate at the required frequency inside the electrolytic fluid 14. The vibrating blades 16f generate a "rippling" oscillation to the tips, from the section where installed on the vibrating rod 16e. The amplitude and frequency of this vibration differs from that of the vibration motor 16d. However the amplitude and speed (frequency) are determined by the dynamic characteristics of the vibration transmission path and the characteristics of the interaction with the electrolytic fluid 14. In the present invention, the amplitude/width is 0.1 to 30 millimeters and the speed/frequency is 200 to 12000 time per minute, and preferably is 200 to 5000 times per minute, and most preferably is 500 to 3000 times per minute.

Figure 6:
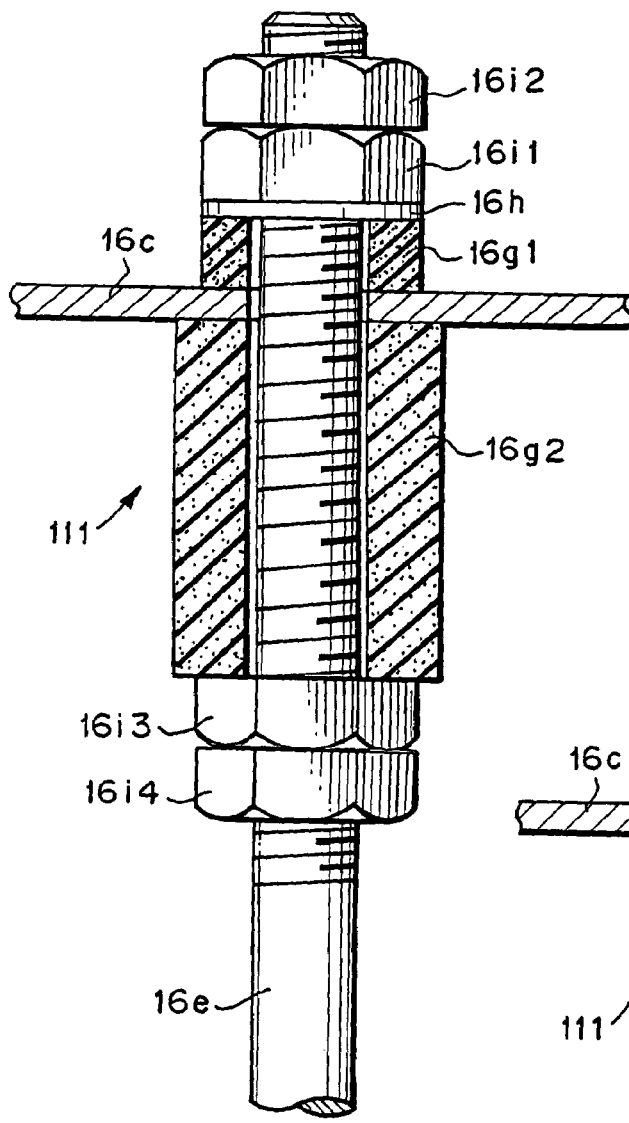
FIG. 6 is an enlarged cross sectional view of the attachment of the vibrating rod onto the vibrating member of the apparatus of FIG. 1.

FIG. 6 is an enlarged cross sectional view showing the installation of the vibrating rod 16e attachment piece 111 onto the vibrating member 16c. The nuts 16i1, 16i2 are fit from the top side of vibration member 16c, by way of the vibration strain dispersion member 16g1 and washer 16h, onto the male screw section formed at the top end of vibrating rod 16e. The nuts 16i3, 16i4 are fit by way of the vibration strain dispersion member 16g2 from the bottom side (onto the screw section) of the vibration member 16c. The vibration strain dispersion member 16g1, 16g2 are utilized as a vibration stress dispersion means made for example from rubber. The vibration strain dispersion member 16g1, 16g2 can be made from a hard resilient piece for example of natural rubber, hard synthetic rubber, or plastic with a Shore A hardness of 80 to 120 and preferably 90 to 100. Hard urethane rubber with a Shore A hardness of 90 to 100 is particularly preferably in view of its durability and resistance to chemicals. Utilizing the vibration stress dispersion means prevents vibration stress from concentrating on the near side of the junction of vibrating member 16c and the vibrating rod 16e, and makes the vibrating rod 16e more difficult to break. Raising the vibration frequency of the vibrating motors 16d to 100 hertz or higher is particularly effective in preventing breakage of the vibrating rod 16e.

Figure 7:
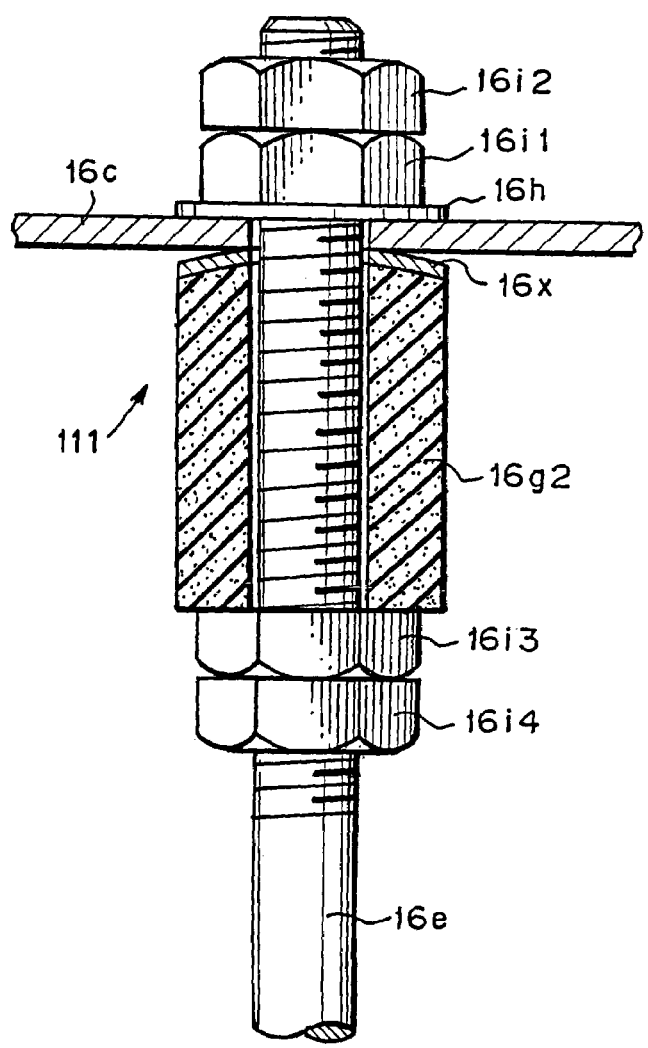
FIG. 7 is an enlarged cross sectional view showing a variation of the attachment of the vibrating rod onto the vibrating member.

FIG. 7 is an enlarged cross sectional view showing a variation of the vibrating rod 16e attachment piece 111 onto the vibrating member 16c. This variation differs from the attachment piece of FIG. 6, only in that the vibration strain dispersion member 16g1 is not installed on the top side of the vibration member 16c and in that there is a spherical spacer 16x between the vibration member 16c and the vibration strain dispersion member 16g2. In all other respects the variation is identical to FIG. 7.

Figure 8:
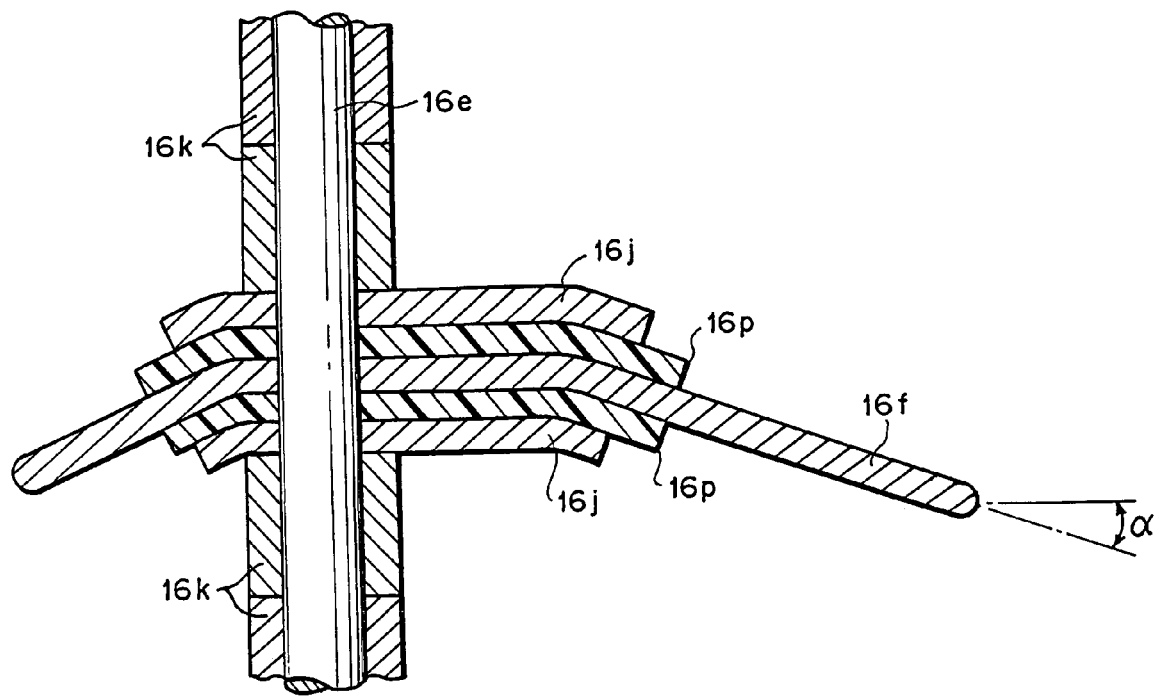
FIG. 8 is an enlarged cross sectional view showing the attachment of the vibrating rod onto the vibrating member of the apparatus of FIG. 1.

FIG. 8 is an enlarged cross sectional view of the vibrating blade 16f attachment onto the vibrating rod 16e. A vibrating blade clamp member 16j is installed on both the top and bottom sides of each vibrating blade 16f. Spacer rings 16k are installed for setting the spacing between the vibrating blades 16f by means of clamp members 16j. A nut 16m is screwed on to the vibrating rod 16e formed as a male screw with or without spacer rings 16k as shown in FIG. 1, on the upper side of the topmost section of vibrating blade 16f, and the lower side of the bottom-most section of the vibrating blade 16f. As shown in FIG. 8, the breakage of the vibrating blade 16f can be prevented by installing a resilient member sheet 16p as the vibration dispersion means made from fluorine plastic or fluorine rubber between each vibrating blade 16f and clamping member 16j. The resilient member sheet 16p is preferably installed to protrude outwards somewhat from the clamping member 16j in order to further enhance the breakage prevention effect of the vibrating blade 16f. As shown in the figure, the lower surface (press-contact surface) of the upper side of clamping member 16j is formed with a protruding surface, and the upper surface (press contact surface) of the lower side clamping member 16j is formed with a recessed surface. The section of the vibrating blade 16f compressed from above and below by the clamping member 16j is in this way forced into a curved shape, and the tip of the vibrating blade 16f forms an angle α versus the horizontal surface. This α angle can be set to −30 degrees or more and 30 degrees or less, and preferably is −20 degrees or more and 20 degrees or less. The α angle in particular is −30 degrees or more and −5 degrees or less, or is 5 degrees or more and 30 degrees or less, and preferably is −20 degrees or more and −10 degrees or less, or is 10 degrees or more and 20 degrees or less. The α angle is 0 if the clamping member 16j (press contact) surface is flat. The α angle need not be the same for all the vibrating blades 16f. For example, the lower 1 to 2 blades of vibrating blade 16f may be set to a minus value (in other words, facing downwards: facing as shown in FIG. 8) and all other blades of vibrating blade 16f set to a plus value (in other words facing upwards: the reverse of that value shown in FIG. 8).

Resilient metal plate, plastic plate or rubber plate may be utilized as the vibrating blade 16f. A satisfactory thickness range for the vibrating blade 16f differs according to the vibration conditions and viscosity of the electrolytic fluid 14. However, during operation of the vibration-stirring means 16, the vibrating blades should be set so the tips of the vibrating blades 16f provide an oscillation (flutter phenomenon) for increasing the stirring (or agitating) efficiency, without breaking the vibrating blade. If the vibrating blade 16f is made from metal plate such as stainless steel plate, then the thickness can be set from 0.2 to 2 millimeters. If the vibrating blade 16f is made from plastic plate or rubber plate then the thickness can be set from 0.5 to 10 millimeters. The vibrating blade 16f and clamping member 16j can be integrated into one piece. Integrating them into one piece avoids the problem of having to wash away electrolytic fluid 14 that penetrates into the junction of the vibrating blade 16f and clamp member 16j and hardens and adheres there.

The material for the metallic vibrating blade 16f may be titanium, aluminum, copper, steel, stainless steel, a ferromagnetic metal such as ferromagnetic steel, or an alloy of these metals. The material for the plastic vibrating blade 16f may be polycarbonate, vinyl chloride resin, polypropylene, etc. The vibrating blade may be formed by a process such as plating the surface of the plastic member by conductive (electrodeposition) processing.

Figure 9:
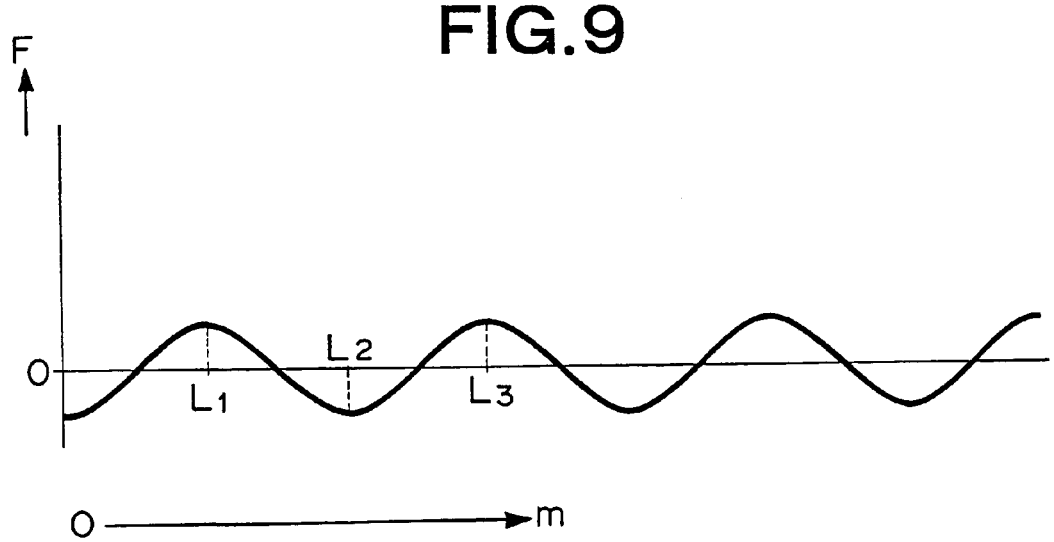
FIG. 9 is a graph showing the extent and the relation between vibrating blade length and flutter.

The extent of the "flutter phenomenon" generated by the vibrating blade that accompanies the vibration of vibrating blade 16f within the electrolytic fluid 14 will vary depending on the vibration frequency of the vibration motors 16d, the length of the vibrating blade 16f (dimension $D_2$ of FIG. 33, from the tip of clamping member 16j to the tip of vibrating blade 16f), and thickness, and viscosity and specific gravity of the electrolytic fluid 14, etc. The length and thickness of the "fluttering" vibrating blade 16f can be appropriately selected based on the applied frequency. By making the vibration frequency of vibrating motor 16d and thickness of vibrating blade 16f fixed values, and then varying the length of vibrating blade 16f, the extent of vibrating blade flutter will be as shown in FIG. 9. In other words, the flutter will increase up to a certain stage as the length of vibrating blade 16f is increased, but when that point is exceeded, the extent F of the flutter will become smaller. As shown in this graph, at a certain length the flutter will be almost zero and if the blade is further lengthened the flutter increase and this process continuously repeats itself.

Preferably a length $L_1$ shown as the No. 1 peak or a length $L_2$ shown as the NO. 2 peak is selected for the vibrating blade length. $L_1$ or $L_2$ can be selected according to whether one wants to boost the path vibration or the flow.

To find the thickness of a vibrating blade made of stainless steel (SUS) in a 75 kW vibrating motor at an oscillating frequency of 37 to 60 hertz, a test was made and the values for $L_1$ or $L_2$ were found and the results as shown below obtained.

| Thickness | $L_1$ | $L_2$ |
|---|---|---|
| 0.10 mm | 15 mm approx. | — |
| 0.20 mm | 25 mm approx. | 70 mm approx. |
| 0.30 mm | 45 mm approx. | 110-120 mm approx. |
| 0.40 mm | 50 mm approx. | 140-150 mm approx. |
| 0.50 mm | 55 mm approx. | 170 mm approx. |

In this test, the distance from the center of the vibrating blade 16e to the tip of the fixed member was 27 mm. The vibrating blade tilt angle was set at an upward tilt of 15 degrees (±15°).

The above described vibration-stirring means 16 can be used in the vibration-stirring machines (stirrer apparatus) as described in the following documents (These are patent applications relating to the invention of the present inventors.), as well as in JP-B 135528/2001, JP-B 338422/2001 patent applications of the present inventors.

| | |
|---|---|
| JP-A 275130/1991 | (JP Patent No. 1941498) |
| JP-A 220697/1994 | (JP Patent No. 2707530) |
| JP-A 312124/1994 | (JP Patent No. 2762388) |
| JP-A 281272/1996 | (JP Patent No. 2767771) |
| JP-A 173785/1996 | (JP Patent No. 2852878) |
| JP-A 126896/1995 | (JP Patent No. 2911350) |
| JP-A 40482/1997 | (JP Patent No. 2911393) |
| JP-A 189880/1999 | (JP Patent No. 2988624) |
| JP-A 54192/1995 | (JP Patent No. 2989440) |
| JP-A 33035/1994 | (JP Patent No. 2992177) |
| JP-A 287799/1994 | (JP Patent No. 3035114) |
| JP-A 280035/1994 | (JP Patent No. 3244334) |
| JP-A 304461/1994 | (JP Patent No. 3142417) |
| JP-A 304461/1994 | |
| JP-A 43569/1998 | |
| JP-A 369453/1998 | |
| JP-A 253782/1999 | |
| JP-A 317295/2000 | |

In this invention, the vibrating-stirring means 16 as shown in FIG. 1, may be installed in the electrolytic cells on both ends or may installed in only one electrolytic cell. If using the vibrating blades to extend symmetrically to both sides, then the vibration-stirring means 16 may be installed in the center of the electrolytic cell, and an electrode group may be installed on both sides as described later on.

Using a vibration-stirring means with the vibrating blades in the bottom of the electrolytic cells as described in JP-A 304461/1994, allows a wider installation space for the electrode group within the electrolytic cell. Other advantages are that a larger quantity of gas is emitted from the electrolytic cell (volume) and if the electrodes are installed in the upward and downward directions, then there is no need to use multiple holes as described later on.

The description now returns to FIG. 1 through FIG. 3. In the resent embodiment, the vibration-stirring means 16 as described above are installed on both ends of the electrolytic cell 10A. A pair of electrodes comprised of a plate shaped anode member 2x and an a plate shaped cathode member 2y are installed in parallel in the center of the electrolytic cell 10A One of the vibration stirring means 16 is installed to face the surface (main surface) of the anode member 2x. The other vibration stirring means 16 is installed to face the surface (main surface) of the cathode member.

The usual material utilized for hydroelectrolyis may be utilized as the material for the anode member 2x and the cathode member 2y. Materials such as lead dioxide (lead peroxide), magnetite, ferrite, graphite, platinum, Pt—Ir alloy, titanium alloy, titanium with rare-earth sheath (for example platinum-sheathed titanium) may be used as the anode member. Rare earth metals such as rhodium, nickel, nickel alloy, (Ni—$Mo_2$, Ni—Co, Ni—Fe, Ni—Mo—Cd, Ni—$S_x$, Raney nickel, etc.), and titanium alloy may be used as the cathode member. The gap between the anode member and the cathode member for example is 5 to 400 millimeters.

Since the anode member 2x and the cathode member 2y are shaped as a plate, when the electrode is installed at nearly a right angle to the direction the vibrating blades 16f are facing to cut off the flow of electrolytic fluid 14 generated by the vibration of the vibrating blade 16f of the vibration-stirring means 16f as shown in FIG. 1; then multiple small holes must be formed. The electrolytic fluid 14 passing through the small holes can in this way flow smoothly. The holes can be a circular shape or a polygonal shape and there are no particular restrictions on this shape. The size and number of small holes are preferably set to achieve a balance between both the basic purpose of the electrode and the purpose of the porosity(multi-holes). The small holes on the electrode preferably have a surface area of 50 percent or more of the electrode surface in terms of effective surface area (in other words, surface area contacting the electrolytic fluid 14). The porous (multi-hole) electrode may have a net shape.

The anode member 2x and the cathode member 2y are respectively connected to an anode main bus-bar and a cathode main bus bar. These anode main bus-bar and cathode main bus bar are connected to the power supply 34 as shown in FIG. 1. The electrolysis means is made up of the power supply 34, and the anode member 2x and the cathode member 2y.

The power supply 34 may supply direct current and preferably supplies normal low-ripple direct current. However, other power supplies with different waveforms may also be utilized. These types of electrolysis current waveforms are described for example, in the "Electrochemistry" (Society of Japan) Vol. 24, P. 398-403, and pages 449-456 of same volume, the "Electroplating Guide" by the Federation of Electro Plating Industry Association, Japan" Apr. 15, 1996, P. 378-385, the "Surface Technology Compilation" issued by Koshinsha (Corp.) Jun. 15, 1983, P. 301-302, same volume P. 517-527, same volume P. 1050-1053, the Nikkan Kogyo Shinbun "Electroplating Technology Compilation" P 365-369 Jul. 25, 1971, of the same volume P. 618-622, etc.

In the present invention, among the various pulse waveforms, a rectangular waveform pulse is preferable, particularly in view of its improved energy efficiency. This type of power supply (power supply apparatus) can create voltages with rectangular waveforms from an AC (alternating current) voltage. This type of power supply further has a rectifier circuit utilizing for example, transistors and is known as a pulse power supply. The rectifier for these type of power supplies may be a transistor regulated power supply, a dropper type power supply, a switching power supply, a silicon rectifier, an SCR type rectifier, a high-frequency rectifier, an inverter digital-controller rectifier, (for example, the Power Master made by Chuo Seisakusho (Corp.)), the KTS Series made by Sansha Denki (Corp.), the RCV power supply made by Shikoku Denki Co., a means for supplying rectangular pulses by switching transistors on and off and comprised of a switching regulator power supply and transistor switch, a high frequency switching power supply (for using diodes to change the alternating current into direct current, add a 20 to 30 KHz high frequency waveform, and with power transistors apply transforming, once again rectify the voltage, and extract a smooth (low-ripple) output), a PR type rectifier, a high-frequency control type high-speed pulse PR power supply (for example, a HiPR Series (Chiyoda Corp.), etc.

The voltage applied across the anode member and the cathode member is the same as during the usual electrolysis of water.

The electrolytic fluid 14 is water containing electrolytic material. Here, a soluble alkali metal hydroxide (KOH, NaOH, etc.) or an alkali rare-earth metal hydroxide (for example, $Ba(OH)_2$, $Mg(OH)_2$, $Ca(OH)_2$, etc.) or a ammonium alkyl 4 (tetra-alkylammonium), and materials of the known related art may be used as the electrolytic material. Among these, KOH is preferable. The content of electrolytic material in the electrolytic fluid is preferably 5 to 30 percent. The pH of the electrolytic fluid is preferably 7 to 10. However, electrolysis of water with an NaCl or HCl content will generate halogen gas, so use of large amounts should be avoided from the viewpoint of prevent pollution of the environment.

The lid member 10B is affixed to the upper part of the electrolytic cell 10A as shown in FIG. 1 through FIG. 3. This lid member is formed with a hydrogen-oxygen gas extraction outlet 10B' for recovering the hydrogen-oxygen gas generated by electrolysis. A hydrogen-oxygen gas extraction tube 10B' is connected to that extraction outlet 10B'. The hydrogen-oxygen gas trapping means is comprised of this lid member 10B and hydrogen-oxygen gas extraction tube 10B".

In the present embodiment, the hydrogen-oxygen gas is recovered as a gas mixture of oxygen gas and hydrogen gas. However, in order to recover the oxygen gas and the hydrogen gas separately, partition films or partition walls maybe used to separate and extract the hydrogen gas emitted from the anode member and the oxygen gas emitted from the cathode member so these gases do not mix with each other.

Figure 4:
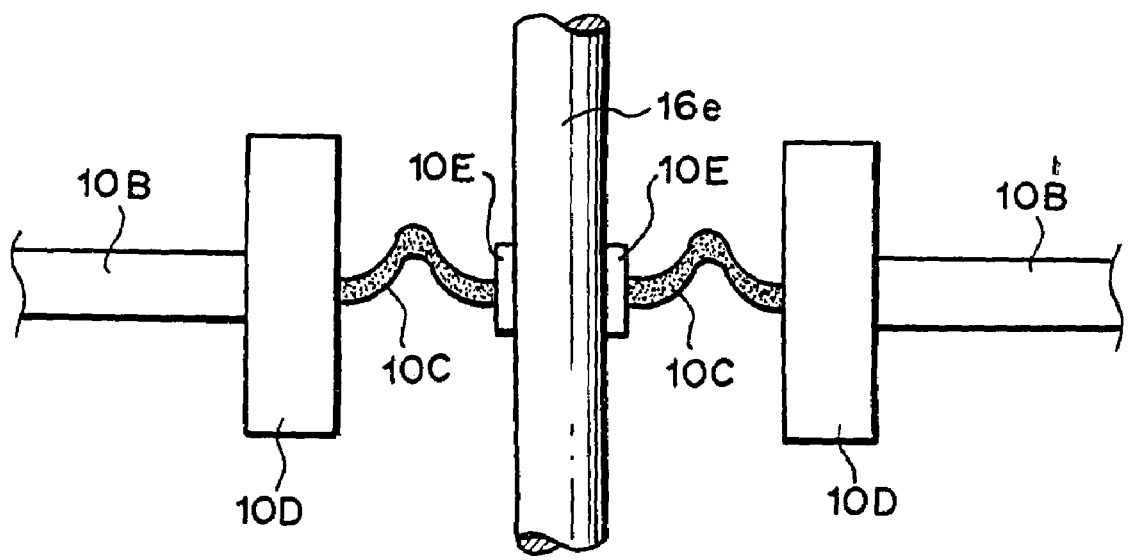
FIG. 4 is an enlarged fragmentary view of the apparatus of FIG. 1.
Figure 5:
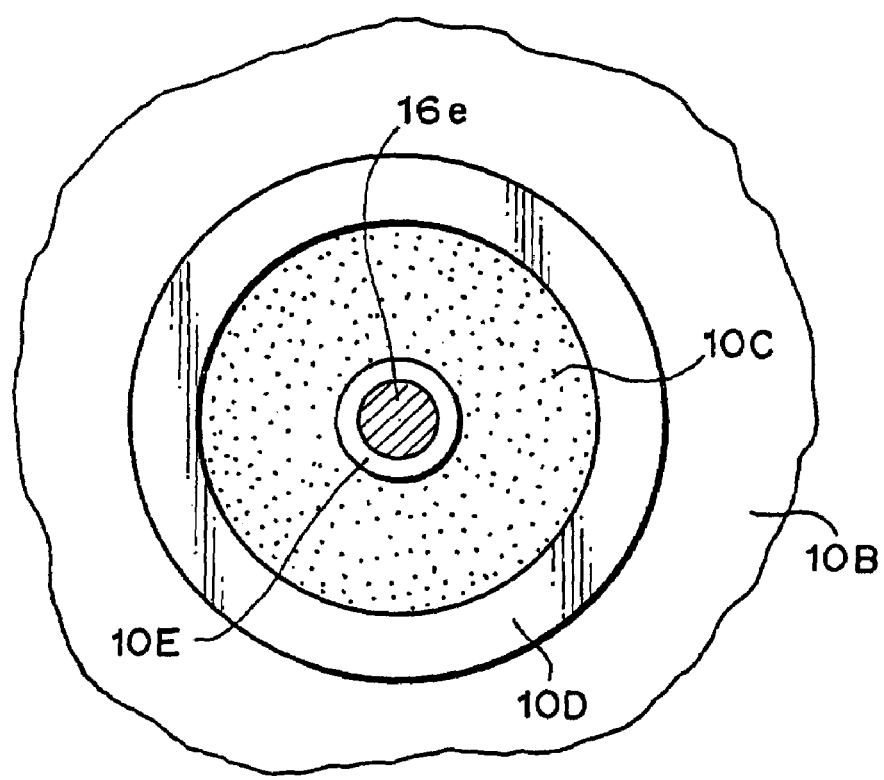
FIG. 5 is an enlarged flat view of the apparatus of FIG. 1.

The material for the electrolytic cell 10A and lid member 10B may for example be stainless steel, copper, another metal, or plastic (synthetic resin) such as polycarbonate. A pipe 10A' is connected to the electrolytic cell 10A in order to adjust the level of the internal electrolytic fluid 14. The vibrating rod 16e of the vibration-stirring means 16 extends upwards and downwards through the lid member 10B. As shown in FIG. 4 and FIG. 5, a flexible member 10C made for example of rubber plate can be affixed between the clamp member 10D installed on the inner edge of the opening formed for the lid member 10B and the clamp member 10E installed on the outer surface of the vibrating rod 16e to form an airtight seal. The means installed for forming an airtight seal may also be an inner ring of a support bearing attached to vibrating rod 16e, an outer ring of said support bearing attached to the inner edge of the opening in lid member 10B, and with the inner ring movable up and down along the (rod) stroke versus the outer ring. Typical stroke units of this type are the NS-A model (product name) and NS model (product name) made by THK (Corp.), and the oil seal VC type (product name), and SC type (product name) made by NOK (Corp). The airtight sealing means may be a rubber plate installed only in the opening in the lid member 10B that the vibrating rod 16e passes through, or may be a laminated piece, etc. Rubber, and in particular soft rubber with good shape forming capability may for example be utilized as this sealing means. The vibration width of the vertically oscillating vibrating rod is usually 20 millimeters or less, preferably is 10 millimeters or less, and a width of 5 millimeters is particularly preferable. That (vibration width) lower limit is 0.1 millimeters or more and preferably is about 0.5 millimeters or more. By using a suitable material such as rubber as the sealing member, follow-up motion can be achieved, and a satisfactory airtight state obtained that generates only a little friction heat.

Figure 21:
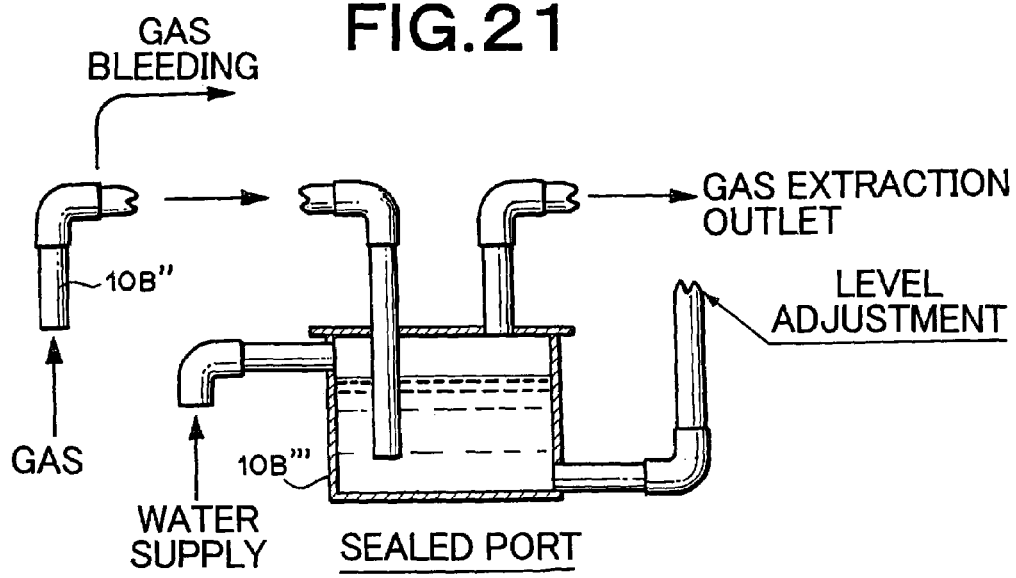
FIG. 21 is a fragmentary view of the gas trapping means of the hydrogen-oxygen gas generator of the present invention.
Figure 22:
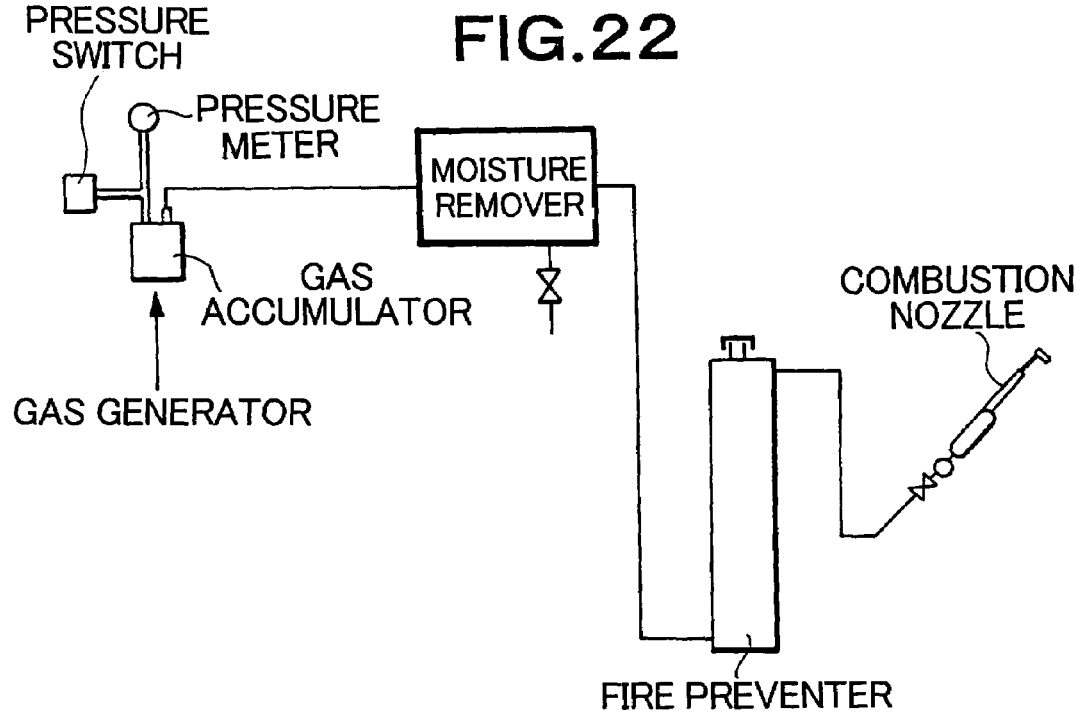
FIG. 22 is a concept view showing one example of the gas combustion device utilizing the hydrogen-oxygen gas collected by the hydrogen-oxygen gas generator.

The electrolysis is preferably performed at a fluid temperature of 20 to 100° C. and an electrical current density of 7 to 40 A/dm$^2$. As shown by FIG. 21, the hydrogen-oxygen gas generated by electrolysis is extracted by way of a seal port 10B''' connected to the gas extraction tube 10B''. The seal port 10B''' also comprises the gas trapping means. FIG. 22 shows a typical gas combustion device utilizing the hydrogen-oxygen gas recovered from this gas generator. The hydrogen-oxygen gas is collected in the required quantity in the accumulator and passed through a moisture remover and fire preventer before being supplied to the combustion nozzle.

This combustion device can be utilized in boilers, gas cutoff equipment, generators, and power sources for aircraft, automobiles, and ships, and in other applications.

The gas mixture of hydrogen gas and oxygen gas is colorless during combustion so in order to observe the combustion state of the flame, an alcohol-based additive is added into the flame-stopper tank, and this is added to the gas to add color to the flame. Different types of alcohol-based additives ranging from methanol to hexane are used. During combustion of the hydrogen-oxygen gas obtained in this invention, it was found that the there was a large difference in the flame temperature according to the type of alcohol solution. For example, using hexane make the flame large and consumes less gas but the flame temperature is drastically low compared to methanol. In an experiment, when the molten state was observed while a flame was applied to a 0.5 millimeter thick titanium plate, the plate finally melted after five minutes when using hexane but when methanol was used the plate melted in approximately three seconds. The flame temperature also varied greatly according to the amount of alcohol-based additive. Here it was found that reducing the amount of additive was effective in raising the flame temperature. In the experiment, testing the combustion of titanium plate (400×20×0.5 mm), a tantalum member (150×3 mm dia.) and tungsten plate (120× 15×0.8 mm); the respective times until melting (titanium, tantalum) or sublimation (tungsten) when using 100% methanol, 50% methanol:50% water, and 25% methanol: 75% water, as the alcohol-based additive were as follows.

| Test piece | Solution (Methanol % by volume) | | |
|---|---|---|---|
| | 100% | 50% | 25% |
| Titanium | 4 seconds | 3 seconds | 1 second |
| Tantalum | 4 seconds | 3 seconds | 1 second |
| Tungsten | 7 seconds | 5 seconds | 2 seconds |

Therefore as shown by the above, methanol is preferred as the alcohol-based additive filled into the flame-stopper tank. Furthermore, mixing this with water (preferably distilled water) with methanol of 10 to 35% by volume is further preferred. Using approximately 20% methanol by volume is effective in raising the flame temperature. However a mixture of approximately 30% methanol by volume is effective in increasing the staying power (duration) of the flame.

The hydrogen-oxygen gas generated by this invention is also known as the so-called brown gas. This gas does not require air for combustion and therefore does not generate environmental pollutants such as nitrous oxides during combustion.

Figure 10:
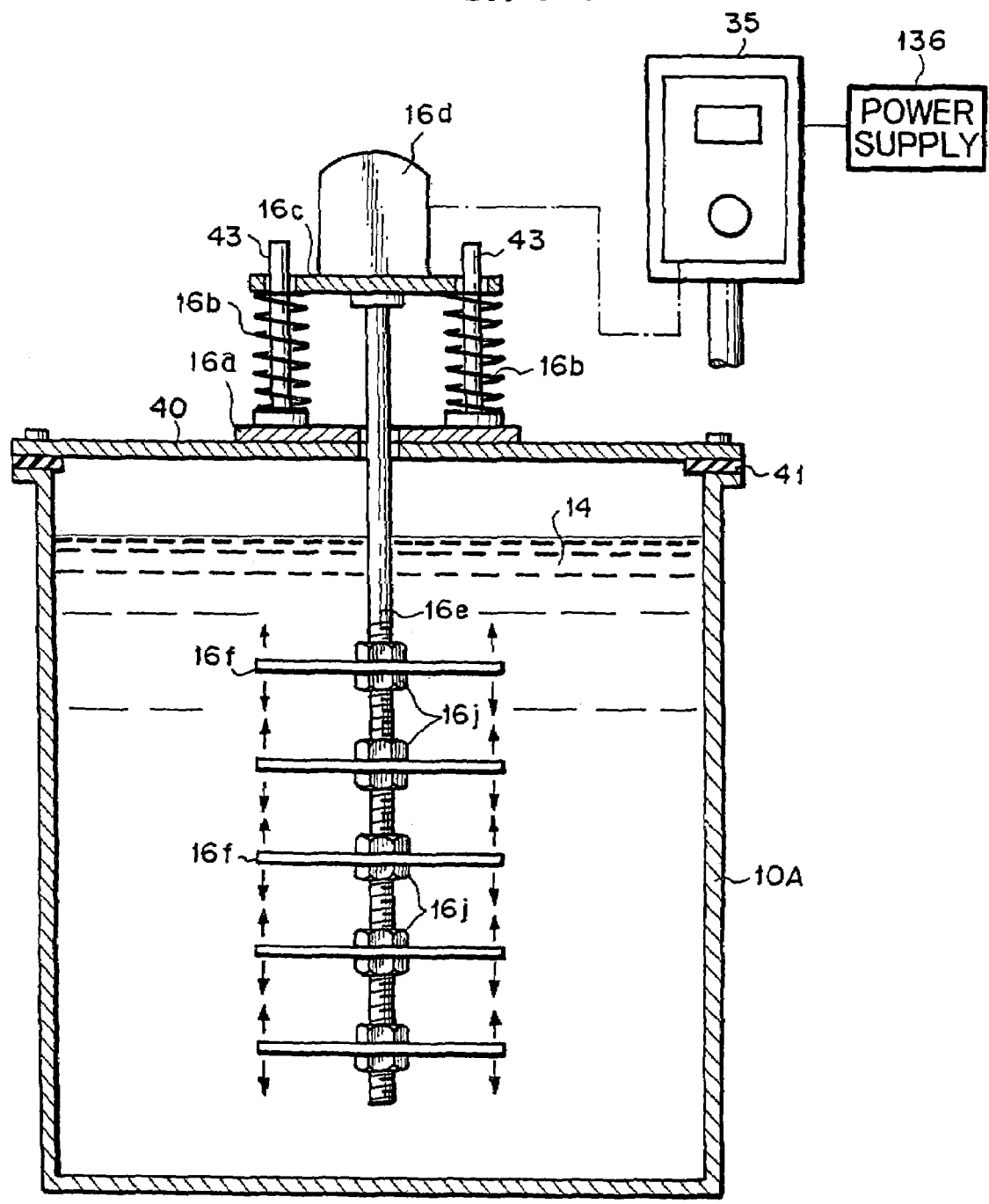
FIG. 10 is a cross sectional view showing a variation of the vibration stirring means.

FIG. 10 is a cross sectional view showing a variation of the vibrating-stirring means. In this example, the base 16a is clamped to the installation bed 40 on the upper part of the electrolytic cell 10A by way of the vibration absorbing member 41. A rod-shaped guide member 43 is clamped to the installation bed 40 to extend perpendicularly upwards. This guide member 43 is installed (positioned) within the coil spring 16b. A transistor inverter 35 for controlling the frequency of the vibration motor 16d is installed between the vibration motor 16d and the power supply 136 for driving that motor 16d. The power supply 136 is for example 200 volts. The drive means for this vibration motor 16d can also be used in the other embodiments of the present invention.

Figure 11:
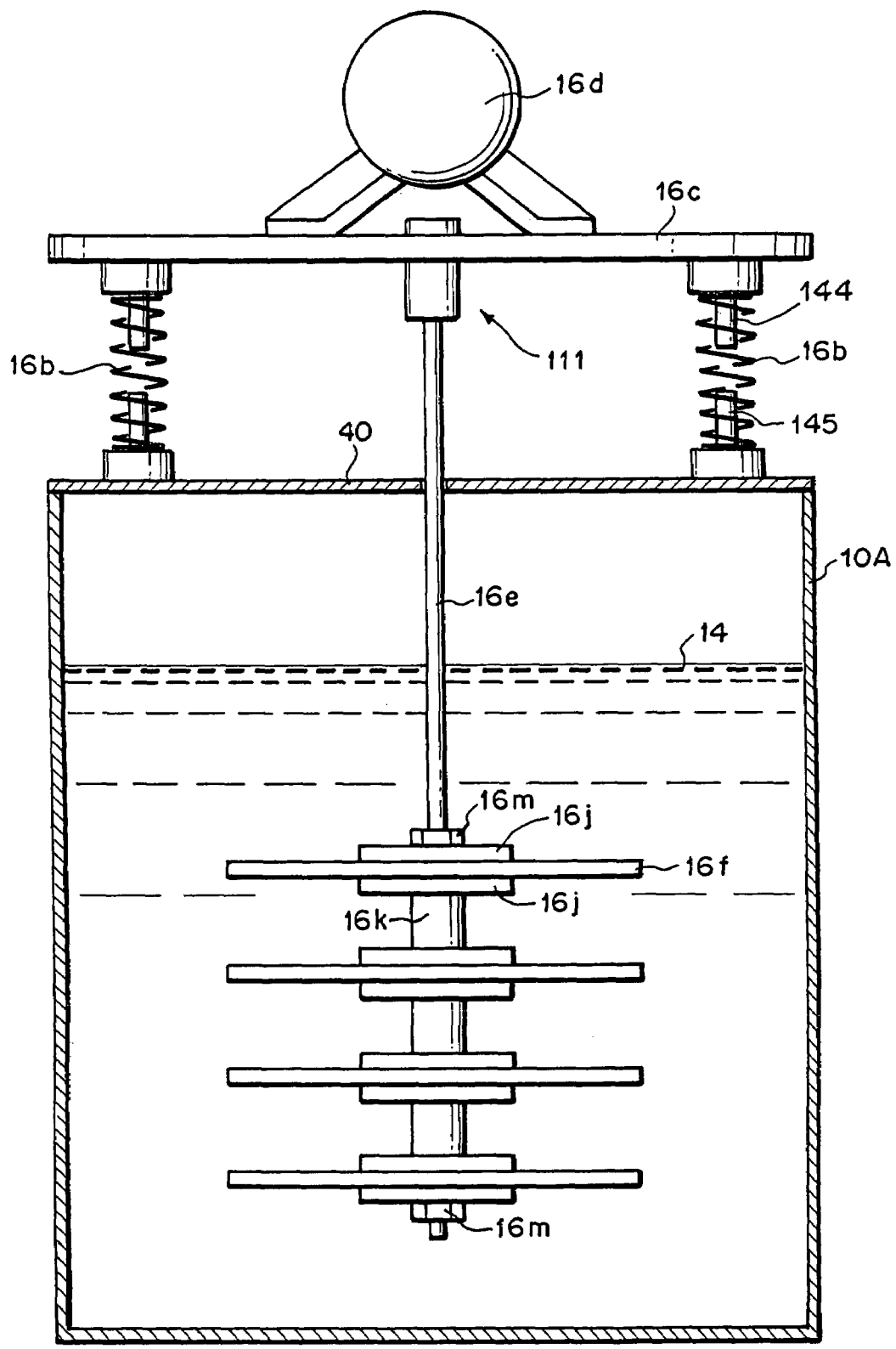
FIG. 11 is a cross sectional view showing a variation of the vibration stirring means.

FIG. 11 is a cross sectional view showing a variation of the vibrating-stirring means. In this example, a rod-shaped upper guide member 144 clamped to a vibrating member 16c, extends downwards in a direction perpendicular to the vibrating member 16c. A rod-shaped lower guide member 145 clamped to the installation bed 40 extends upwards in a direction perpendicular to the installation bed 40. These guide members 144, 145 are installed (positioned) within the coil spring 16b. A suitable space (or gap) is formed between the bottom edge of the upper side guide member 144, and the upper edge of the lower side guide member 145 to allow vibration of the vibrating member 16c.

Figure 12:
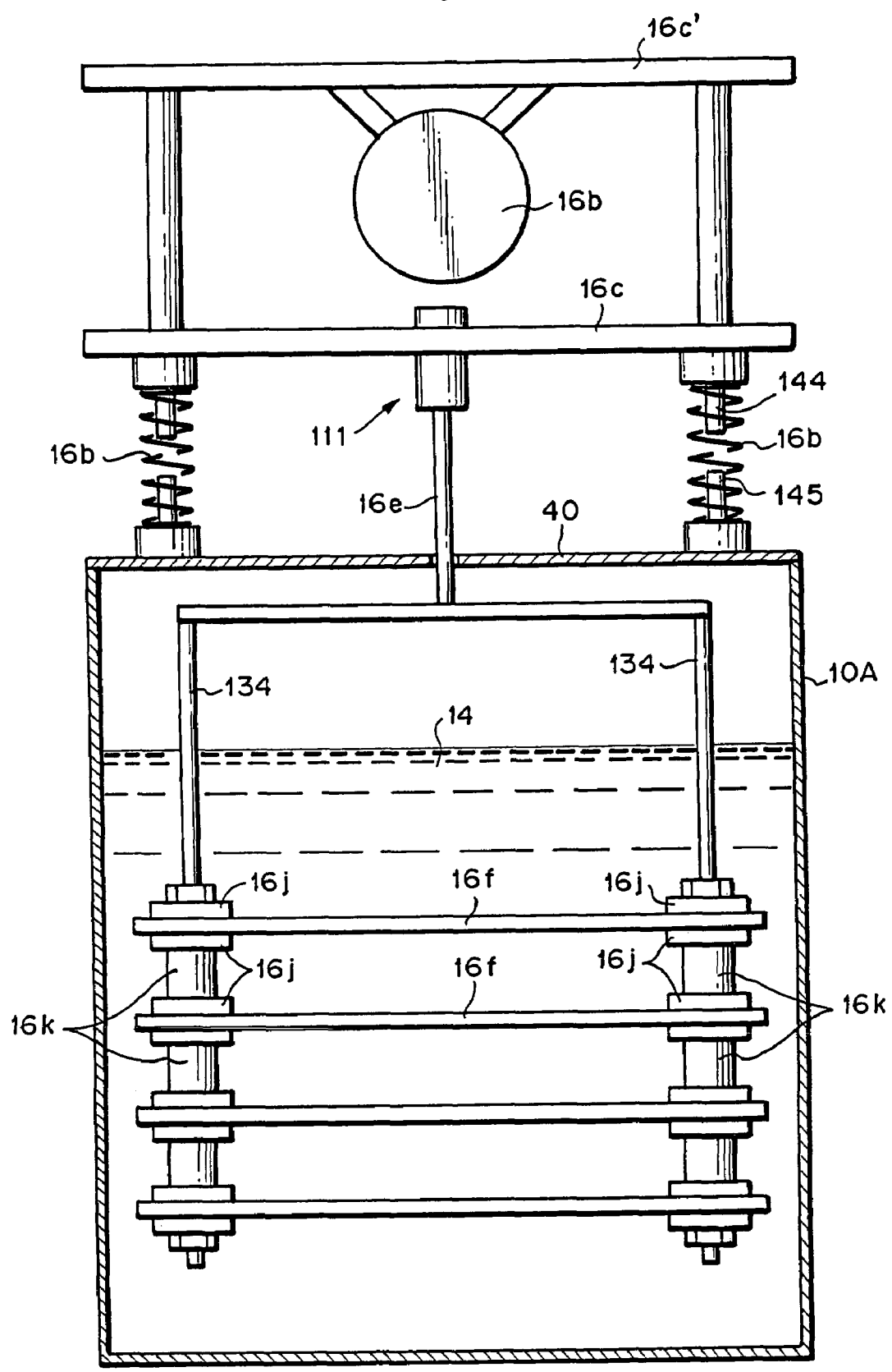
FIG. 12 is a cross sectional view showing a variation of the vibration stirring means.

FIG. 12 is a cross sectional view showing a variation of the vibrating-stirring means. In this example, the vibration motor 16d is installed on the lower side of a vibration member 16c' attached to the upper side of the vibration member 16. The vibration rod 16e branches into two sections 134 inside the electrolytic cell 10A The vibrating blades 16f are installed across these two rod sections 134.

Figure 13:
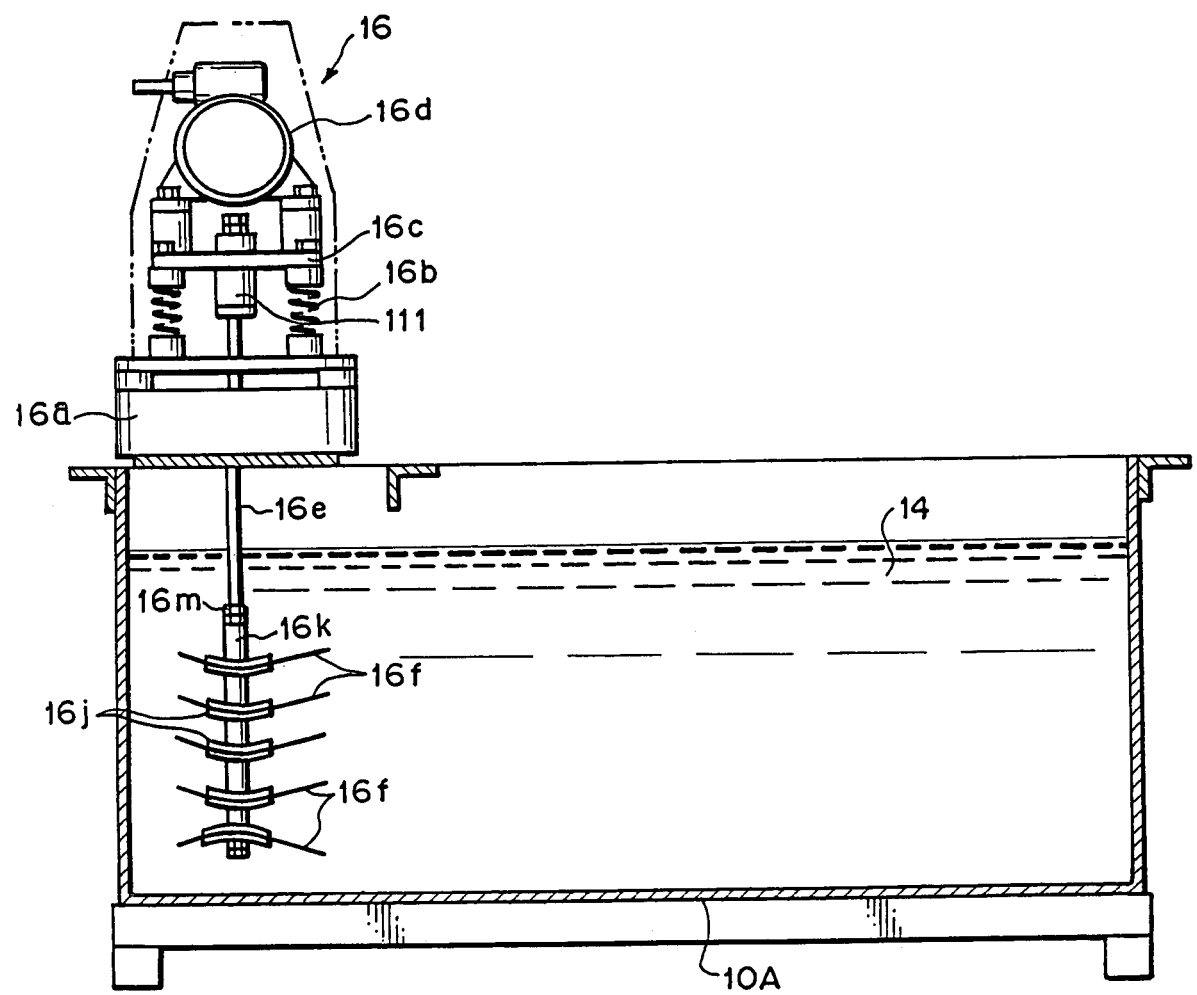
FIG. 13 is a cross sectional view showing a variation of the vibration stirring means.
Figure 14:
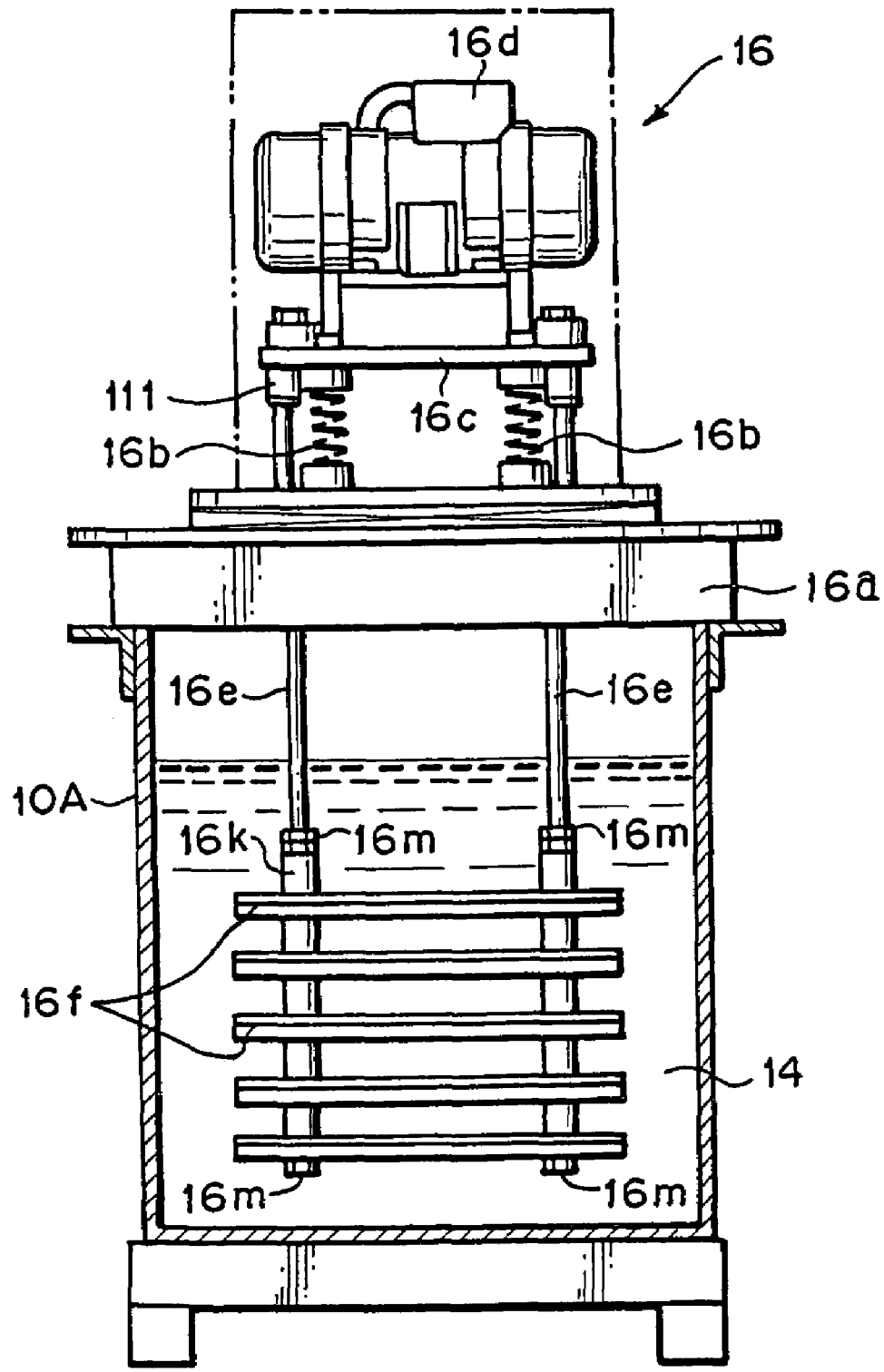
FIG. 14 is a cross sectional view showing a variation of the vibration stirring means.

FIG. 13 and FIG. 14 are cross sectional views showing a variation of the vibrating-stirring means. In this example (FIG. 13), the lowest vibrating blade 16f is facing obliquely downwards. The other vibrating blades 16f are facing obliquely upwards. The electrolytic fluid 14 nearest the bottom of the electrolytic cell 10A can in this way be adequately vibrated and stirred and the accumulation of fluid in the bottom of the electrolytic cell can be prevented. The vibrating blades 16f may also all be set facing obliquely downwards.

Figure 15:
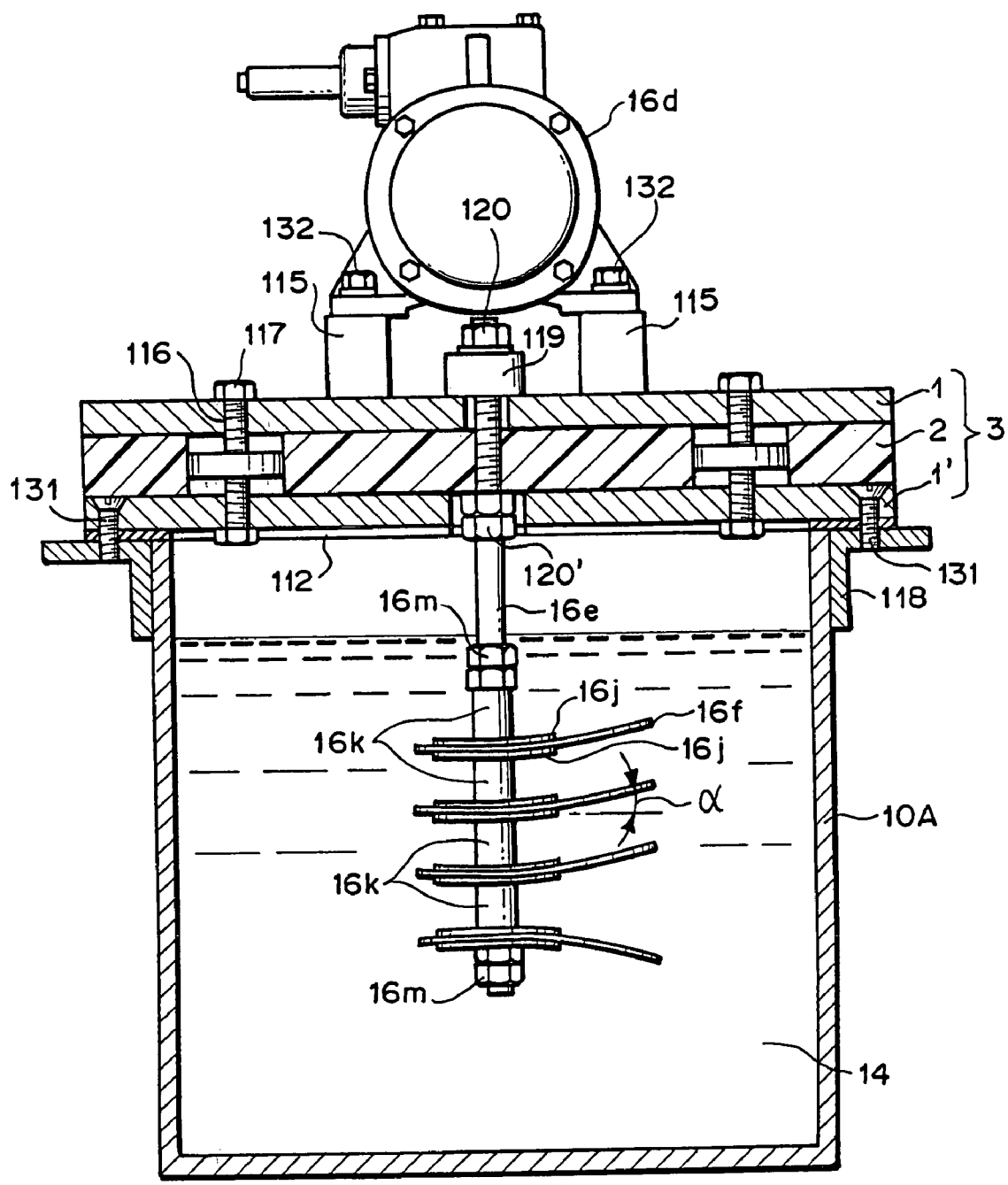
FIG. 15 is a cross sectional view showing another installation state of the vibration stirring means onto the electrolytic cell of the hydrogen-oxygen gas generator of the present invention.
Figure 16:
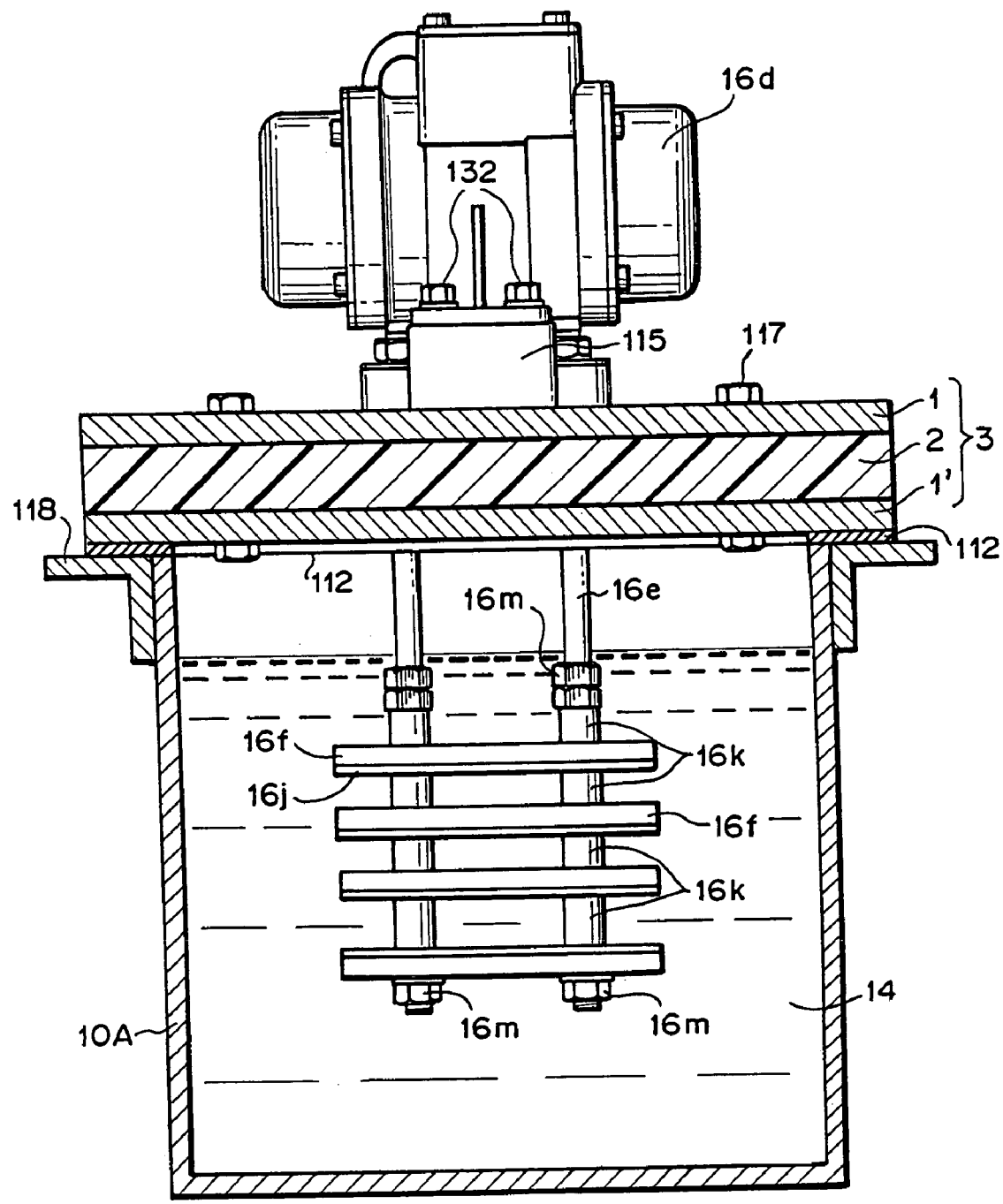
FIG. 16 is a cross sectional view of the apparatus shown in FIG. 15.
Figure 17:
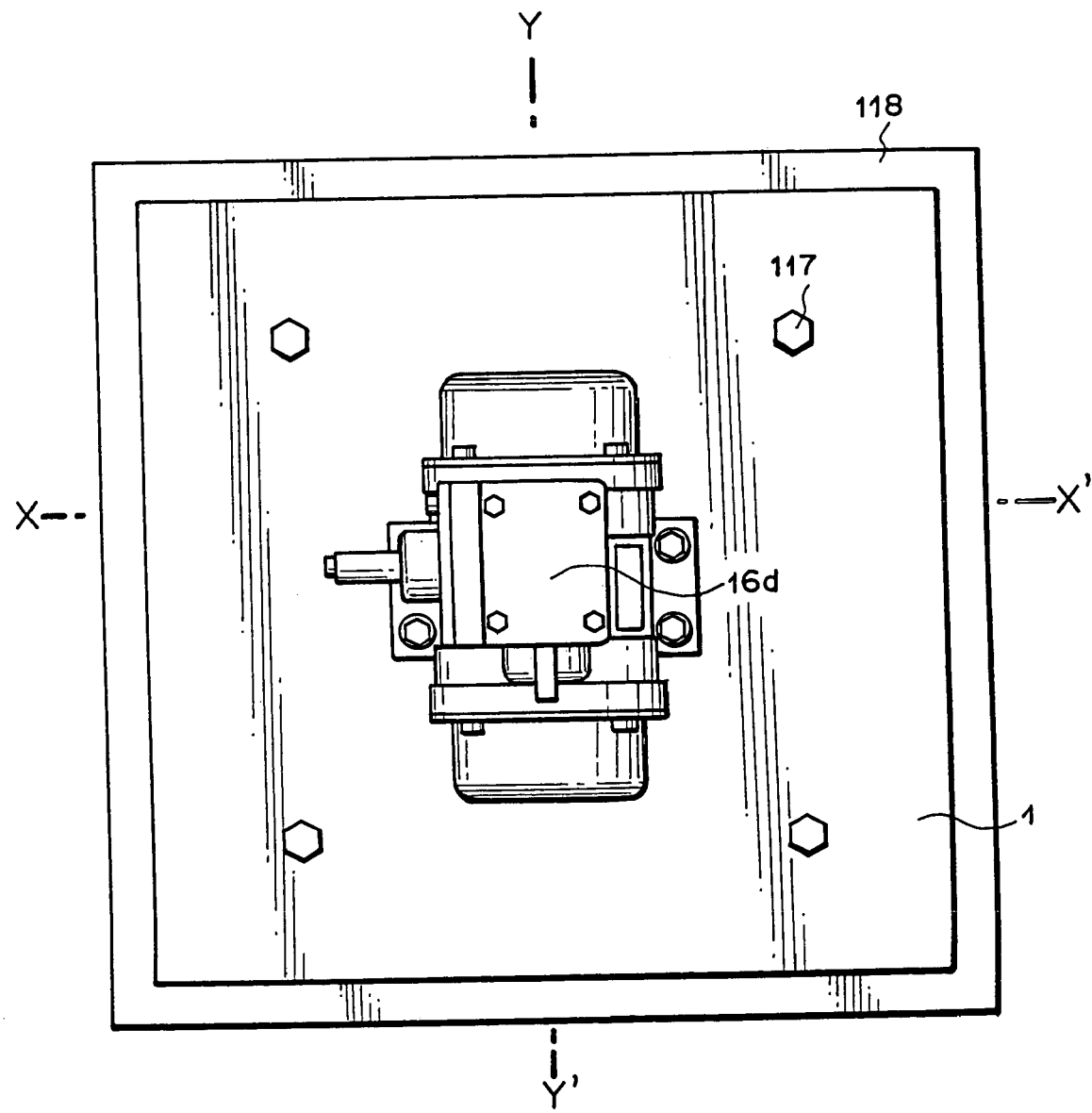
FIG. 17 is a flat view of the apparatus shown in FIG. 15.

FIG. 15 and FIG. 16 are cross sectional views showing another installation state of the vibration-stirring means onto the electrolytic cell of the present invention. FIG. 17 is a flat view of that installation state. FIG. 15 and FIG. 16 are views taken respectively along lines X-X' and lines Y-Y' of a cross section of FIG. 17.

In this state, a laminated piece 3 comprised of a rubber plate 2 and the metal plates 1, 1' is utilized as the vibration absorbing member instead of the coil spring 16b. In other words, the laminated piece 3 is clamped by way of an anti-vibration rubber 112 to a bracket members 118 affixed to an upper edge of electrolytic cell 10A by using the metal plate 1' and bolt 131. The rubber plate 2 is installed on that metal plate 1', the metal plate 1 installed on top of that rubber plate 2. This assembly is then integrated into one piece by the bolts 116 and 117.

The vibration motor 16d is clamped by a bolt 132 and a vibration support member 115 to a metal plate 1. The upper edge of the vibrating rod 16e is installed by way of a rubber ring 119 to the laminated piece 3 with the metal plate 1 and rubber plate 2. In other words, the upper metal plate 1 renders the functions of the vibration member 16c described in FIG. 1 and other embodiments. The lower metal plate 1' renders the functions of the base 16a described in FIG. 1 and other embodiments. The laminated piece 3 (mainly the rubber plate 2) containing the metal plates 1, 1' renders the vibration absorbing functions identical to the coil spring 16b described in FIG. 1 and other embodiments.

Figure 18A:
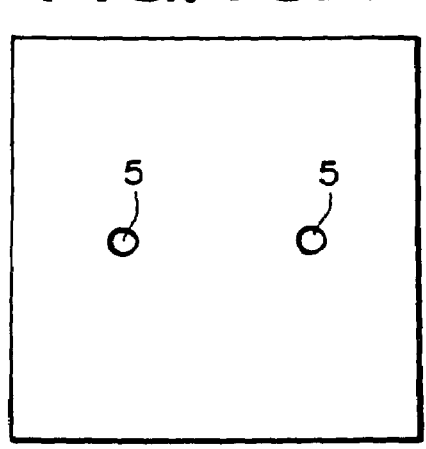
FIG. 18A through FIG. 18C are flat views of the laminated piece.
Figure 18B:
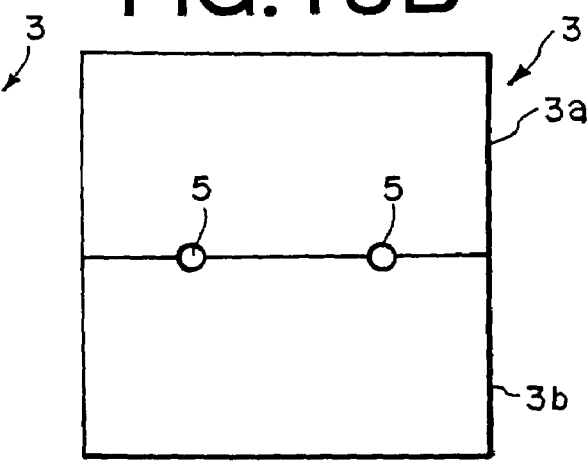
Figure 18C:
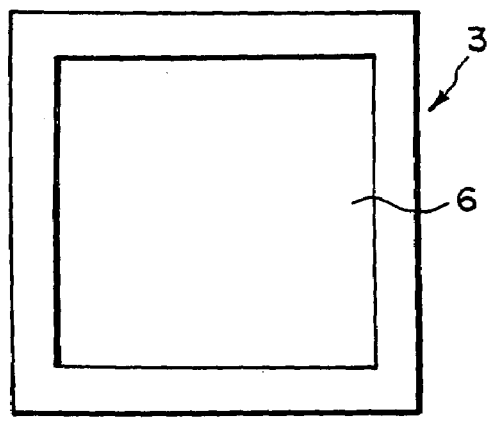

FIG. 18A through 18C are flat views of the laminated piece 3. In the example in FIG. 18A corresponding to the states in FIG. 15 through FIG. 17, a (through) hole 5 is formed in the laminated piece 3 to allow passage of the vibrating rod 16e. In the example in FIG. 18B, the holes 5 on the laminated piece 3 are separated by a dividing line into two sections 3a and 3b to allow easy passage of the vibrating rod 16e when assembling the device. In the example in FIG. 18C, the laminated piece 3 forms a ring-shape corresponding to the upper edge of the electrolytic cell 10A and an opening 6 is formed in the center section.

In the examples in FIG. 18A and FIG. 18B, the upper edge of the electrolytic cell 10A is sealed by the laminated piece 3. The laminated piece 3 in this way functions the same as the lid member 10B.

Figure 19A:
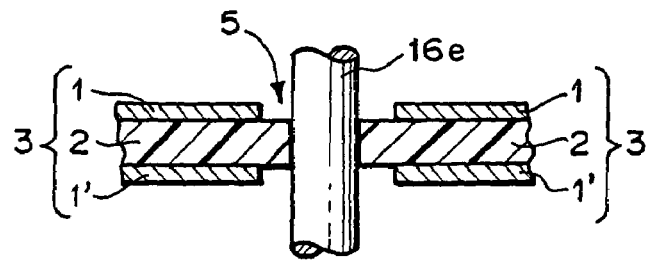
FIG. 19A and FIG. 19B are cross sectional views showing the state of the sealed electrolytic cell by the laminated piece.
Figure 19B:
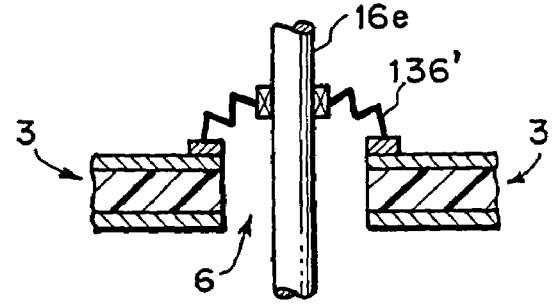

FIG. 19A and FIG. 19B are cross sectional views showing the state of the electrolytic cell sealed by the laminated piece 3. In FIG. 19A, the rubber plate 2 makes direct contact with the vibrating rod 16e in (through) holes 5 forming a seal. In FIG. 19B, a flexible seal member 136' is installed between the vibrating rod 16e and laminated piece 3 to seal the opening 6.

Figure 20A:
FIG. 20A through FIG. 20E are cross sectional views of the laminated piece.
Figure 20B:
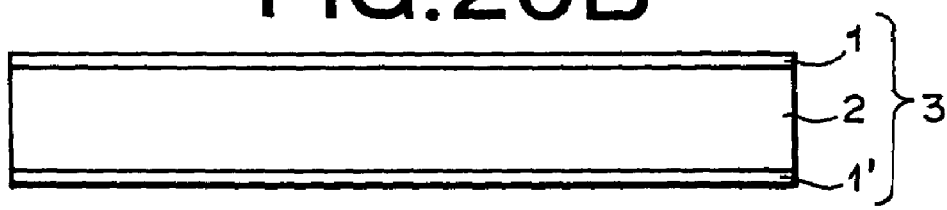
Figure 20C:
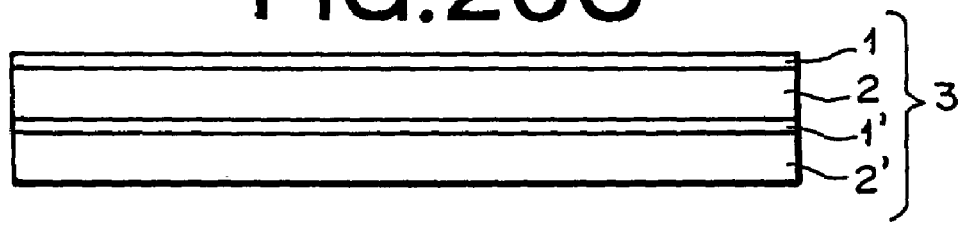
Figure 20D:
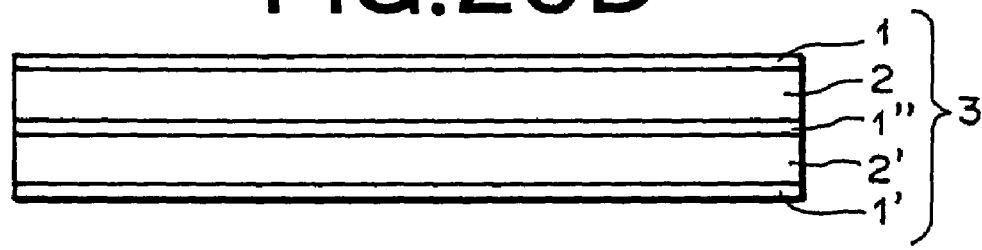

In FIG. 20A through FIG. 20E, a laminated piece 3 serves as the vibration absorbing material. The example in FIG. 20B is for the embodiments of FIG. 15 through FIG. 17. In the example in FIG. 20A, the laminated piece is made up of the metal plate 1 and the rubber plate 2. In the example in FIG. 20C, the laminated piece 3 is made up of an upper metal plate 1 and upper rubber plate 2 and lower metal plate 1' and lower rubber plate 2'. In the example in FIG. 20D, the laminated piece 3 is made up of an upper metal plate 1, an upper rubber plate 2, an intermediate metal plate 1", a lower rubber plate 2' and a lower metal plate 1'. The number of metal plates and rubber plates in the laminated piece 3 can for example be from 1 to 5 pieces. In the present invention, the vibration absorbing member can also be comprised of only the rubber plate.

Stainless steel, steel, copper, aluminum and other suitable alloys may be used as the metal plates 1, 1' and 1". The thickness of the metal plate may for example be from 10 to 40 millimeters. However, metal plate (for example, the intermediate metal plate 1') not directly clamped to members other than the laminated piece can be thin, with a dimension from 0.3 to 10 millimeters.

Synthetic rubber or vulcanized natural rubber may be used as the material for the rubber plates 2 and 2'. The rubber plate 2 and 2' are preferably anti-vibration rubber as specified in JISK6386. The rubber plate in particular has a static shearing resilience of 4 to 22 kgf/cm$^2$ and preferably of 5 to 10 kgf/cm$^2$ and preferably has an elongation of 250 percent or more. Rubber specified for use as synthetic rubber includes: chloroprene rubber, nitrile rubber, nitrile-chloroprene rubber, styrene-chloroprene rubber, acrylonitrile butadiene rubber, isoprene rubber, ethylene propylene diene copolymer rubber, epichlorohydrin rubber, alkylene oxide rubber, fluorine rubber, silicon rubber, urethane rubber, polysulfide rubber, phosphorbine rubber. The rubber thickness is for example 5 to 60 millimeters.

Figure 20E:
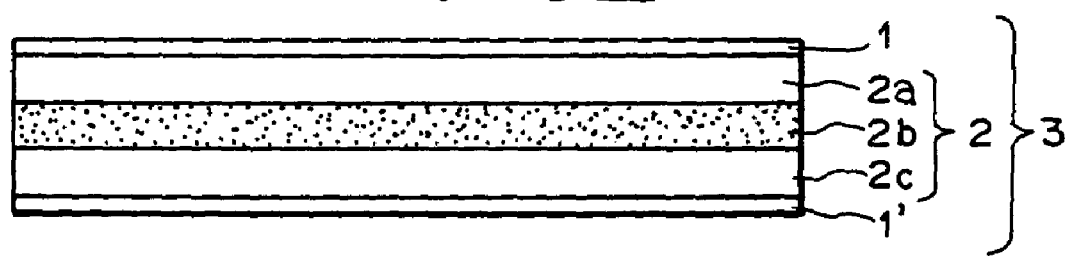

In the example in FIG. 20E, the laminated piece 3 is made up an upper metal plate 1, a rubber plate 2 and a lower metal plate 1'. The rubber plate 2 is made up of an upper solid rubber layer 2a and sponge rubber layer 2b and lower solid rubber layer 2c. One of either the lower solid rubber layer 2a and 2c may be eliminated. A stack or lamination comprised of multiple solid rubber layer and multiple sponge rubber layers may also be used.

Figure 23:
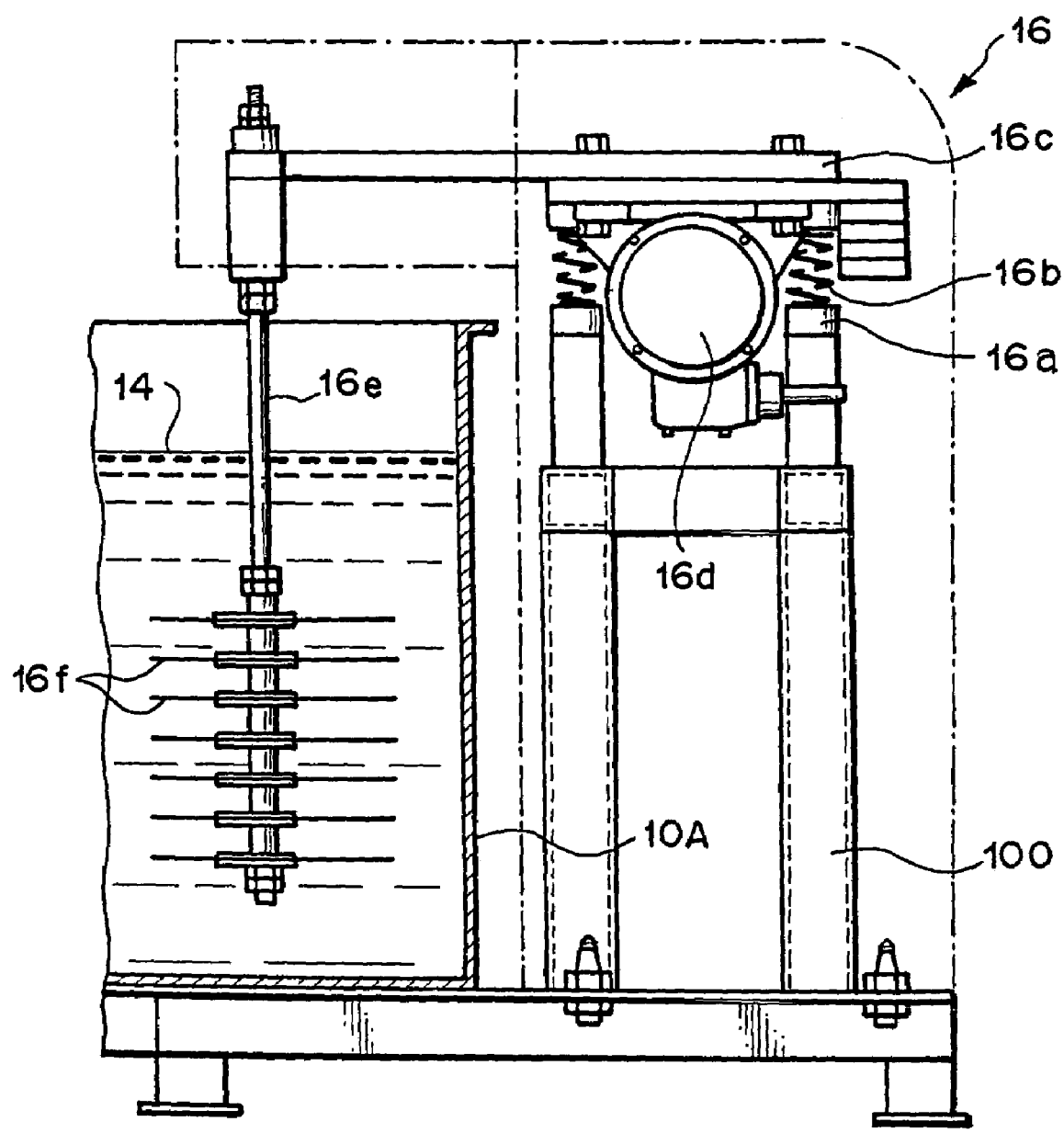
FIG. 23 is a cross sectional view showing a variation of the vibration stirring means.

FIG. 23 is a view showing a variation of the vibration stirring means 16. In this example, the vibration motor 16d is installed on the side of the electrolytic cell 10A. The vibration member 16c extends horizontally above the electrolytic cell 10A. The vibration member 16c is installed onto the vibrating rod 16e. A structure of this type allows the lid member 10B to be easily attached or detached from the electrolytic cell 10A. FIG. 23 only shows the vibration stirring means 16 positioned on one side of the electrolytic cell 10A. However the vibration stirring means 16 may also be installed on both sides of the electrolytic cell 10A.

The present invention can also be applied to gas generator devices to separate and recover the hydrogen and oxygen by electrolysis by installing a film between the anode and cathode to separate the hydrogen and oxygen. This type of separation and recovery gas generator is described for example, in a report entitled, "Development of 2500 cm$^2$ Solid Polymer Electrolyte Water Electrolyzer in WE-NET" by M. Yamaguchi, et al.

In the present invention, by installing the vibration stirring member of the vibration stirring means to face at least one surface of the anode member and the cathode member, a high gas generation rate can be achieved even with one anode member or cathode member and based on this fact, a high gas generation amount can be obtained per each device.

Figure 24:
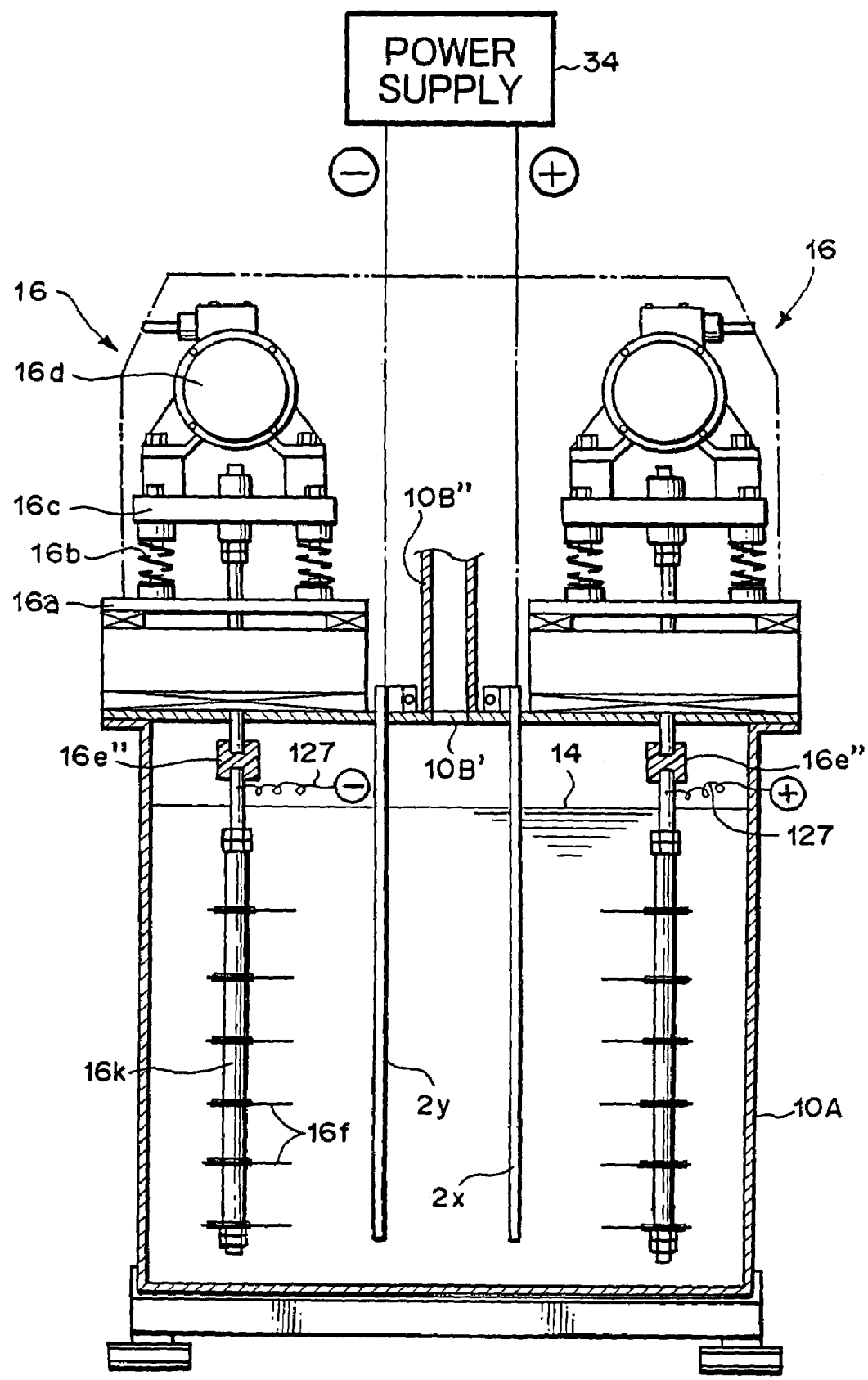
FIG. 24 is a cross sectional view showing the structure of the hydrogen-oxygen gas generator of the present invention.
Figure 25:
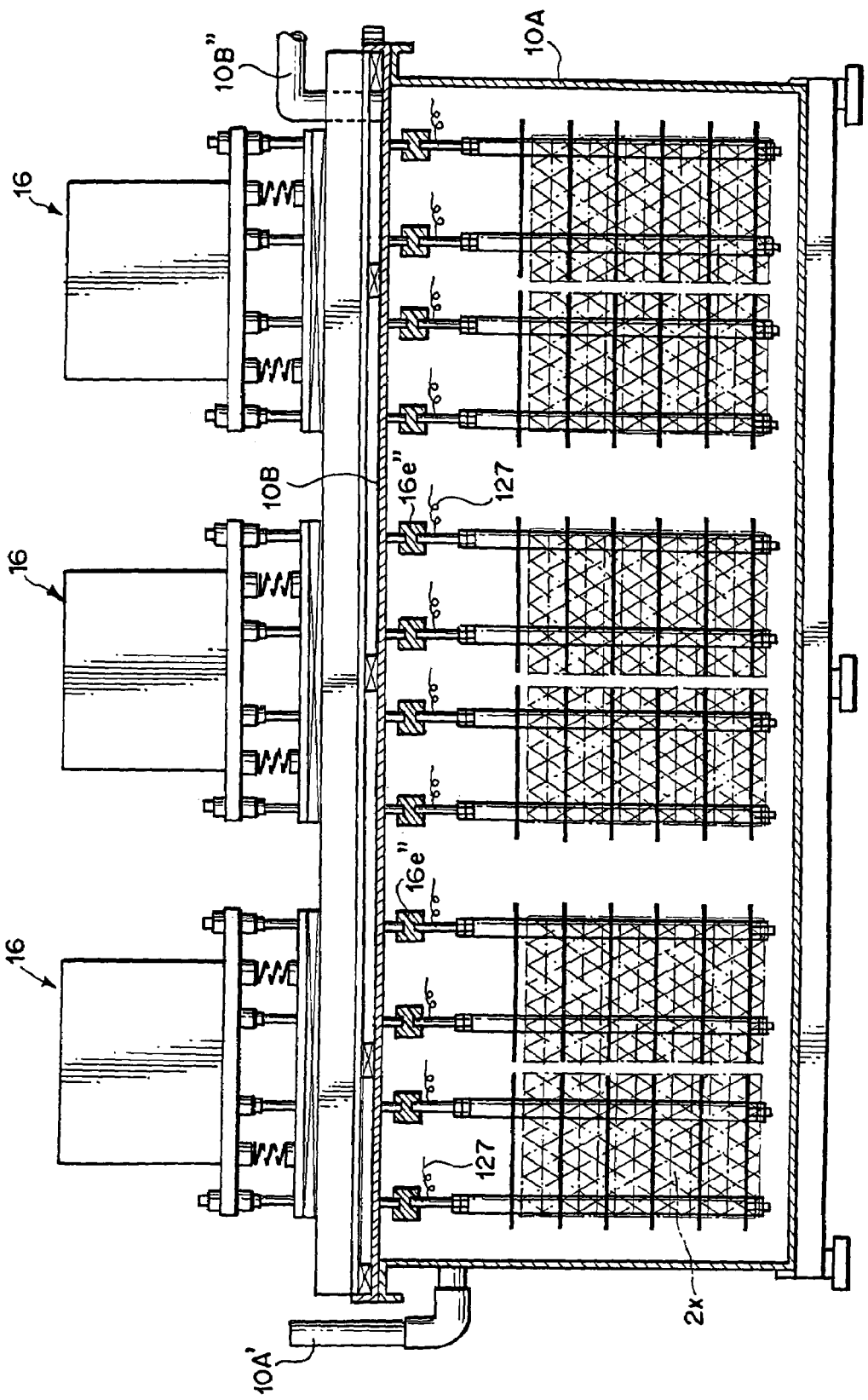
FIG. 25 is a cross sectional view of the apparatus shown in FIG. 24.
Figure 26:
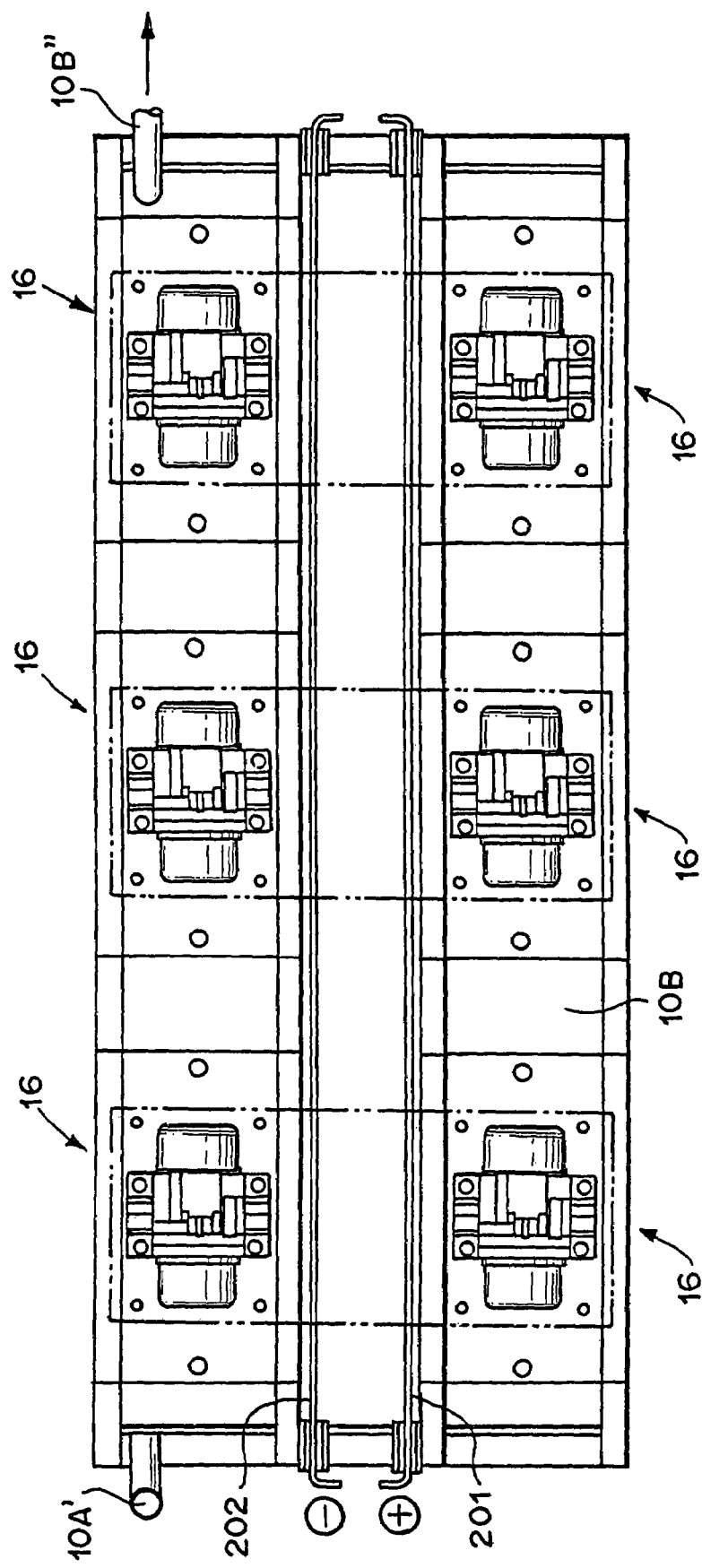
FIG. 26 is a flat view of the apparatus shown in FIG. 24.

FIG. 24 through FIG. 26 are drawings showing the structure of the embodiment of the hydrogen-oxygen gas generator of the present invention. Here, FIG. 24 and FIG. 25 are cross sectional views and FIG. 26 is a flat view.

The present embodiment uses an insulated type of vibration stirring means. In other words, a vibrating rod upper section 16e' installed on the top edge of the vibration member 16c, and an insulation area 16e" on the lower part of that vibrating rod upper section are utilized as the insulated vibration stirring member.

A transistor inverter for controlling the frequency of the vibration motor 16d is installed between the vibration motor 16d and the power supply not shown in drawing (for example 200 volts) for driving that motor 16d. The drive means for this vibration motor 16d can also be used in the other embodiments of the present invention. The vibration motors 16d vibrate at 10 to 500 hertz under control of the inverter 35. These vibration motors 16 preferably vibrate at 10 to 500 hertz. The vibration generated by the vibration motors 16d is transmitted to the vibrating blade 16f by way of the vibrating member 16c and the vibrating rods (16e, 16e', 16e"). In the description hereafter, for the purposes of simplicity, only the reference number 16e is used to represent the vibrating rods.

Figure 27:
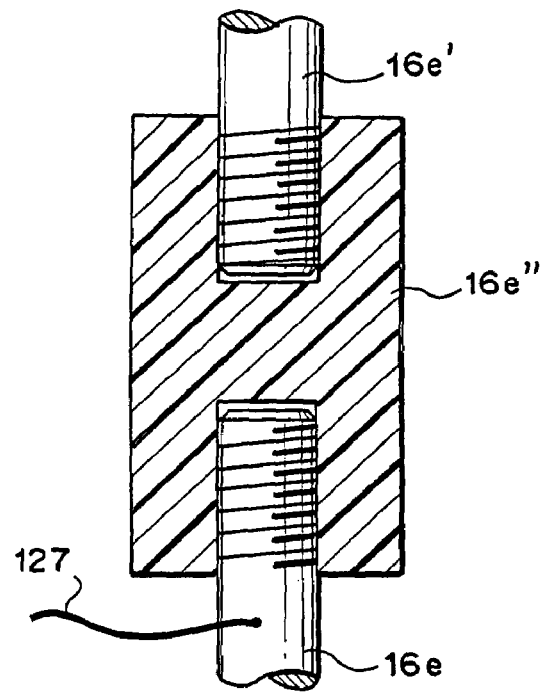
FIG. 27 is an enlarged cross sectional view in the vicinity of the electrical insulation area of the vibrating rod.
Figure 28:
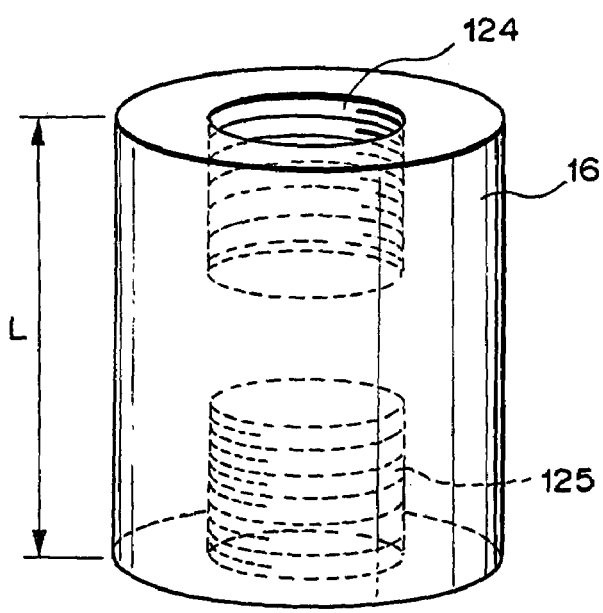
FIG. 28 is a perspective view of the electrical insulation area of the vibrating rod.
Figure 29:
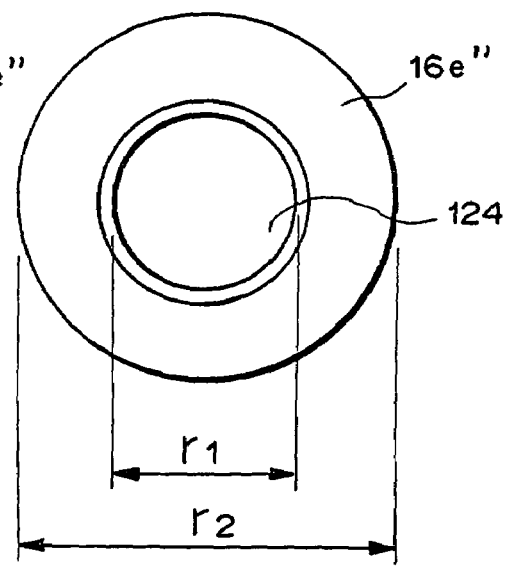
FIG. 29 is a flat view of the electrical insulation area of the vibrating rod.

FIG. 27 is an enlarged fragmentary cross sectional view showing the vicinity of the electrical insulation area 16e" on the vibrating rod. FIG. 29 is a perspective view showing the electrical insulation area 16e". FIG. 7 is a flat view of that electrical insulation area.

The electrical insulation area 16e" can be formed for example from plastic or rubber. The electrical insulation area 16e" is a structural part on the vibrating rod so preferably material should be selected that is able to sufficiently transmit the vibration of the vibrating motor without breaking due to the vibration and also have good insulating properties. In view of these conditions hard rubber is most preferable. One potential material is hard polyurethane rubber. If the member comprised only of insulation material has insufficient strength then a member made only of insulating material can for example be augmented with metal to obtain the required mechanical strength.

The electrical insulation area 16e" more specifically may be made from a cylindrical insulating member (optional shape such as a polygon) manufactured from hard rubber as shown in the drawing. Insertion holes 124, 125 are formed in the center upper and lower sections to allow insertion respectively of the vibrating rod upper section 16e' and a vibrating rod lower section 16e. These holes do not allow passage all the way through (are not open on both sides) and the blocked section of the hole therefore functions as an insulating section.

If these upper and lower insertion holes are formed to allow passage all the way through (open on both sides) then insulation material can be filled into the hole spaces for those spots where the rod is not inserted through or a space allowing sufficient insulation can be established so that the vibrating rod upper section 16e' and a vibrating rod lower section 16e do not make contact. The cylindrical insulation material for the insertion holes 124, 125 functions to couple the vibrating rod upper section 16e' and vibrating rod lower section 16e. This coupling may be made with a setscrew (For example, cutting the male screws on the top edge of vibrating rod lower section 16e and the bottom edge of vibrating rod upper section 16e', cutting the female screws in insertion holes 124, 125, and joining both of them. Also applying a washer on the joint if further needed, and clamping with a machine screw.) or joining them with adhesive. Any other kind of structure may be used for this section as long as it can achieve the object of the present invention.

For example, when the vibrating rod has a diameter of 13 millimeters, the insulation area 16e" has a length (height) L for example of 100 millimeters, the outer diameter $r_2$ for example is 40 millimeters, and the inner diameter $r_2$ of the insertion holes 124, 125 is 13 millimeters.

As shown in FIG. 27 and in FIG. 24 through FIG. 25, an electrical line 127 connects to the upper section of vibrating rod lower section 16e from directly below the electrical insulation area 16e". This electrical line 127 is connected to a power supply 34. Here, as shown in FIG. 1, the electrical line 127 is connected to the positive electrode of the vibration stirring means 16 (end closer to anode member 2x). The electrical line 27 connects to the negative electrode of the vibration stirring means 16 (end closer to cathode member 2y). The anode member 2x and the cathode member 2y are respectively connected to the anode main bus-bar 201 and the cathode main bus-bar 202 via the power supply 34 as shown in FIG. 26.

The vibrating rod lower section 16e, vibrating blade clamp member 16j and vibrating blade 16f are an electrically conductive member such as metal. In this way, the vibrating rod lower section 16e, the vibrating blade clamp member 16j and vibrating blade 16f of one vibration stirring means can be utilized as the anode member; and the vibrating blade clamp member 16j and vibrating blade 16f of the other vibration stirring means can be utilized as the cathode member. Electrical current can then be supplied to both (anode and cathode) members and electrolysis can be performed.

In the present embodiment, when using the vibrating blade 16f as the anode member or as the cathode member, and if not using in particular any separate additional anode members or cathode members, then the surface area of the vibrating blades should preferably be increased as much as possible. To accomplish this, the length of the vibrating blades should preferably be selected by a length L2 showing the second peak and a length L3 showing the third peak.

In the present embodiment, electrolysis is performed while vibrating and stirring the electrolytic fluid with an insulated vibration stirring means. Here, electrolysis can be performed the same as when using a non-insulated vibration stirring means, and the distance between the anode member and the cathode member set from 20 to 400 millimeters in order to allow electrolysis without any electrical shorts occurring.

The anode member 2x may use the materials described in the embodiment or materials containing platinum, platinum alloy, platinum family metals, materials such as nickel, nickel alloy, iron, iron alloy, carbon steel, or stainless steel etc.

In the present embodiment, the vibrating rod upper section 16e' is electrically insulated from the vibrating rod lower section 16e by the insulation area 16e" so there is no effect on the vibrating motors 16d from the power conducting by way of the vibrating rod lower section 16e. Also in this embodiment, the insulation area 16e" has heat insulating properties so the vibrating rod lower section 16e is also heat-insulated from the vibrating rod upper section 16e', so there is little effect from the temperature of the processing liquid 14 on the vibrating motors 16d.

Also in this embodiment, the presence of the insulation area 16e" has the benefit that there are no effects from electrical conduction within the electrolytic cell 14 on the vibrating motors 16d, even if performing electrolysis without using an anode member or a cathode member for the vibrating blade of the insulated vibration stirring means.

Figure 30:
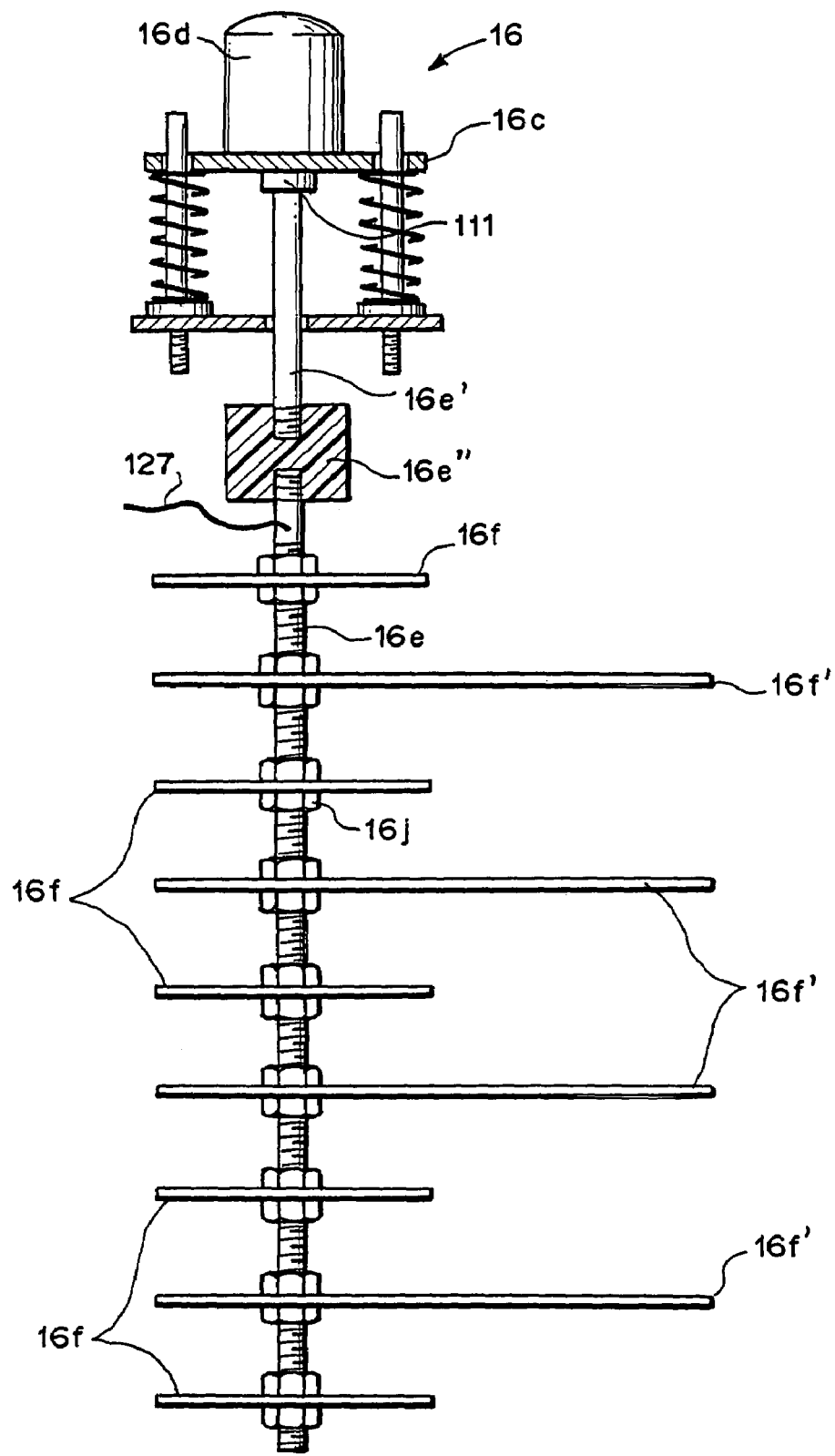
FIG. 30 is a side view of the insulated vibration stirring means.

FIG. 30 is a side view showing another embodiment of the insulated vibration-stirring means of the present invention. This embodiment differs from the embodiment of FIG. 1 only in that the electrode support blades 16f' are installed on the vibrating rod lower section 16e at mutually alternate positions versus the vibrating blade 16f. The electrode support blade 16f' is electrically connected to the vibrating rod lower section 16e and functions as one electrode when applying power to the processing fluid 14 and therefore does not require a vibration-stirring function. The purpose of the electrode support blade 16f' is to increase the electrode surface area and to decrease the gap between that electrode and the electrode on the opposite side so the size (surface area) of the electrode support blade 16f' is preferably larger than the vibrating blade 16f. Also, as shown in the drawing, the tip (right edge) of the electrode support blade 16f'" preferably protrudes farther to the right than the tip (right edge) of the vibrating blade 16f.

The electrode support blade 16f'" is preferably installed at a position intermediate between the vibrating blade and the vibrating blade on the vibrating rod. However the installation position is not limited to this position and may be installed at a position in proximity to a vibrating blade from above or below as long as there is not a drastic reduction in the vibration-stirring effect. The electrode support blade 16f'" can be installed on the vibrating rod lower section 16e in the same way as the vibrating blade 16f was installed.

The material of the electrode support blade 16f'" may be any material allowing use as an electrode. However since it must vibrate along the vibrating rod it must be sufficiently tough to withstand vibration. A conductive piece capable of use as a vibrating blade may for example by made of titanium (platinum plating can be deposited on its surface) or stainless steel (capable of allowing deposition of a platinum plating on its surface). The vibrating blade 16f need not always be an electrically conductive material when using the electrode support blade 16f'', and may be made of plastic.

Figure 31:
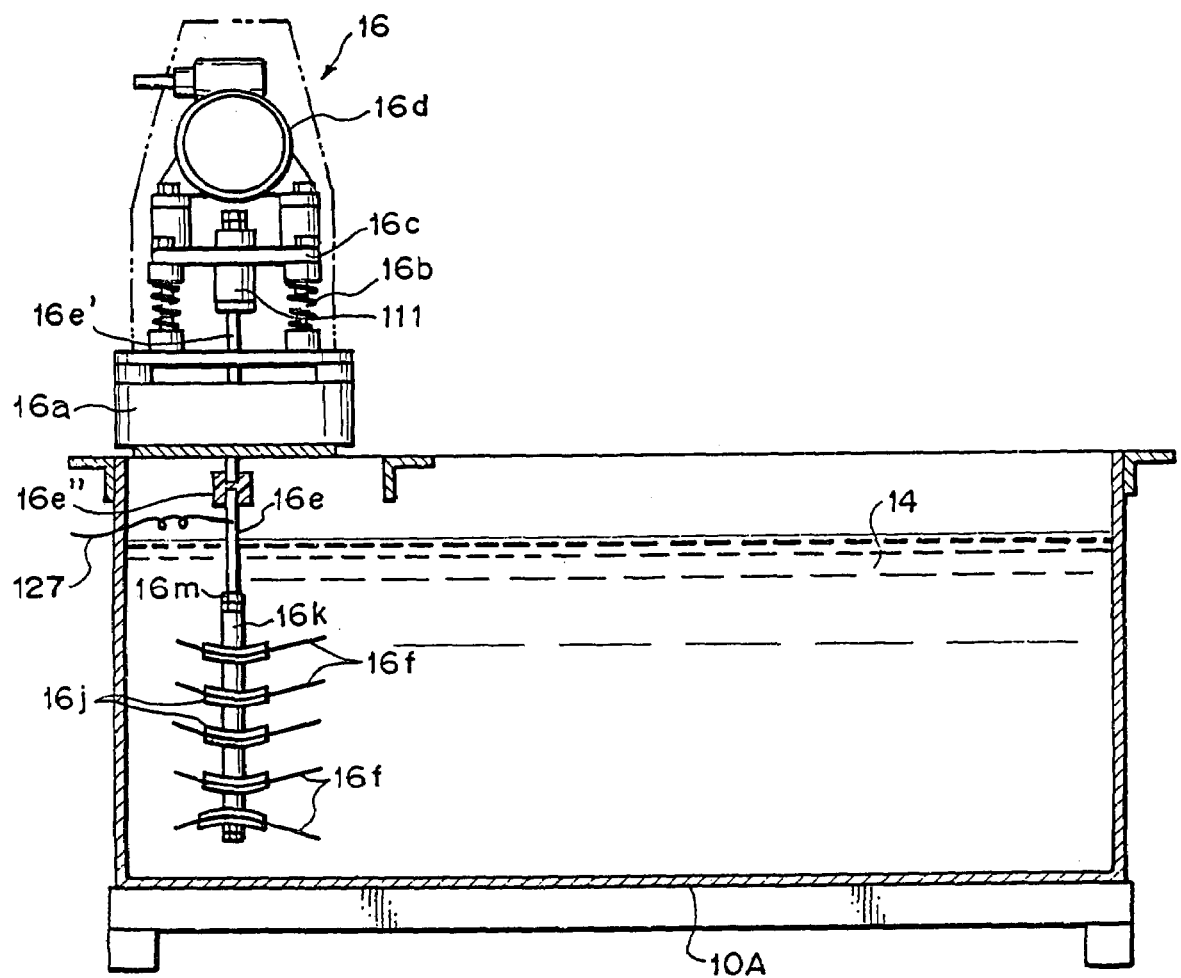
FIG. 31 is a cross sectional view of the insulated vibration stirring means.
Figure 32:
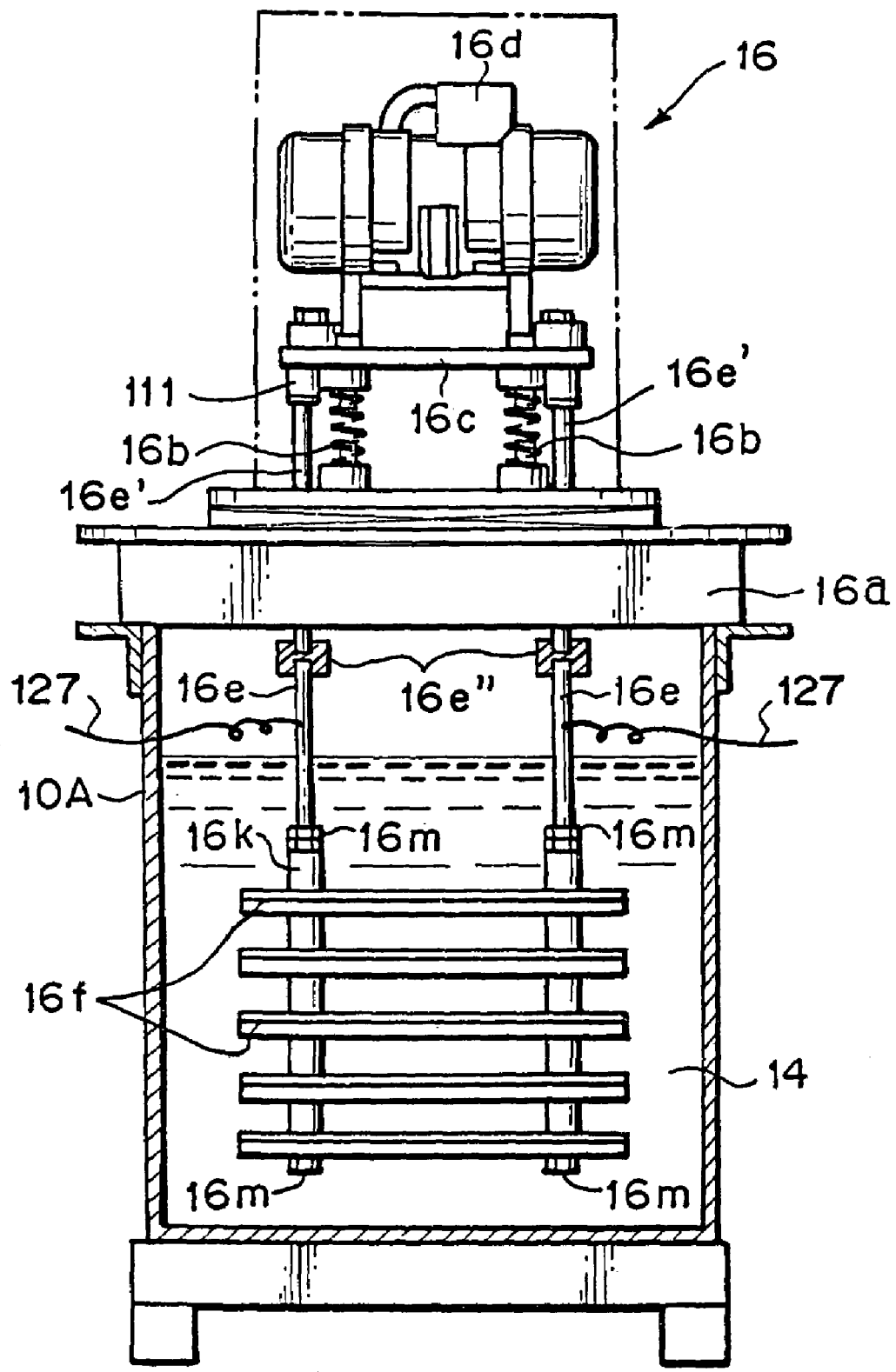
FIG. 32 is a cross sectional view of the insulated vibration stirring means.

FIG. 31 and FIG. 32 are cross sectional views of another embodiment of the insulated vibration-stirring means. In this embodiment, the vibrating blades are installed on two vibrating rods.

Figure 33:
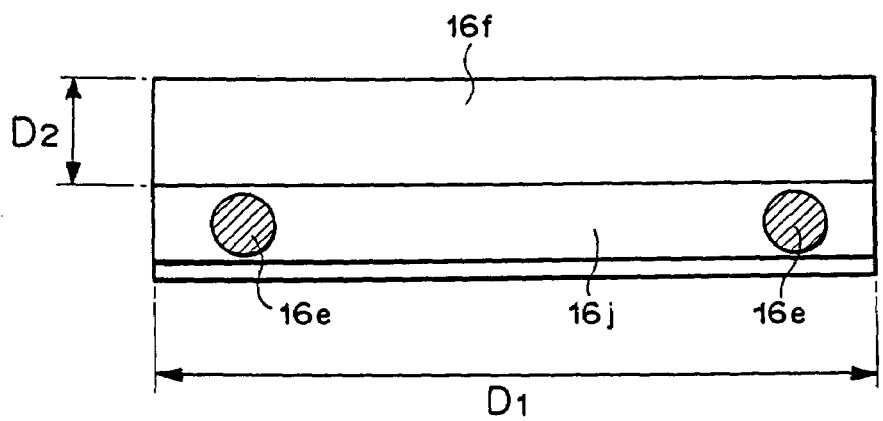
FIG. 33 is a cross sectional view showing the vicinity of the vibrating blades.

FIG. 33 is a cross sectional view showing the vicinity of the vibrating blade 16f. The section of the vibrating blade 16f protruding out from the clamping member 16j contributes to generating a vibration flow motion. This protruding section has a width $D_1$ and length of $D_2$. In this embodiment, the vibrating blades are spanning the multiple vibrating rods. The vibration surface area of the vibration blades can therefore be made sufficiently large. The surface area utilized for the electrodes can also be enlarged.

In the present embodiment, a power supply 34 of the electrolysis means as described relating to FIG. 24 through FIG. 26 is used. The present embodiment also uses electrode support blades the same as the embodiment of FIG. 30.

Figure 35:
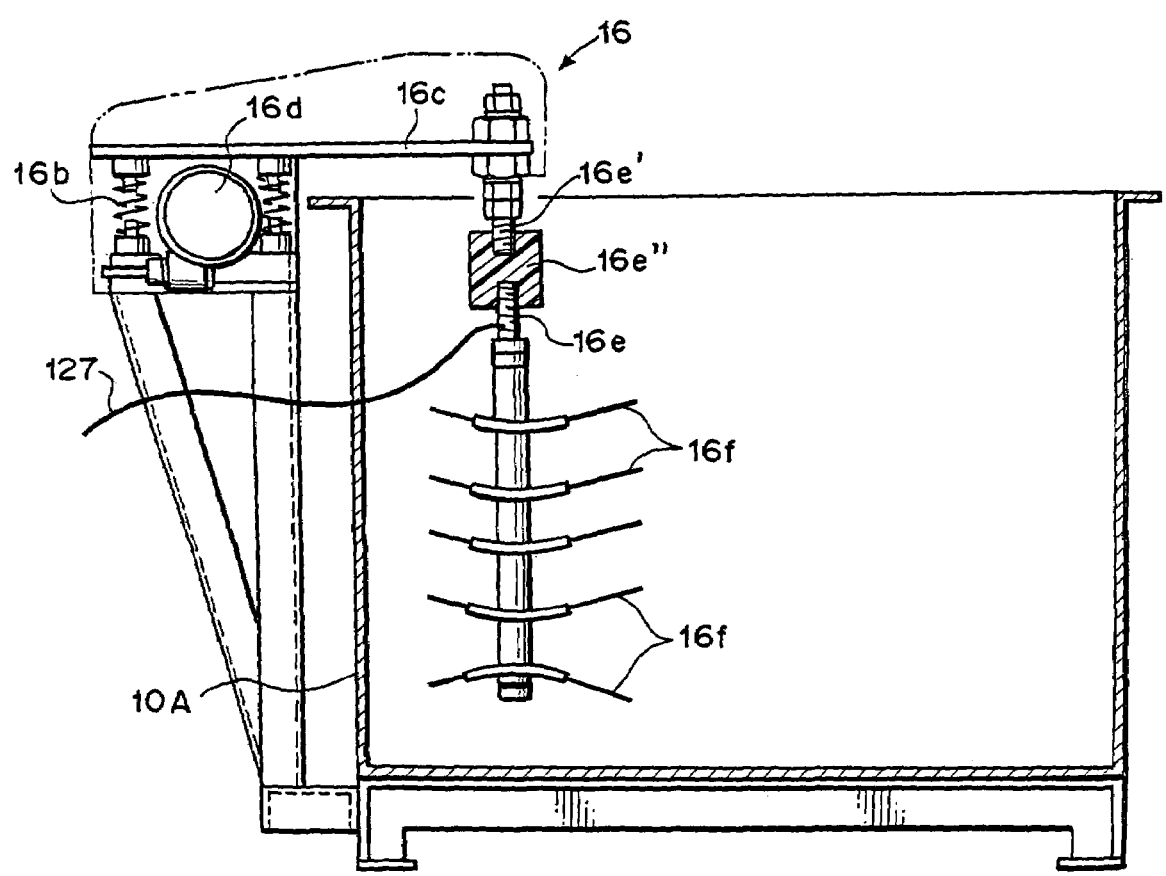
FIG. 35 is a cross sectional view of the insulated vibration stirring means.

FIG. 35 is a cross sectional view showing the structure of another embodiment of the insulated vibration stirring means. In this embodiment of the vibration-stirring means 16, the vibration motor 16d is installed outside the electrolytic cell 10A, and the vibration member 16c extends towards the electrolytic cell 10A. Though not shown in the drawing, in the present embodiment a power supply 34 for the electrolysis means as described relating to FIG. 24 through FIG. 26 is used. The present embodiment also uses electrode support blades the same as the embodiment of FIG. 30. In the figure, the insulated the vibration-stirring means 16 is installed only on one side. However the insulated the vibration-stirring means may be installed on the other side in the same way.

Figure 36:
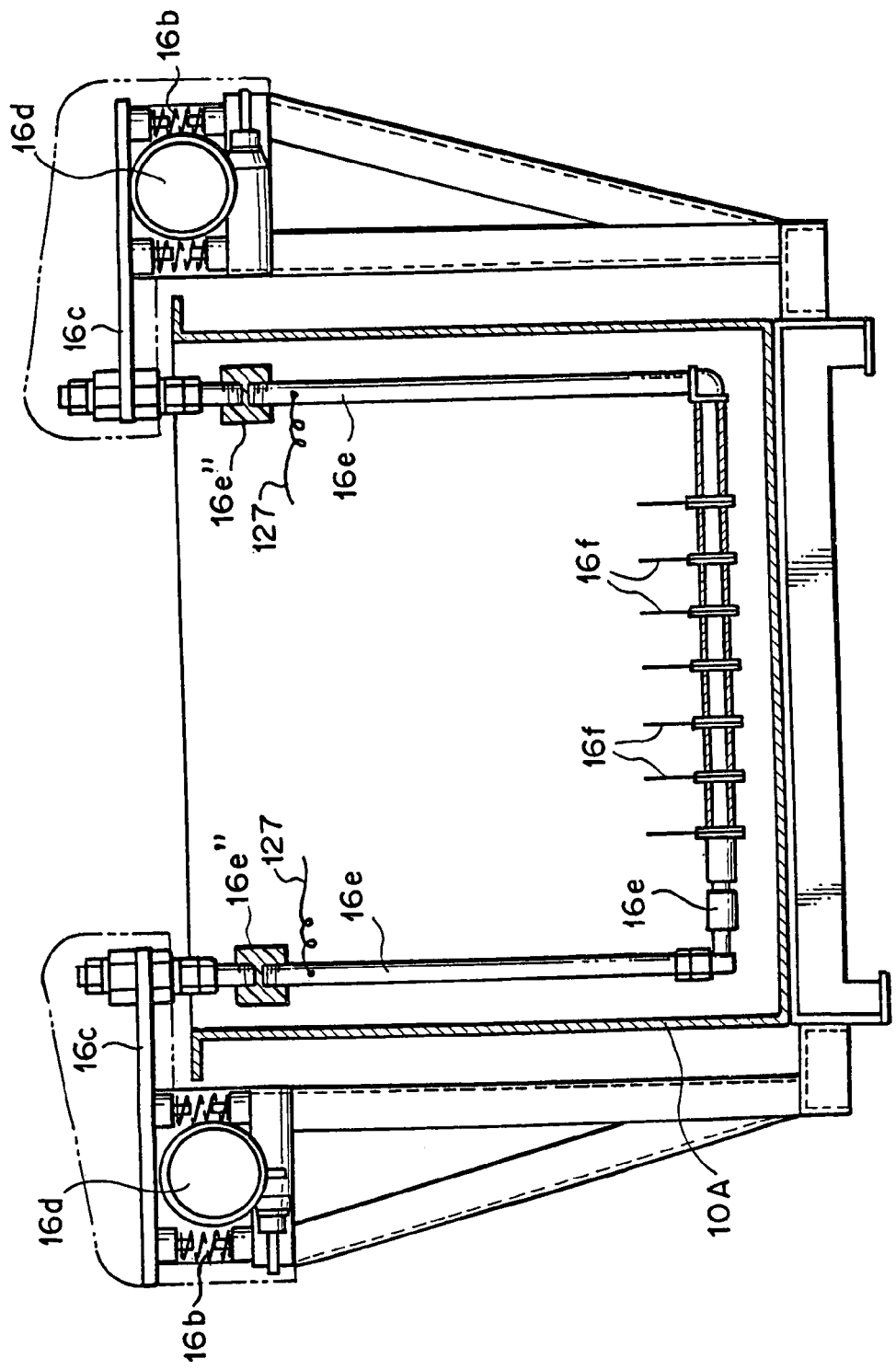
FIG. 36 is a cross sectional view of the insulated vibration stirring means.

FIG. 36 is a cross sectional view showing the structure of another embodiment of the insulated vibration stirring means. In this embodiment, the same vibration motor 16d, vibration member 16c, vibrating rod upper section 16e', and the electrical insulation area 16e'' are installed as a set on both sides of the electrolytic cell 10A the same as the embodiment of FIG. 35. Also, the vibrating rod lower section 16e is formed in the shape of a square open on the left side, and the two perpendicular sections are installed on the two corresponding insulation areas 16e''. The top edges of the two perpendicular section of 16e are respectively connected by way of the electrical insulation areas 16e'' to the vibrating rod upper section 16e'. The vibrating blade 16f is installed nearly perpendicular to the horizontal section of the vibrating rod lower section 16e. The vibrating blade 16f protrudes upward in the figure, however the vibrating blade 16f may also be made to protrude downward. The vibrating blades 16f may be installed tilted relative to the perpendicular direction, the same as previously described.

Though not shown in the drawing, the electrolysis process can be performed using the vibrating blade (of the insulated vibration stirring means) protruding upwards as the anode member, and the vibrating blade (of the insulated vibration stirring means) protruding downwards as the cathode member. In this case, the vibrating blades of the insulated vibration stirring means can be installed in mutually placed positions as described later on in FIG. 40.

In the present invention, the vibrating rod does not always have to be installed facing upwards and downwards as in the present embodiment. The vibrating rod may be installed in a shape and position to conform to the shape of the electrolytic cell etc.

Though not shown in the drawing, in the present embodiment also a power supply 34 for the electrolysis means as described relating to FIG. 24 through FIG. 26 is used. The present embodiment can also use electrode support blades the same as the embodiment of FIG. 30.

Figure 37:
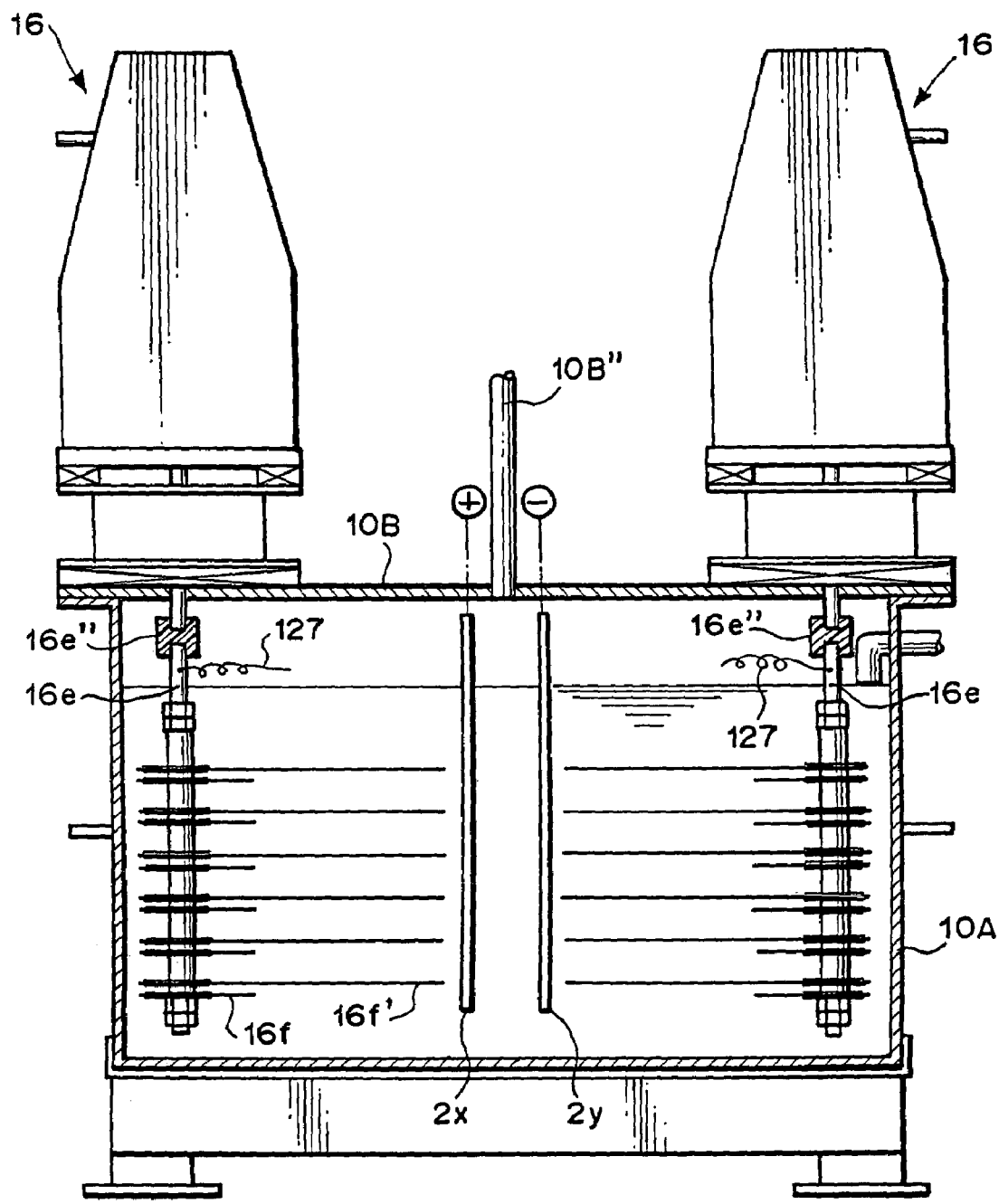
FIG. 37 is a cross sectional view showing the structure of the hydrogen-oxygen gas generator of the present invention.
Figure 38:
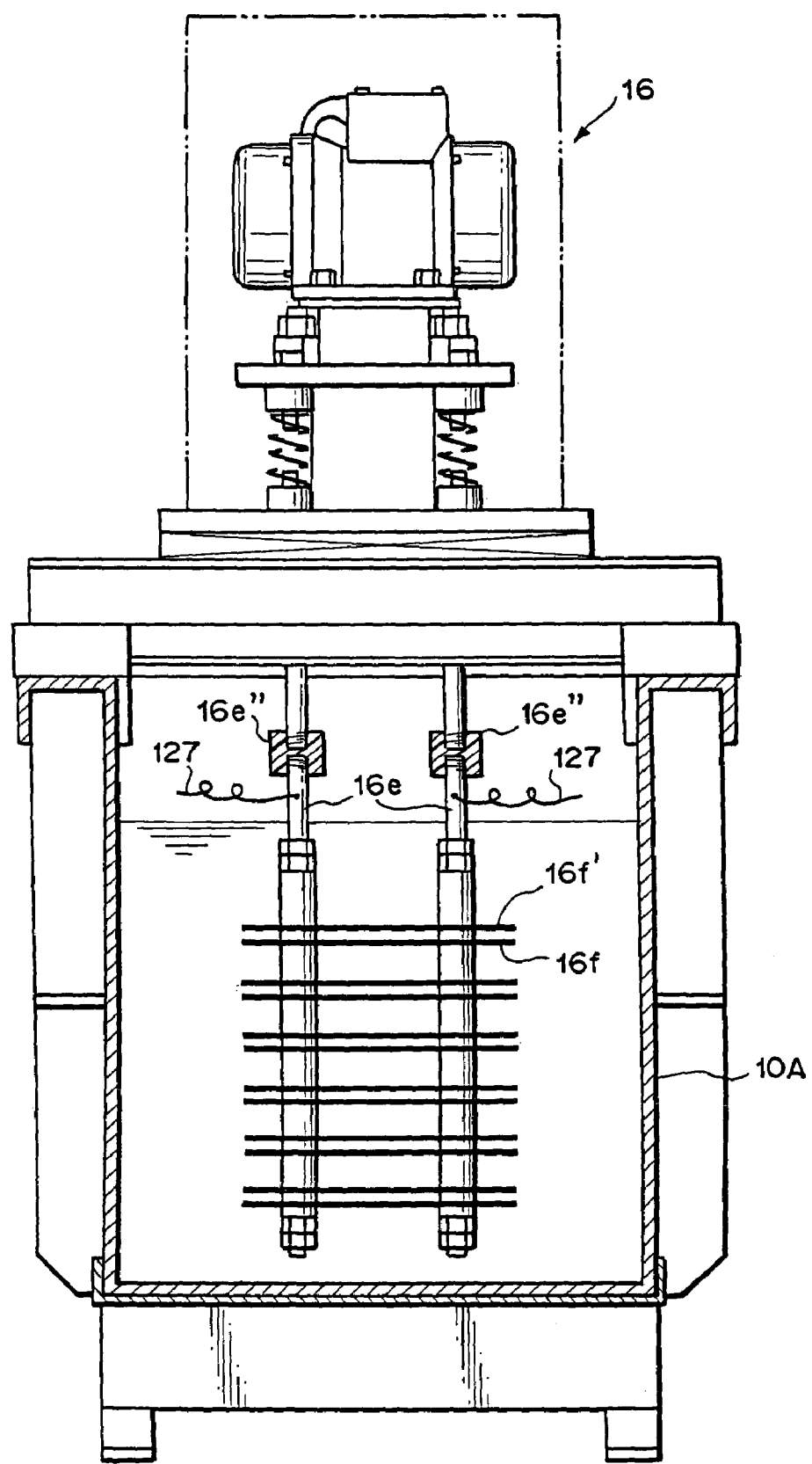
FIG. 38 is a cross sectional view of the apparatus shown in FIG. 37.
Figure 39:
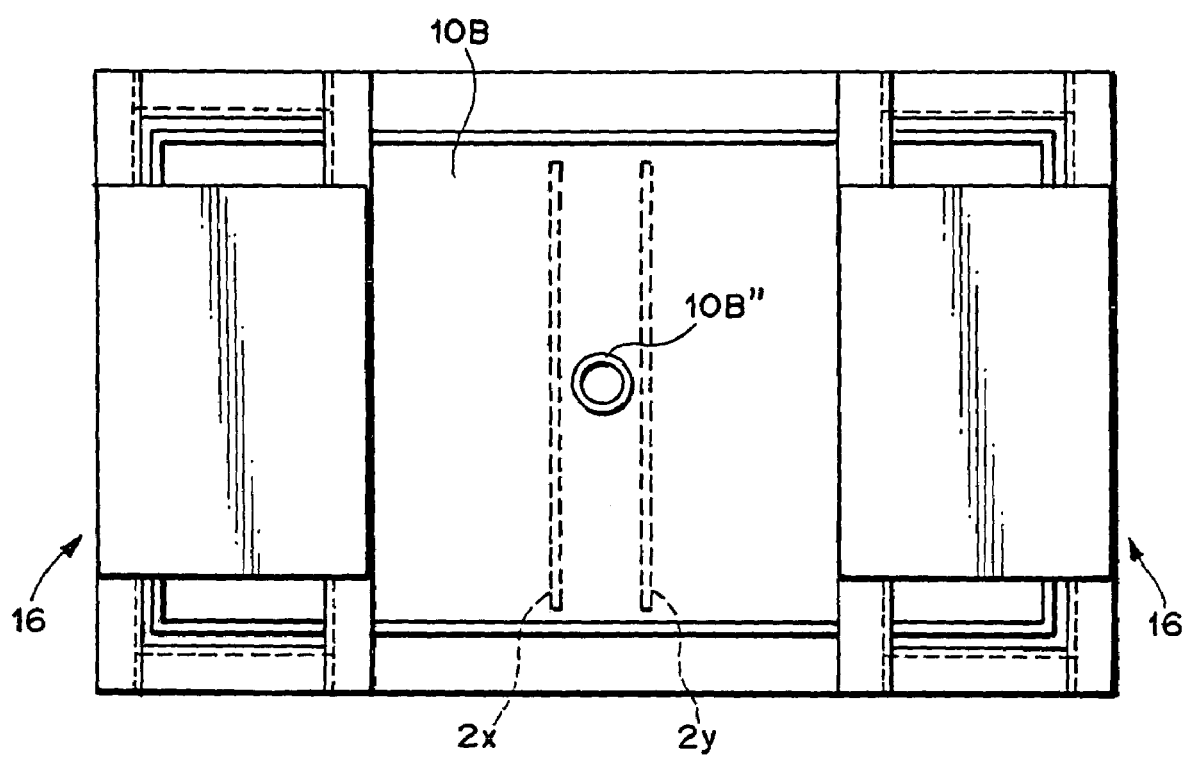
FIG. 39 is a flat view of the apparatus shown in FIG. 37.

FIG. 37 through FIG. 39 are drawings showing the structure of an embodiment of the hydrogen-oxygen gas generator implementing the hydrogen-oxygen gas generating method of the present invention. Here, FIG. 37 and FIG. 38 are cross sectional views. FIG. 39 is a flat (plan) view. The present embodiment is equivalent to the embodiment of FIG. 24 through FIG. 26 with the added use of the electrode support blade 16f.

Figure 40:
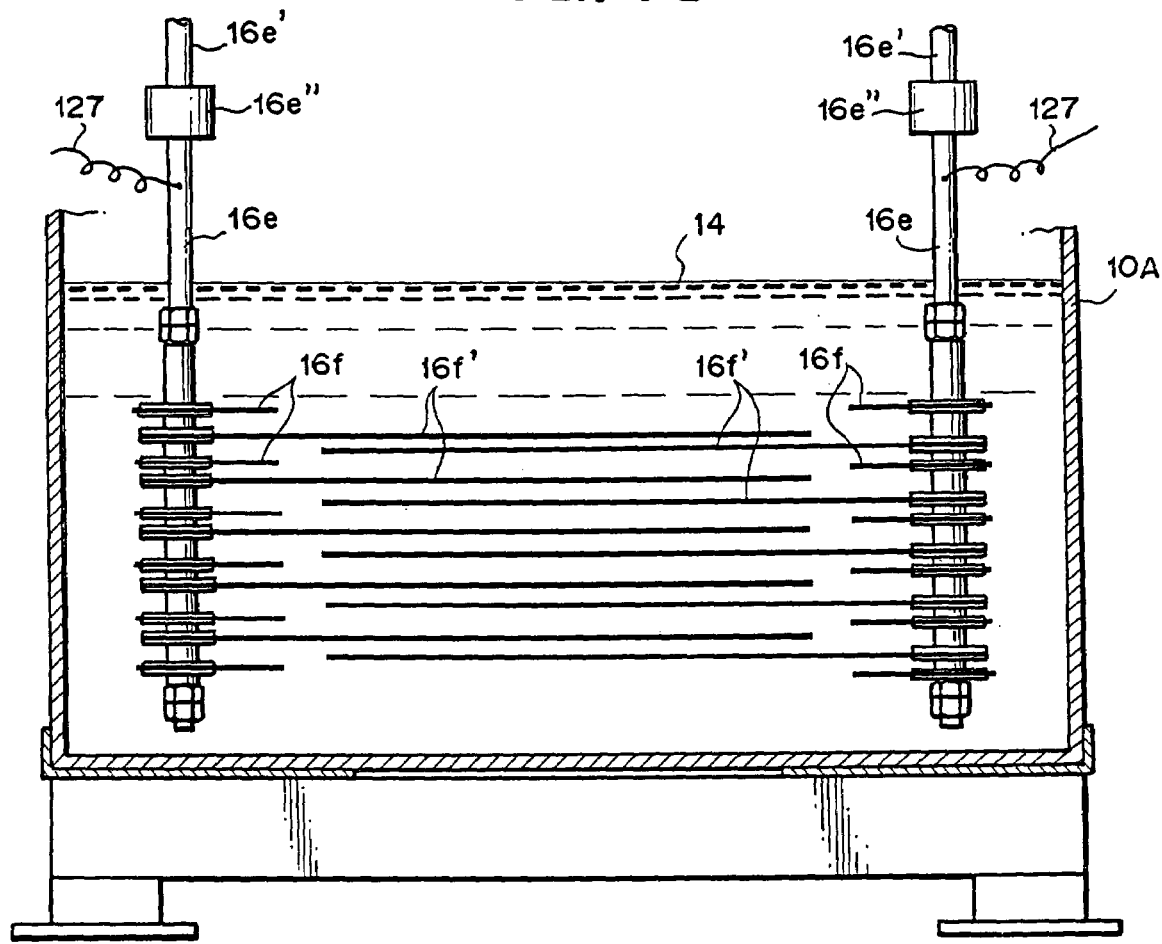
FIG. 40 is a cross sectional view showing a portion of the structure of the hydrogen-oxygen gas generator of the present invention.
Figure 41:
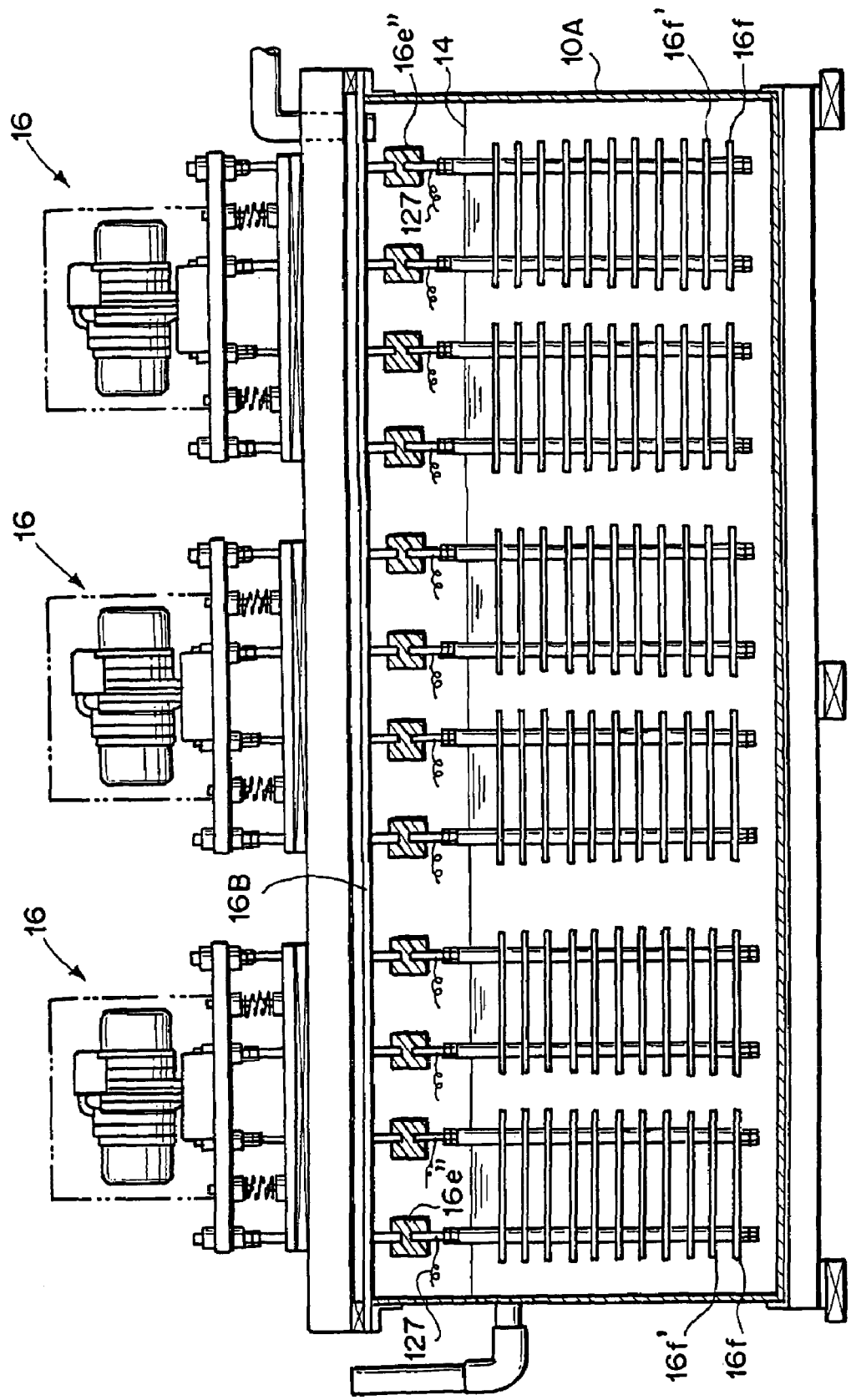
FIG. 41 is a cross sectional view of the hydrogen-oxygen gas generator shown in FIG. 40.

FIG. 40 through FIG. 41 are drawings showing the structure of an embodiment of the hydrogen-oxygen gas generator implementing the hydrogen-oxygen gas generating method of the present invention. Here, FIG. 40 is a fragmentary cross sectional view. FIG. 41 is a cross sectional view.

In the present embodiment, two insulated vibration-stirring means are installed in the processing tank 10A The electrode support blades 16f' of one insulated vibration-stirring means are positioned between the electrode support blades 16f' of the other adjacent insulated vibration-stirring means. In this way, one of the two insulated vibration-stirring means can be used as the anode member and the other used as the cathode member. This method allows installing the large size (surface area) anode and cathode in close mutual proximity to each other. This method also allows a drastic improvement in the electrical current density. This installation with the anode member and the cathode member mutually inter-positioned in a non-contact state allows the vibration blades of the two insulated vibration stirring means to mutually operate in the same way.

In the present embodiment, the distance between the anode member (vibrating blade or electrode support blade) and the cathode member (vibrating blade or electrode support blade) mutually installed in proximity and facing upwards/downwards is 5 to 50 millimeters.

Figure 34:
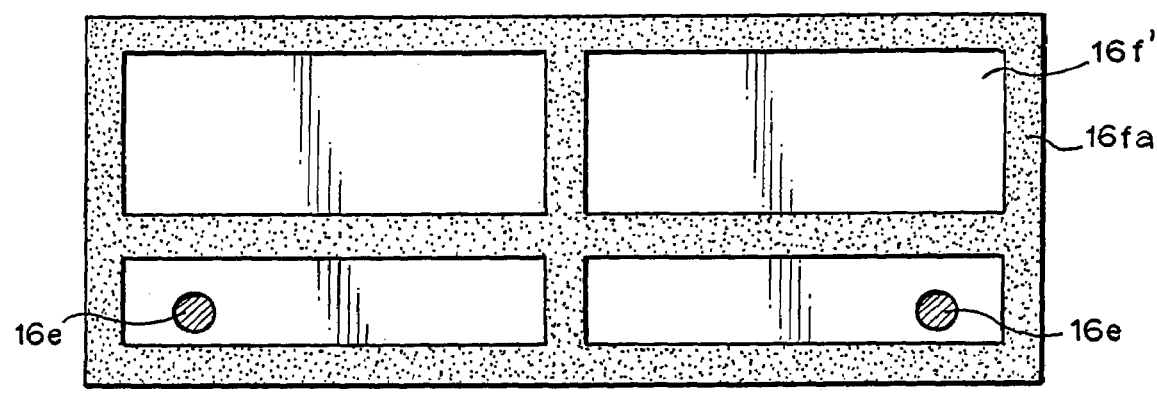
FIG. 34 is a drawing showing the electrode support blade.

In the present embodiment, insulating tape 16fa is preferably affixed or a coating with an insulating material applied to the outer circumferential surfaces on both sides of the electrode support blades 16f' as shown in FIG. 34 to form an insulated section on these surfaces and prevent electrical shorts from occurring due to contact between the electrode support blades 16f' of the two insulated vibration-stirring means. These vibrating blades 16f used as the electrode material may be installed at mutually different positions versus each other and in an insulated section can be formed in this case also. Another possible technique to obtain the same insulating effect is installing plastic insulated plates having an equivalent shape.

Figure 42:
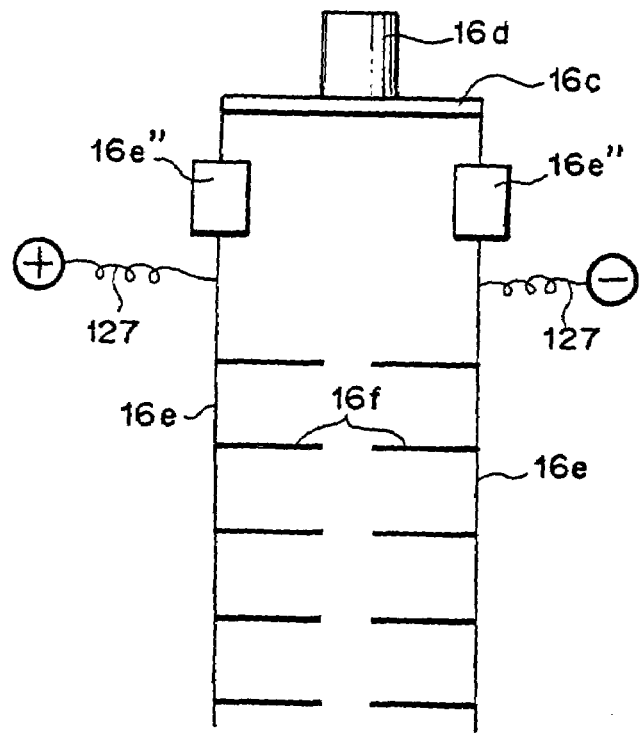
FIG. 42 is a cutaway view showing the structure of the insulated vibration stirring means.
Figure 43:
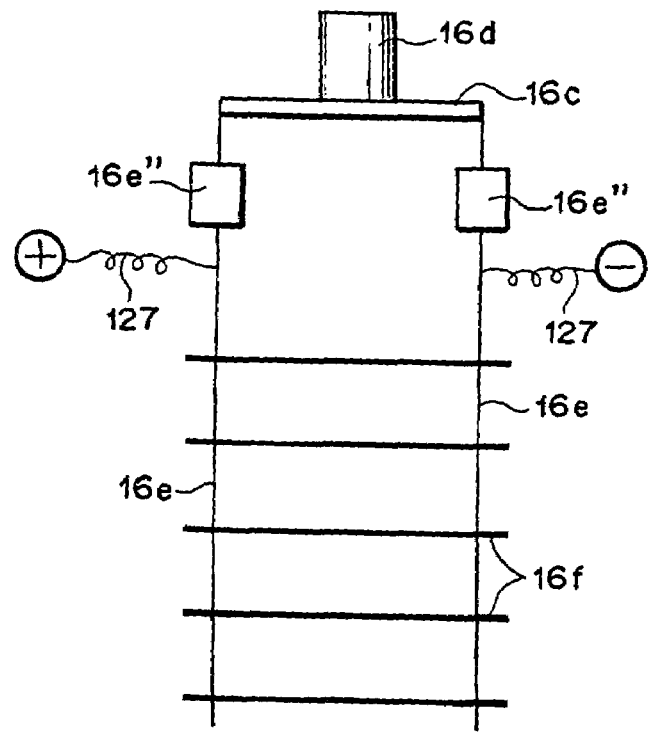
FIG. 43 is a cutaway view showing the structure of the insulated vibration stirring means.
Figure 44:
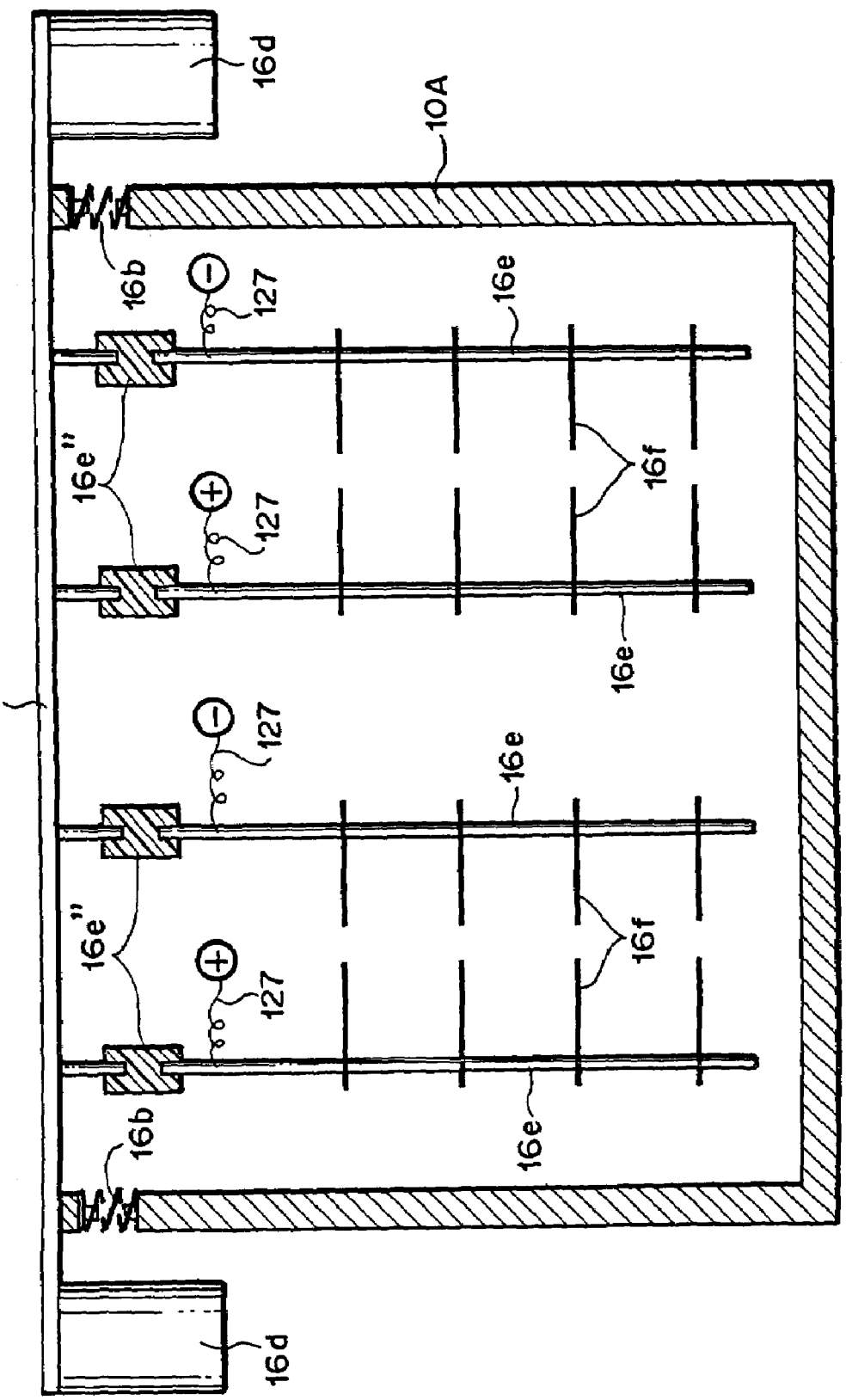
FIG. 44 is a cutaway view showing the structure of the insulated vibration stirring means.

FIG. 42 through FIG. 44 are concept views showing the insulated vibration-stirring means. In these examples, multiple vibrating rods are connected to joint vibration members 16c. The electrical line 127 connecting to each vibrating rod lower section 16e connects to respective power supplies however the present invention is not limited to this method and changes may be made as required.

In the above embodiments, a section of the insulated vibration-stirring member (for example, the vibrating blade, electrode support blade) was utilized as the anode member or the cathode member. However high gas generation efficiency can be obtained based on the a high gas generation output per device, even with an anode member or cathode member other than on the insulated vibration-stirring means.

Figure 45:
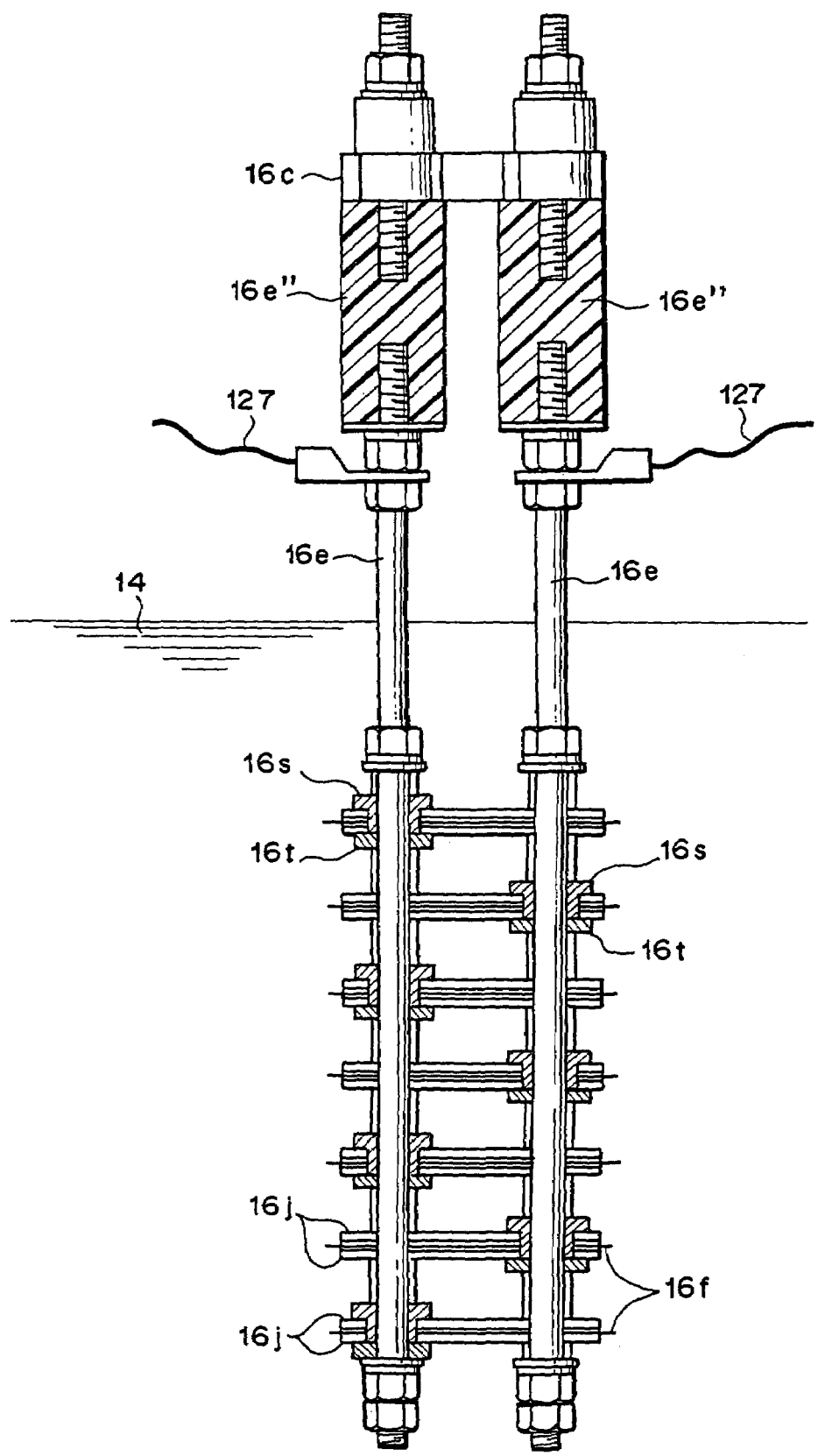
FIG. 45 is a cross sectional view showing a portion of the insulated vibration stirring means.
Figure 46:
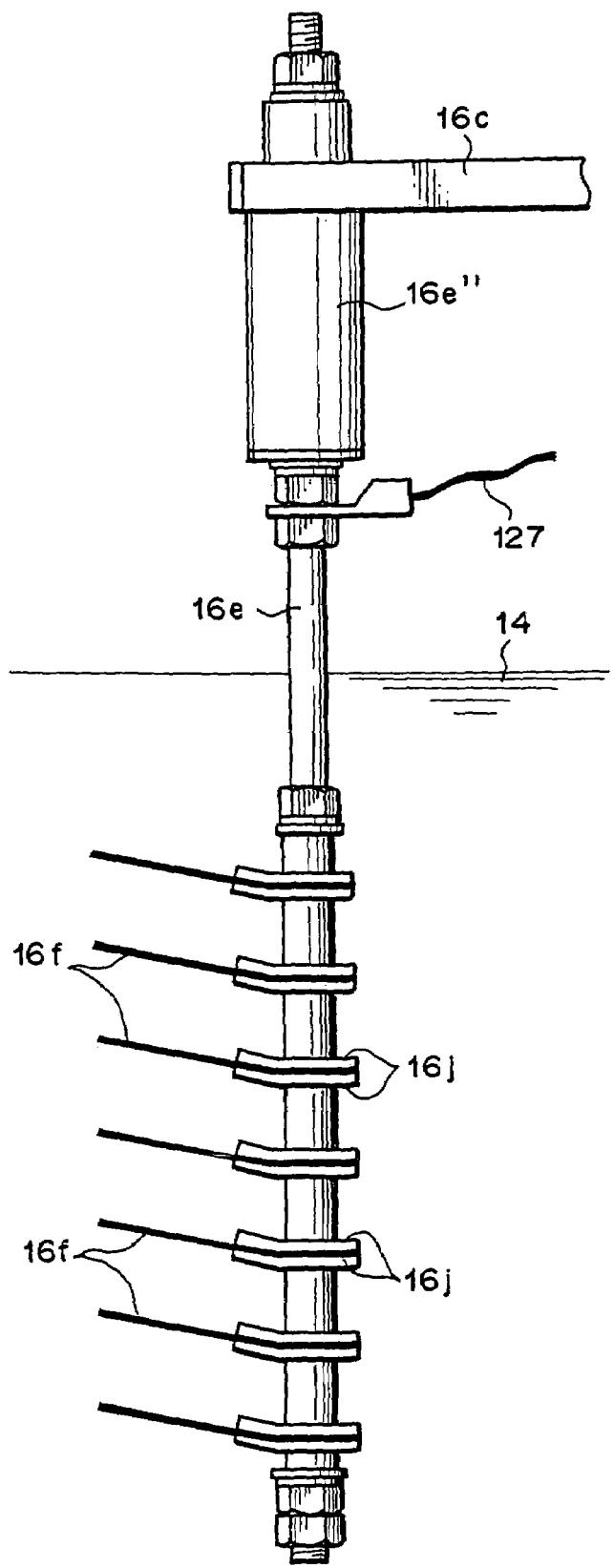
FIG. 46 is a flat view of the apparatus shown in FIG. 45.

FIG. 45 is a fragmentary cross sectional view showing the structure of another embodiment of the insulated vibration stirring means. FIG. 46 is a side view of that section.

In this embodiment, the vibrating blade 16e and clamp member 16j mechanically connecting the two vibrating rod lower sections 16e are grouped into two sets. A first set is electrically connected to the vibrating rod lower section 16e and the second set is electrically connected to the other vibrating rod lower section 16e. Voltage is applied across these two sets to conduct electrical power to the electrolytic fluid 14 and for the required processing.

In other words, in FIG. 45, the odd-numbered vibrating blades 16f and clamp members 16j are electrically connected from the upper side with the vibrating rod lower section 16e on the right side. However, the vibrating rod lower section 16e on the left side is electrically insulated by the insulation bushing 16s and insulation washer 16t. The even-numbered vibrating blades 16f and clamp members 16j are electrically connected from the upper side with the left side vibrating rod lower section 16e, and are electrically insulated from the right side vibrating rod lower section 16e by the insulation bushing 16s and the insulation washer 16t. The odd-numbered vibrating blades 16f and clamp members 16j from the upper side are therefore made the first set; and the even-numbered vibrating blades 16f and clamp members 16j from the upper side are ma!! de the second set. The electrical wire 127 connecting to the left side of vibrating rod lower section 16e, and the electrical wire 127 connecting to the right side of vibrating rod lower section 16e, apply the necessary power from the power supply not shown in the drawing. Power can in this way be supplied across the first set and second set to the processing liquid 14. The insulation bushing 16s and insulation washer 16t are omitted from the drawing in FIG. 46.

In this embodiment, the electrical insulation area 16e" is installed between the vibration rod 16e and the vibration member 16c comprising the vibration generating means. In other words, the electrical insulation area 16e" in this embodiment also functions as the attachment piece 111 for installing the vibrating rod 16e on the vibration member 16c.

In this embodiment, the vibrating blade 16f forming the anode side preferably has a surface of titanium coated with platinum. Preferably titanium is used on the vibrating blade 16f forming the cathode side.

In this embodiment, power supplied to the vibration-stirring means is only for electrolysis so the device can be made compact. Also the vibrating blades 16f can incorporate the functions of two types of electrodes and so from that viewpoint also the device can be made more compact.

Figure 47:
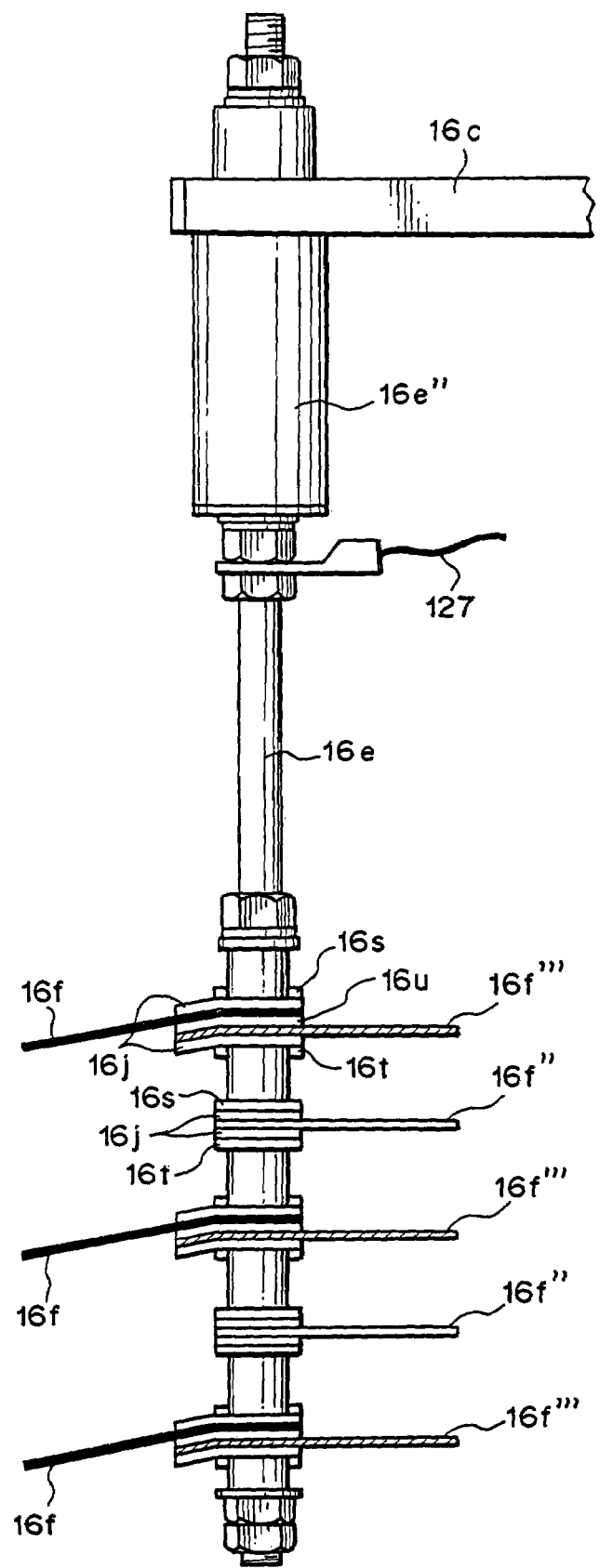
FIG. 47 is a side sectional view showing the structure of the insulated vibration stirring means.

FIG. 47 is a fragmentary side view showing another embodiment of the liquid processing apparatus using the insulated vibration stirring means of the present invention.

In this embodiment, an anode member 16f' is used instead of the upper side even-numbered blades 16f in the embodiment of FIG. 45 and FIG. 46. This anode member 16f'" does not contribute to the vibration stirring and extends only to the right side of the drawing. The anode member 16f'" preferably utilizes lath-webbed titanium (platinum plating on surface). A cathode member 16f'"' is added by way of the spacers 16u as the upper side odd-numbered blades 16f. This cathode member 16f'"' also does not contribute to the vibration stirring and extends only to the right side of the drawing. Preferably, titanium plate for example is used as the cathode member 16f'". The vibrating blade may be installed along with the anode member, the same as in the case of the cathode member.

In this embodiment, the anode member 16f'" and cathode member 16f'" are utilized separate from the vibrating blade 16f so there is more freedom in selecting the electrode material.

Figure 48:
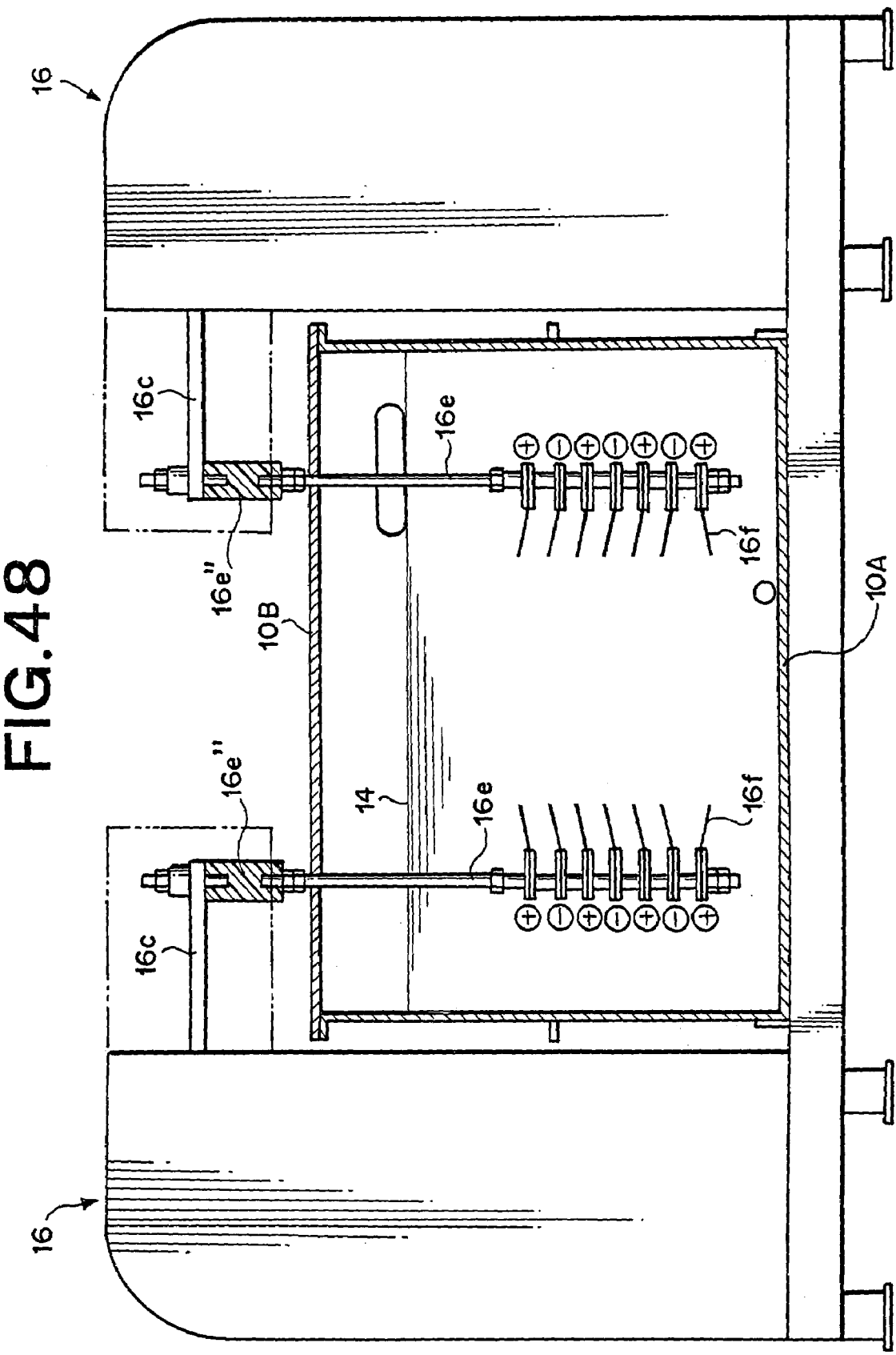
FIG. 48 is a cross sectional view showing a portion of the structure of the hydrogen-oxygen gas generator of the present invention.

FIG. 48 is a cross sectional view showing the structure of another embodiment of the hydrogen-oxygen gas generator implementing the hydrogen-oxygen gas generating method of the present invention. In the present embodiment, two insulated vibration-stirring means of FIG. 45 and FIG. 46 are installed in the electrolytic cell 10A.

In the above embodiment, an anode member and a cathode member are installed on the insulated vibration-stirring member, and electrolysis is performed by conducting electricity across the anode member and cathode member so that the device can be made more compact. Further, a high gas generation efficiency can also be obtained based on the a high gas generation output per device.

Figure 49:
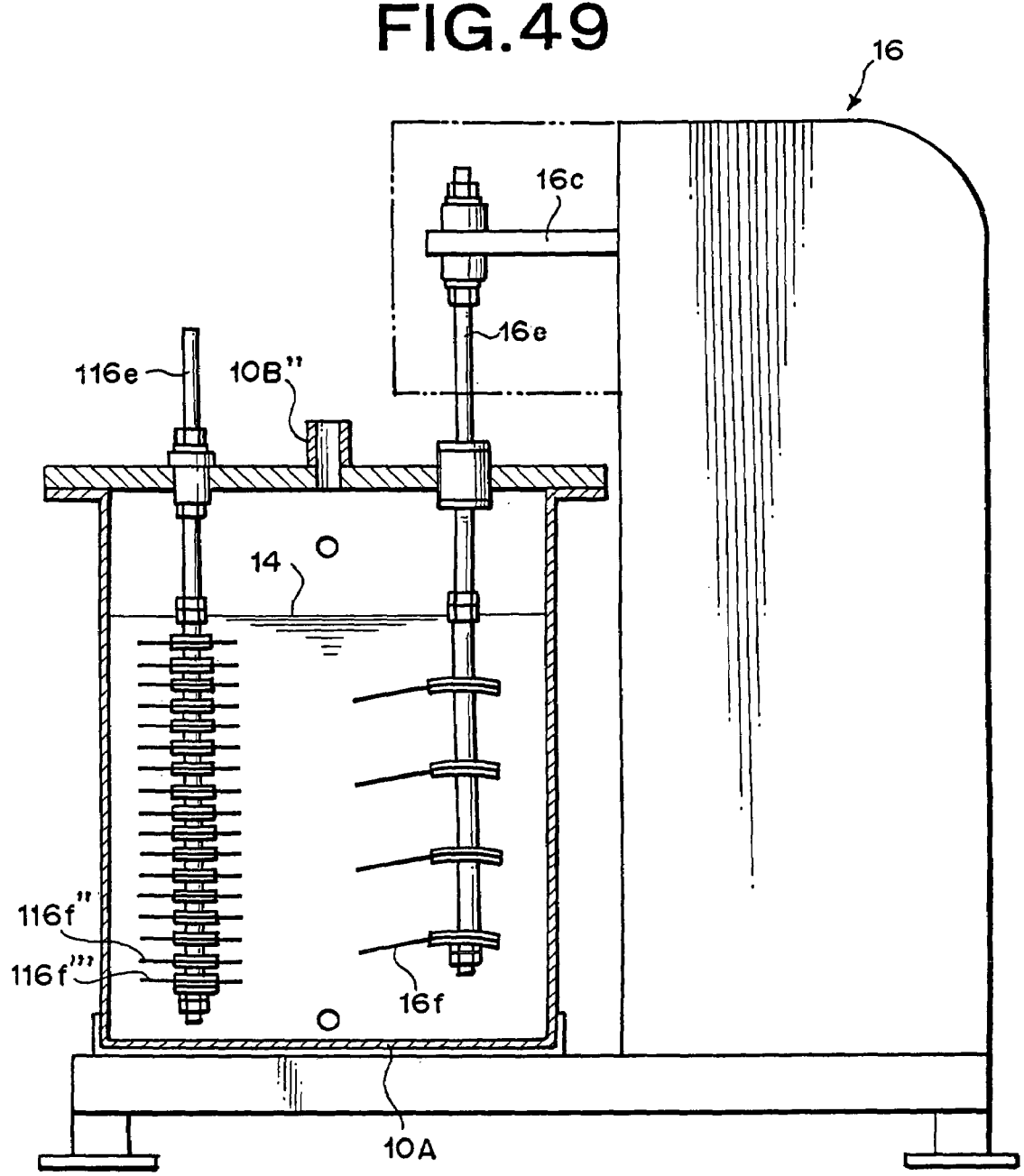
FIG. 49 is a cross sectional view showing a portion of the structure of the hydrogen-oxygen gas generator of the present invention.
Figure 50:
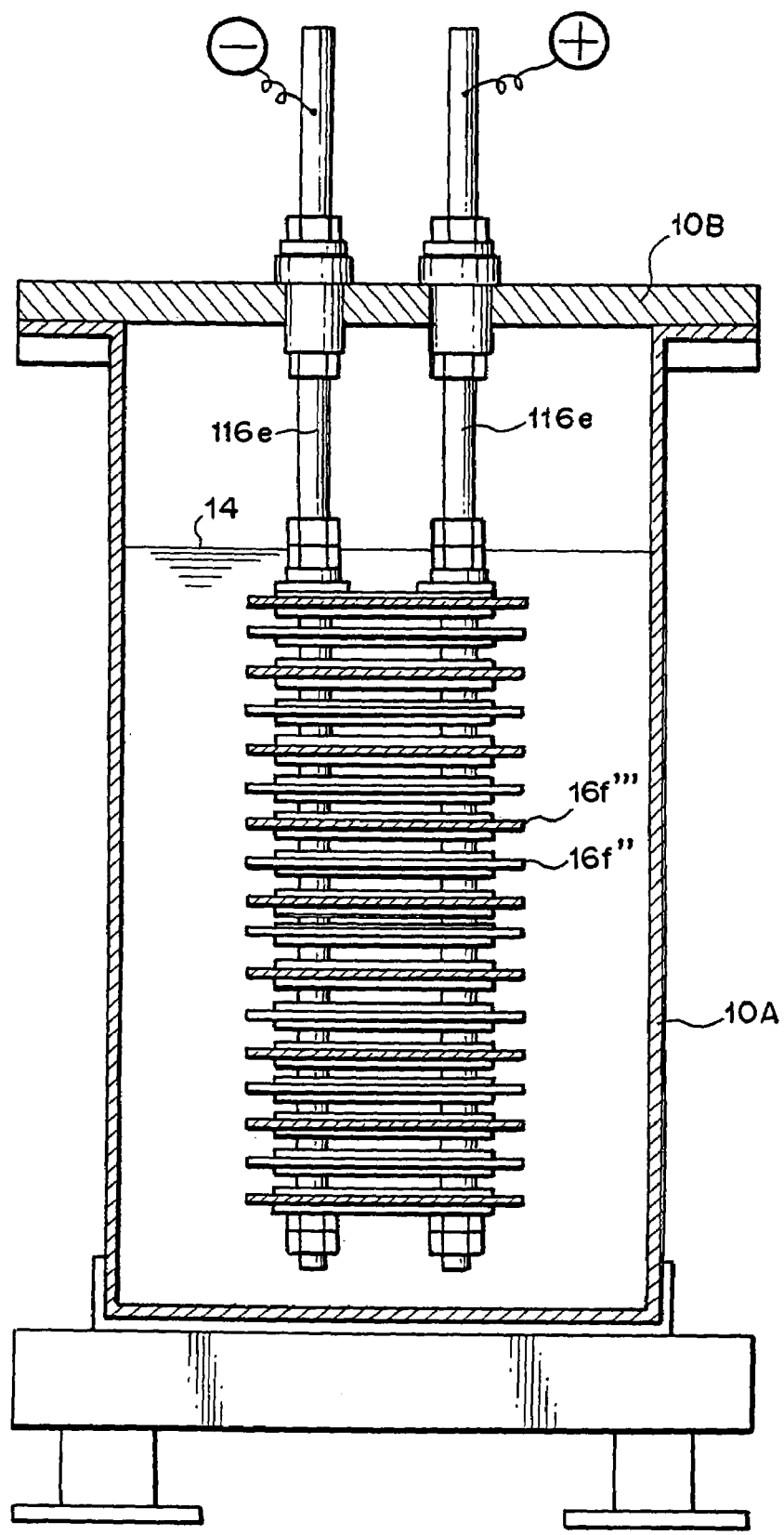
FIG. 50 is a cross sectional view of the apparatus shown in FIG. 49.

FIG. 49 through FIG. 50 are cross sectional views showing the structure of another embodiment of the hydrogen-oxygen gas generator implementing the hydrogen-oxygen gas generating method of the present invention. This embodiment utilizes the non-insulated type of vibration stirring means. A structural piece resembling the insulated vibration stirring means of FIG. 45 and FIG. 46 are utilized as the electrode pair made up of an anode member and a cathode member. In other words, an anode member 116f'" and a cathode member 116f'" are installed on two conductive rods 116e arranged in parallel and mutually facing upwards and downwards, the same as the first set of vibrating blades and the second set of vibrating blades of FIG. 45 and FIG. 46. The conductive rods 116e are connected to the positive electrode or negative electrode as needed.

Figure 51:
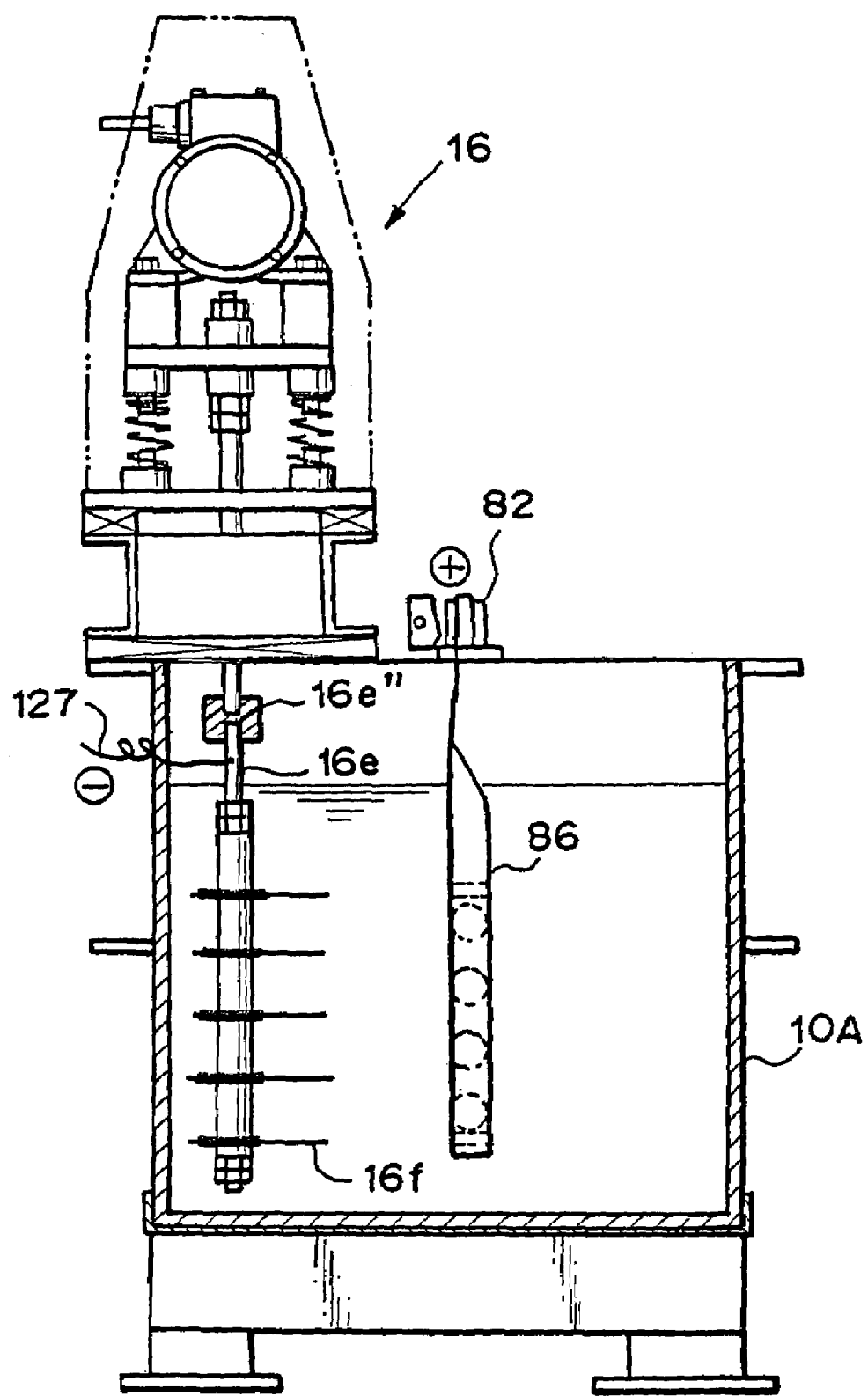
FIG. 51 is a cross sectional view showing a portion of the structure of the hydrogen-oxygen gas generator of the present invention.
Figure 52:
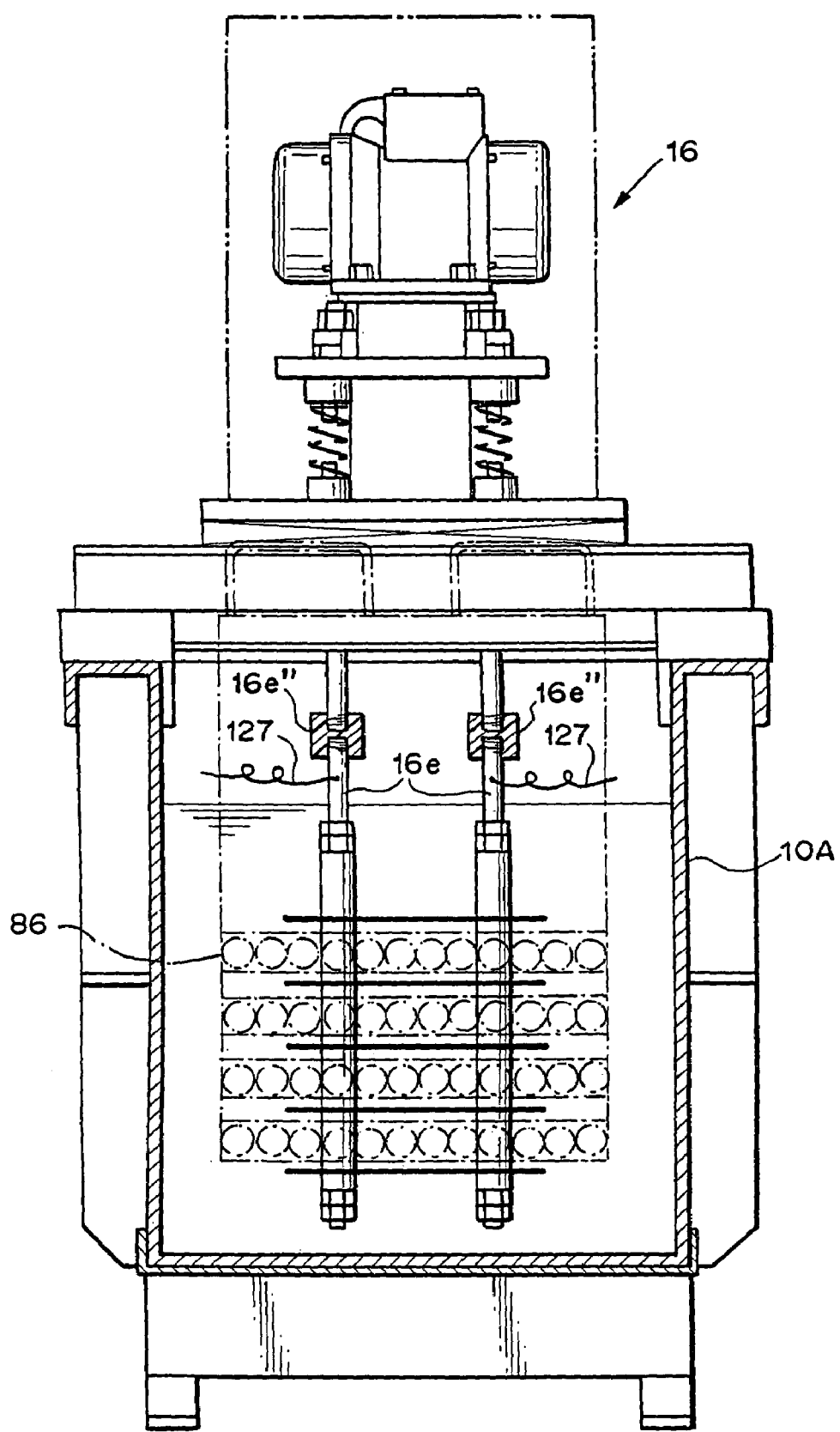
FIG. 52 is a cross sectional view of the apparatus shown in FIG. 51.
Figure 53:
FIG. 53 is a perspective view of the cylindrical, titanium case comprising the electrode member.

FIG. 51 through FIG. 52 are cross sectional views showing the structure of another embodiment of the hydrogen-oxygen gas generator implementing the hydrogen-oxygen gas generating method of the present invention. In this embodiment, the vibrating blade 16f of the insulated vibration means 16 is utilized as the cathode member, and multiple metal balls (nickel balls, copper balls, etc.) fill the inside of the cylindrical titanium web case as shown in FIG. 53 are used as the anode member 86. The case is maintained to face horizontally. The support means 82 of the anode member 84 is for example an anode bus-bar.

Figure 54:
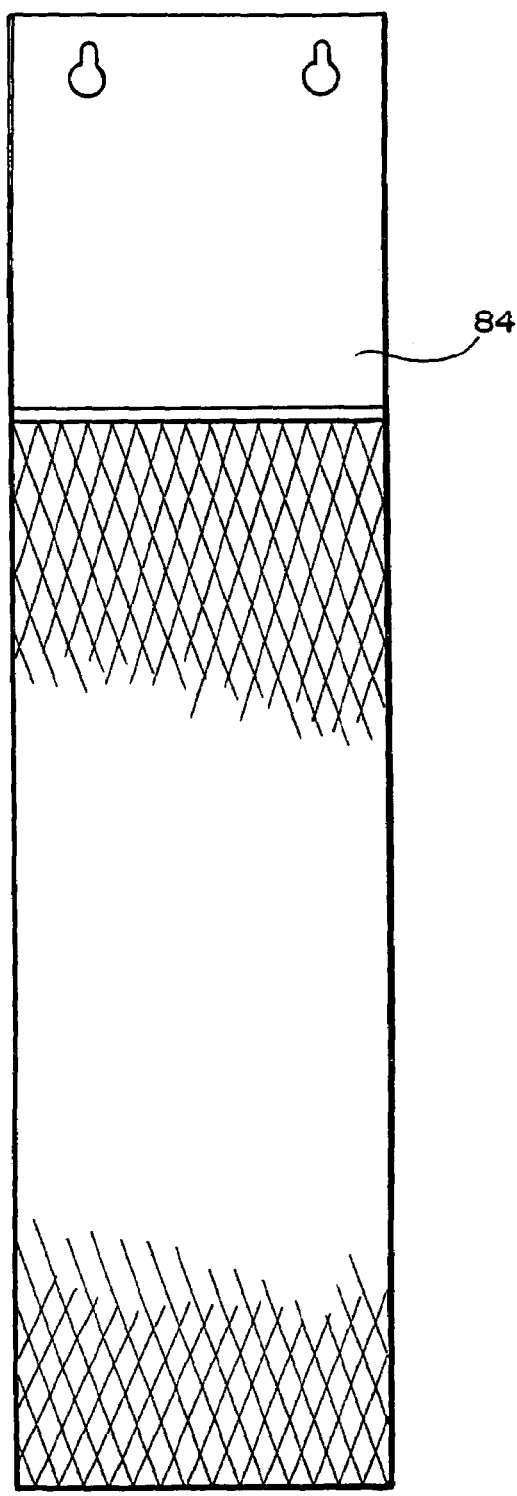
FIG. 54 is a frontal view of the electrode member.
Figure 55A:
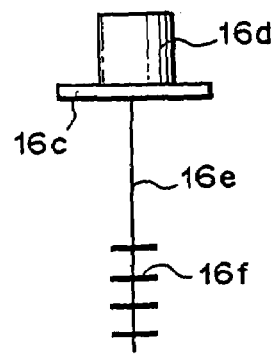
FIG. 55A through FIG. 55E are views illustrating the connection configuration and vibration stirring means and vibration generating means.
Figure 55B:
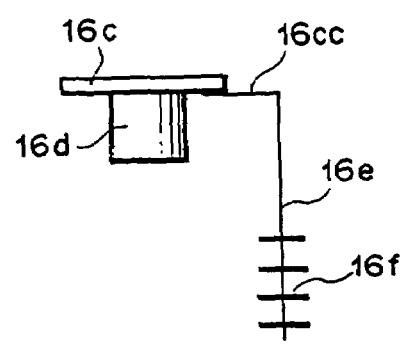
Figure 55C:
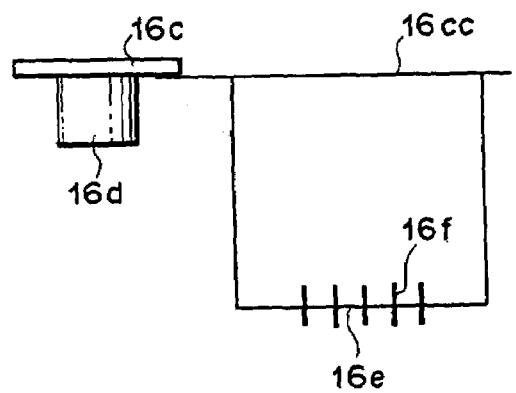
Figure 55D:
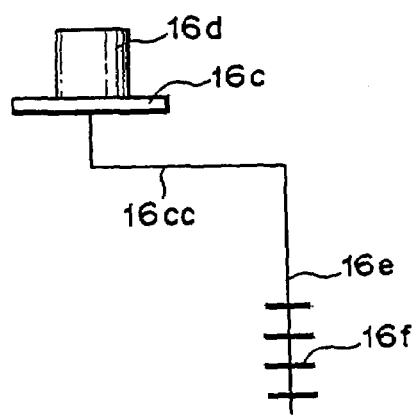
Figure 55E:
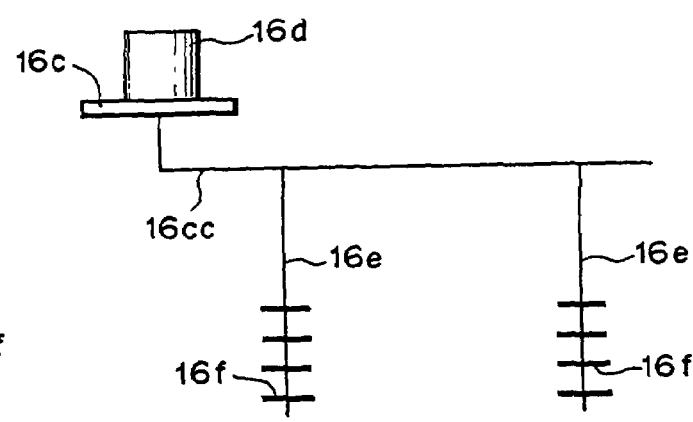

The electrode member 84 is for example a lath-web of titanium (preferably with platinum deposited on the surface). FIG. 54 is a frontal view of the lath web electrode support member. Two suspension holes are formed in the upper section for hanging. The area from the center section to the lower section is formed in a web shape. This web shape is immersed in the processing liquid.

FIG. 55A through FIG. 55E are drawings showing a sample connection with the vibration stirring means and the vibration generating means. In the example in FIG. 55A, the vibrating rod 16e of the direct vibration stirring member is connected to the vibration member 16c. In contrast, in the example in FIG. 55C through FIG. 55E, an intermediate member 16cc is installed on the vibration member 16c. The vibrating rod 16e is connected to this intermediate member 16cc.

Other than the fact that the insulated vibration stirring means is required to have the necessary insulation properties and the necessary conductivity, the structure of each section of the insulated vibration stirring means and the vibration stirring means as described in the above embodiments, are capable of being mutually applied to the other means.

The embodiment of the present invention is described next. The present invention however is not limited to these embodiments.

First Embodiment

Utilizing the device as described in FIG. 40 and FIG. 41, hydrogen-oxygen gas was generated and collected under the following conditions.

Electrolytic Cell:
Manufactured from (SUS304) stainless steel (2 mm thick inner surface of heat-resistant polyvinyl plastic) 740 mm×2100 mm×700 mm (H)

Lid Member:
Manufactured from (SUS304) stainless steel, insulated vibration stirring means employs the sealed structure of FIG. 4 and FIG. 5.

Insulated Vibration Stirring Means:
Vibration motor; Uses inverter manufactured by Murakami Seiki Seisakusho (Corp.) (product name), 400W×3-phase×200 V, 6 unit operating at 40 Hz.
Vibrating blades: Manufactured from titanium, 6 blades
Affixed with the polyethylene tape as shown in FIG. 34.
Interelectrode gap: A gap of 20 millimeters was set among adjacent electrode support blades of both of the insulated vibration stirring means.
Electrolytic fluid: KOH added as electrolytic material at 8 percent by weight to distilled water, temperature 55° C.,
Voltage applied across cathode and anode: 1.5 volts (direct current)
Electrical current density: 30 A/dm$^2$ A gas mixture of hydrogen gas and oxygen gas was generated with extremely high efficiency.

When the gas mixture obtained as described above was combusted, a fine flame with a length of approximately 150 millimeters was formed (using methyl alcohol as the solution within the flame-stopper tank. The tungsten rod vaporized into white smoke after approximately 2 seconds and a hole formed in the rod. The flame obtained was estimated as 3000 to 4000° C.

A feature of the present embodiment is that the gas mixture obtained is safely used without explosions (detonations). The flame can also be generated continuously for a long time. When the flame is stopped a noise is emitted due to a vacuum inside the nozzle of the combustion device.

Unlike conventional brown gas or the gas as described in Japanese utility model 2, the gas mixture obtained in the present embodiment yields a flame during welding that emits no pollution and was found to be more than adequate for industrial use. Compared with the gas mixture from conventional hydrogen tanks and oxygen tanks, the gas of this invention has a higher combustion temperature (flame temperature) and yields a superior quantity of energy. The invention is therefore ideal for use as a practical device.

Second Embodiment

Utilizing the device as described in FIG. 37 through FIG. 39, hydrogen-oxygen gas was generated and collected under the following conditions.

Electrolytic Cell:
Manufactured from (SUS304) stainless steel (inner surface of heat-resistant polyvinyl plastic sheath plastizol finishing)
400 mm×700 mm×550 mm(H)

Lid Member:
Manufactured from (SUS304) stainless steel, insulated vibration stirring means employs the sealed structure of FIG. 4 and FIG. 5.

Insulated Vibration Stirring Means:
Vibration motor; Uses inverter manufactured by Murakami Seiki Seisakusho (Corp.) (product name), 150 W×3-phase×200 V, 2-axis type, 2 units with inverter operated at 40 Hz.
Vibrating blades: Manufactured from titanium, 6 blades. Dimension $D_2$ of FIG. 33 is 55 millimeters.
Electrode support blades: Manufactured from titanium, 2 blades (Used only on highest section and lowest section.) Dimension $D_2$ of FIG. 33 is 150 millimeters.
Anode member & cathode member: Titanium lath mesh electrode of FIG. 54. (thickness 3.0 mm, lath thickness 1.5 mm, Mesh gap corner-to-corner length: 10 millimeters on one side, 20 millimeters on the other side)
Interelectrode gap: A gap of 20 millimeters was set among the titanium lath mesh electrodes (mutually parallel)
Small surface area of the electrode member was compensated by the surface area of the electrode support blades.
Electrolytic fluid: KOH added as electrolytic material at 25 percent by weight to distilled water, temperature 55° C.,
Voltage applied across cathode and anode: 1.4 volts (direct current)
Electrical current density: 20 A/dm$^2$ A gas mixture of hydrogen gas and oxygen gas was generated with extremely high efficiency.

When the gas mixture obtained as described above was combusted, a fine flame with a length of approximately 100 millimeters was formed. The tungsten rod vaporized into white smoke after and a hole formed in the rod. The flame obtained was estimated as 3000° C.

A feature of the present embodiment is that the gas mixture obtained is safely used without explosions (detonations). The flame can also be generated continuously for a long time. When the flame is stopped a noise is emitted due to a vacuum inside the nozzle of the combustion device.

In the present embodiment, a film partition was installed in the center of the device (midway between the anode member and cathode member). Hydrogen gas and oxygen gas could then be separately obtained when the gas was separately trapped on the anode member side and the cathode member side. Mixing these gases yielded a gas mixture that could be utilized the same as in the first embodiment. However, the gas first collected as a gas mixture without separation had more flame power (or heating power).

Third Embodiment

Utilizing the device as described in FIG. 24 through FIG. 26, hydrogen-oxygen gas was generated and collected under the following conditions.

Electrolytic Cell:
Manufactured from stainless steel (2 mm thick inner surface of heat-resistant polyvinyl plastic) 740 mm×2100 mm×700 mm (H)

Lid Member:
    Manufactured from (SUS304) stainless steel, insulated vibration stirring means employs the sealed structure of FIG. 4 and FIG. 5.

Insulated Vibration Stirring Means:
Vibration motor; Uses inverter manufactured by Murakami Seiki Seisakusho (Corp.) (product name), 400 W×3-phase×200 V, 6 units operating at 40 Hz.
Vibrating blades: Manufactured from titanium (usable for both anode member or cathode member), 6 blades
Anode member & cathode member: Cylindrical titanium mesh case of FIG. 53 with overlapping electrodes
Electrolytic fluid: KOH added as electrolytic material at 25 percent by weight to distilled water, temperature 55° C.,
Voltage applied across cathode and anode: 1.4 volts (direct current)
Electrical current density: 20 A/dm$^2$ A gas mixture of hydrogen gas and oxygen gas was generated with extremely high efficiency.

When the gas mixture obtained as described above was combusted, a fine flame the same as the second embodiment was formed. A steady flame of approximately 3000° C. was obtained.

In the present embodiment, a film partition was installed in the center of the device (midway between the anode member and cathode member). Hydrogen gas and oxygen gas could then be separately obtained when the gas was separately trapped on the anode member side and the cathode member side. Mixing these gases yielded a gas mixture the same as in the first embodiment that could be utilized safely for welding without the danger of explosion.

Fourth Embodiment

Utilizing the device as described in FIG. 30, hydrogen-oxygen gas was generated and collected under the following conditions.

Electrolytic Cell:
    Manufactured from stainless steel (plastic coating on inner surface) 700 mm×300 mm×350 mm (H)

Lid Member:
    Employs the sealed structure of FIG. 4 and FIG. 5 as described in FIGS. 16, 17, 18, 19B, and 20A Insulated Vibration Stirring Means:
Vibration motor; Uses inverter manufactured by Murakami Seiki Seisakusho (Corp.) (product name), 750 W×3-phase×200 V, operates at 40 Hz.
Vibrating blades: Manufactured from titanium (usable for both anode member or cathode member), 5 blades
    α in FIG. 8=15°
Vibrating rod: Manufactured from titanium alloy, diameter of 16 millimeters.
Vibrating blade support member: Manufactured from titanium
Elastic member sheet: (16p in FIG. 8) Teflon (commerical trademark) sheet
Electrolytic fluid: KOH added as electrolytic material at 25 percent by weight to distilled water, temperature 55° C.,
Voltage applied across cathode and anode: 2.7 volts (direct current)
Electrical current density: 20A/dm$^2$ A gas mixture of hydrogen gas and oxygen gas was generated with extremely high efficiency.

When the gas mixture obtained as described above was combusted in the combustion device of FIG. 22 (using methanol as the solution), a fine flame with color and about 100 millimeters was formed. A hole was formed in the titanium rod and a flame estimated at approximately 3000° C. usable for welding was obtained.

Fifth Embodiment

Utilizing the device as described in FIG. 49 and FIG. 50, (However with an insulated vibration stirring means) hydrogen-oxygen gas was generated and collected under the following conditions.

Electrolytic Cell:
    Manufactured from stainless steel (polyvinyl coating on inner surface) 320 mm×220 mm×440 mm (H)

Lid Member:
    Manufactured from stainless steel. Employs the sealed structure as described in FIG. 4 and FIG. 5.

Insulated Vibration Stirring Means:
Vibration motor; Uses inverter manufactured by Murakami Seiki Seisakusho (Corp.) (product name), 75 W×3-phase×200 V, inverter operates at 45 Hz.
Vibrating blades: Manufactured from stainless steel. 1 blade facing down, 3 blades facing upwards
    α in FIG. 8=+15°
Anode member: Platinum plate, 8 sheets
Cathode member: Stainless steel plates, 9 sheets
Distance from vibrating member: 25 millimeters
Electrolytic fluid: KOH added as electrolytic material at 20 percent by weight to distilled water, room temperature
Voltage applied across cathode and anode: 4 volts (direct current)
Electrical current: 100 amperes.

A gas mixture of hydrogen gas and oxygen gas was generated with extremely high efficiency.

When the gas mixture obtained as described above was combusted in the combustion device of FIG. 22 (using methanol as the solution in the sealed port), the titanium plate (400×20×0.5 mm) tantalum plate (150×3 mm diameter), tungsten plate (120×15×0.8 mm) were all melted or sublimated within several seconds. A stable flame with an estimated high temperature of approximately 7,000 to 8,000° C. was in this way obtained.

Sixth Embodiment

Utilizing the device as described in FIG. 47, hydrogen-oxygen gas was generated and collected under the following conditions.

Electrolytic Cell:
    Manufactured from stainless steel (polyvinyl coating on inner surface) 750 mm×500 mm×500 mm (H)

Lid Member:
    Manufactured from stainless steel. Employs the sealed structure of FIG. 4 and FIG. 5.

Insulated Vibration Stirring Means:
Vibration motor: Manufactured by Murakami Seiki Seisakusho (Corp.) (product name), 250 W×3-phase×200 V, inverter operates at 50 Hz.
Vibrating blades: Manufactured from stainless steel.
Anode member: Titanium plate,
Cathode member: Platinum plated titanium plate.
Electrolytic fluid: KOH added as electrolytic material at 15 percent by weight to distilled water, temperature 60° C.

Voltage applied across cathode and anode: 1.5 volts (direct current)

Electrical current density: 20 A/dm$^2$

A gas mixture of hydrogen gas and oxygen gas was generated with extremely high efficiency.

Metal welding was easily performed at approximately 3000° C. using gas mixture obtained in this embodiment. A stable flame with an estimated high temperature of approximately 7,000 to 8,000° C. was in this way obtained.

A compact and lightweight hydrogen-oxygen gas generator was achieved in this embodiment.

UTILIZATION IN INDUSTRY

The invention configured as described above renders the following effects.

(1) Using the generator with the vibration-stirring means or the insulated vibration-stirring means revealed the startling fact that electrolysis was satisfactory even with a gap of 20 millimeters or less between the anode member and the cathode member. In particular, a uniform high flow speed versus the anode member and cathode member contact with the electrolytic fluid was obtained so that sufficient ions could be supplied for satisfactory electrolysis. Consequently, the generation of hydrogen-oxygen gas was tremendously improved and allowed a high electrical current density. Electrolysis could also be performed at high speed.

(2) Along with reducing the gap between electrodes, the amount of hydrogen-oxygen gas generated by one gas generator was enormously improved.

(3) The potential drastic increase in gas generating efficiency means that a sufficient amount of gas can be generated and the device made more compact even if the number of anode members and cathode members are greatly reduced. In particular, using the vibrating blades and electrode support blade jointly as the anode member or cathode member allows making the device even smaller.

(4) Using the vibration-stirring means or the insulated vibration-stirring means ensures that bubbles do not occur in the oxygen-hydrogen gas generated in the electrolytic fluid, and that electrical resistance remains small. This can be attributed to the fact that the hydrogen and oxygen obtained in the present invention is extremely pure and is a state near to that of hydrogen and oxygen prior to the period of generating $H_2$ and $O_2$.

(5) The present invention allows making a flexible response to large power demands by utilizing inexpensive electrical power at night and generating and storing oxygen-hydrogen gas for use when needed. Utilizing a direct current pulse waveform power supply for electrolysis allows even further savings in electrical power.

(6) The device of the present invention allows utilizing cassette fuel tanks as a safe, non-hazardous fuel supply source for cooking stoves.

(7) Using the gas obtained from the present invention provides an air conditioning apparatus superior to conventional accumulator (heat storage) air conditioning.

(8) Using the gas generated by the present invention allows combusting small, intermediate and large municipal trash and industrial wastes in an incinerator. Trash can in this way be incinerated without pollution in a highly economical method. Trash incinerators using the gas emitted by the device of the present invention, can combust material at high temperatures at the point in time that combustion starts. Therefore, no dioxins are emitted even if halogen waste products such as chlorine are incinerated.

(9) The device of the present invention can be utilized to supply fuel to boilers and gas turbines, etc.

(10) Only a moisture component is emitted when combusting the gas generated by the device of the present invention, so the invention is also effective as a means as a safe, clean, and pollution-free gas generator device.

(11) The present invention can serve effectively as a fuel production apparatus for ships.

(12) The required amount of gas can be generated in the required quantities when needed so actual gas tanks are almost unnecessary and the danger involved in storing large quantities of gas can be avoided.

(13) When using the gas generated by the device of the present invention for welding, melting or soldering, the amount of oxygen supplied can be reduced 25 to 50 percent compared to when using acetylene gas. The gas generated by the device of the invention further contains no carbon elements so that there is no blackening of the weld location, melting points or soldering locations.

(14) Utilizing the gas generated by the device of the present invention for tasks such as welding, melting or soldering, achieves a 60 to 70 percent reduction in costs compared to the case when using acetylene gas or halogen gas.

What is claimed is:

1. A hydrogen-oxygen gas generator comprising:

an electrolytic cell (A);

an electrolysis means (B) containing an electrode pair made up of an anode member and a cathode member installed to contact an electrolytic fluid stored within the electrolytic cell and, a power supply to apply a voltage across the anode and the cathode;

a vibration-stirring means (C) for stirring and agitating the electrolytic fluid stored in the electrolytic cell and comprising at least one vibration generating means and, a vibration stirring member comprised of at least one vibrating rod linked to the vibration generating means for vibrating within the electrolytic cell and at least one vibrating blade attached to the vibrating rod; or an insulated vibration stirring means (C') for stirring and agitating the electrolytic fluid stored in the electrolytic cell and comprising at least one vibration generating means and an insulated vibration stirring member comprised of at least one vibrating rod linked to the vibration generating means for vibrating within the electrolytic cell, at least one vibrating blade attached to the vibrating rod and an electrically insulated area formed on a connecting section linking the vibration generating means with the vibrating rod or formed on a section of the vibrating rod nearer to the connecting section than a section of the vibrating rod where the vibrating blade is attached to the vibrating rod; and a gas trapping means (D) for collecting separately or as a mixture, the hydrogen gas and oxygen gas generated by electrolysis of the electrolytic fluid stored within the electrolytic cell by the electrolysis means;

wherein the vibration stirring member of the vibration-stirring means (C) or the insulated vibration stirring member of the insulated vibration-stirring means (C') are installed so as to face at least one surface of the node member and cathode member of the electrolysis means (B), and wherein the gap between at least one of the cathode member or anode member of the electrolysis means (B) and the vibration stirring member of the vibration-stirring means (C) or the insulated vibration stirring member of the insulated vibrating-stirring means (C') is about 20 to 400 millimeters.

2. A hydrogen-oxygen gas generator according to claim 1, wherein the insulated vibration stirring member of the insulated vibration-stirring means (C') installed to face the surface of the anode member, is connected to the positive electrode of the power supply of electrolysis means (B).

3. A hydrogen-oxygen gas generator according to claim 1, wherein the insulated vibration stirring member of the insulated vibration-stirring means (C') installed to face the surface of the cathode member, is connected to the negative electrode of the power supply of electrolysis means (B).

4. A hydrogen-oxygen gas generator according to claim 1, wherein an electrically conductive line is connected to the vibrating rod on the side of the electrically insulated area where the vibrating blade is installed on the vibrating rod of the insulated vibration stirring member of the insulated vibration-stirring means (C'), and the electrically conductive line is connected to the power supply of electrolysis means (B).

5. A hydrogen-oxygen gas generator according to claim 4, wherein the anode member or the cathode member is electrically connected to the electrically conductive line by way of the vibrating rod and installed on the vibrating rod on the side of the electrically insulated area where the vibrating blade is installed on the vibrating rod of the insulated vibration stirring member of the insulated vibration-stirring means (C').

6. A hydrogen-oxygen gas generator according to claim 5, wherein the at least one vibrating blade functions as the anode member or as the cathode member.

7. A hydrogen-oxygen gas generator according to claim 4, wherein an electrode support blade electrically connected to the electrically conductive line by way of the vibrating rod is installed on the vibrating rod on the side of the electrically insulated area where the vibrating blade is installed on the vibrating rod of the insulated vibration stirring member of the insulated vibration-stirring means (C').

8. A hydrogen-oxygen gas generator according to claim 7, wherein the electrode support blade is installed on the vibrating rod so as to position alternately with the vibrating blade.

9. A hydrogen-oxygen gas generator according to claim 7, wherein the surface area of the electrode support blade is larger than the surface area of the vibrating blade, and the tip of the electrode support blade protrudes farther than the tip of the vibrating blade.

10. A hydrogen-oxygen gas generator according to claim 1, wherein the power supply of electrolysis means (B) is a direct current pulse power supply.

11. A hydrogen-oxygen gas generator according to claim 1, wherein at least one of the anode member and cathode member of the electrolysis means (B) is porous.

12. A hydrogen-oxygen gas generator according to claim 1, wherein the vibration generating means of vibration stirring means (C) or the vibration generating means of the insulated vibration-stirring means (C') contains a vibration motor, and the vibration stirring means (C) or the insulated vibration-stirring means (C') contains an inverter to regulate the motor to rotate at a frequency of 10 to 500 hertz.

13. A hydrogen-oxygen gas generator according to claim 1, wherein the gas trapping means (D) is comprised of a lid member installed on the electrolytic cell, and a hydrogen-oxygen gas extraction tube connected to the hydrogen-oxygen gas extraction outlet formed on the lid member.

14. A hydrogen-oxygen gas generator according to claim 13, wherein the vibrating rod extends through the lid member, and a sealing means is provided between the lid member and the vibrating rod so as to allow vibration of the vibrating rod and to prevent the passage of hydrogen-oxygen gas.

15. A hydrogen-oxygen gas generator according to claim 1, wherein the anode member and cathode member are installed alternately with each other.

16. A hydrogen-oxygen gas generator comprising:
an electrolytic cell (A);
an electrolysis means (B) formed from a pair of electrodes made up of an anode member and a cathode member mutually installed in contact with an electrolytic fluid stored in the electrolytic cell, and a power supply for applying a voltage across the anode member and the cathode member;
an insulated vibration-stirring means (C') for vibration stirring of the electrolytic fluid stored in the electrolytic cell and containing at least one vibration generating means and an insulated vibration stirring member comprised of at least one vibrating rod linked to the vibration generating means for vibrating within the electrolytic cell, at least one vibrating blade attached to the vibrating rod and an electrically insulated area installed on a link section linking the vibrating rod with the vibration generating means or installed on a section of the vibrating rod nearer to the link section than a section of the vibrating rod where the vibrating blade is installed on the vibrating rod; and
a gas trapping means (D) for collecting separately or as a mixture the hydrogen gas and the oxygen gas generated by electrolyzing the electrolytic fluid stored within the electrolytic cell
wherein, the insulated vibration stirring member of the insulated vibration-stirring means (C') contains at least one first insulated vibration stirring member and at least one second insulated vibration stirring member, and at least a portion of the first insulated vibration stirring member on the side of the electrically insulated area where the vibrating blade is installed functions as the anode of the electrolysis means (B), and at least a portion of the second insulated vibration stirring member on the side of the electrically insulated area where the vibrating blade is installed functions the cathode of the electrolysis means (B).

17. A hydrogen-oxygen gas generator according to claim 16, wherein the gap between the anode member and the cathode member is 5 to 400 millimeters.

18. A hydrogen-oxygen gas generator according to claim 16, wherein an electrically conductive line is connected to the vibrating rod on the side of the electrically insulated area where the vibrating blade is installed on the vibrating rod of the insulated vibration stirring member of insulated vibration-stirring means (C'), and the electrically conductive line is connected to the power supply of the electrolysis means (B).

19. A hydrogen-oxygen gas generator according to claim 18, wherein the anode member or the cathode member is electrically connected to the electrically conductive line via the vibrating rod and installed on the vibrating rod on the side of the electrically insulated area where the vibrating blade is installed on the vibrating rod of the insulated vibration stirring member of the insulated vibration-stirring means (C').

20. A hydrogen-oxygen gas generator according to claim 19, wherein the at least one vibrating blade functions as the anode member or as the cathode member.

21. A hydrogen-oxygen gas generator according to claim 18, wherein an electrode support blade electrically connected to the electrically conductive line by way of the vibrating rod is installed on the vibrating rod on the side of the electrically insulated area where the vibrating rod is installed on the vibrating rod of the insulated vibration stirring member of the insulated vibration-stirring means (C').

22. A hydrogen-oxygen gas generator according to claim 21, wherein the electrode support blade is installed on the vibrating rod so as to position alternately with the vibrating blade.

23. A hydrogen-oxygen gas generator according to claim 21, wherein the surface area of the electrode support blade is larger than the surface area of the vibrating blade, and the tip of the electrode support blade protrudes farther than the tip of the vibrating blade.

24. A hydrogen-oxygen gas generator according to claim 16, wherein the power supply of the electrolysis means (B) is a direct current pulse power supply.

25. A hydrogen-oxygen gas generator according to claim 16, wherein at least one of the anode member and cathode member of the electrolysis means (B) is porous.

26. A hydrogen-oxygen gas generator according to claim 16, wherein the vibration generating means of the insulated vibration-stirring means (C') contains a vibration motor, and the insulated vibration-stirring means (C') contains an inverter to regulate the motor to rotate at a frequency of 10 to 500 hertz.

27. A hydrogen-oxygen gas generator according to claim 16, wherein the gas trapping means (D) is comprised of a lid member installed on the electrolytic cell, and a hydrogen-oxygen gas extraction tube connected to a hydrogen-oxygen gas extraction outlet formed on the lid member.

28. A hydrogen-oxygen gas generator according to claim 27, wherein the vibrating rod extends through the lid member, and a sealing means is provided between the lid member and the vibrating rod so as to allow vibration of the vibrating rod and to prevent the passage of hydrogen-oxygen gas.

29. A hydrogen-oxygen gas generator according to claim 16, wherein the anode member and cathode member are installed alternately with each other.

30. A hydrogen-oxygen gas generator comprising:
an electrolytic cell (A);
an electrolysis means (B) formed from a pair of electrodes made up of an anode member and a cathode member mutually installed in contact with an electrolytic fluid stored in the electrolytic cell, and a power supply for applying a voltage across the anode member and the cathode member;
an insulated vibration-stirring means (C') for vibration stirring of the electrolytic fluid stored in the electrolytic cell and containing at least one vibration generating means and an insulated vibration stirring member comprised of at least one vibrating rod linked to the vibration generating means for vibrating within the electrolytic cell, at least one vibrating blade attached to the vibrating rod and an electrically insulated area installed on a link section linking the vibrating rod with the vibration generating means or installed on a section of the vibrating rod nearer to the link section than a section of the vibrating rod where the vibrating blade is installed on the vibrating rod;
and a gas trapping means (D) for collecting separately or as a mixture the hydrogen gas and the oxygen gas generated by electrolyzing the electrolytic fluid stored within the electrolytic cell;
wherein, an electrically conductive line is connected to the vibrating rod on the side of the electrically insulated area where the vibrating blade is installed on the vibrating rod of the insulated vibration stirring member of the insulated vibration-stirring means (C'), the vibrating blade is attached to a plurality of the vibrating rod, each of the cathode member and anode member of the electrolysis means (B) is attached to the plurality of vibrating rod, the anode member is electrically connected to the power supply by way of at least one of the plurality of vibrating rod and the electrically conductive line connected thereto, and the cathode member is electrically connected to the power supply by way of at least the other one of the plurality of vibrating rod and the electrically conductive line connected thereto.

31. A hydrogen-oxygen gas generator according to claim 30, wherein the vibrating blade electrically connected to the power supply by way of both the electrically conductive line and the vibrating rod functions as the cathode member or as the anode member.

32. A hydrogen-oxygen gas generator according to claim 30, wherein an electrode support blade electrically connected to the power supply by way of both the electrically conductive line and the vibrating rod is installed on the vibrating rod on the side of the electrically insulated area where the vibrating blade is installed on the vibrating rod, and the electrode support blade functions as the cathode member or as the anode member.

33. A hydrogen-oxygen gas generator according to claim 32, wherein the electrode support blade is installed on the vibrating rod so as to position alternately with the vibrating blade.

34. A hydrogen-oxygen gas generator according to claim 32, wherein the surface area of the electrode support blade is larger than the surface area of the vibrating blade, and the tip of the electrode support blade protrudes farther than the tip of the vibrating blade.

35. A hydrogen-oxygen gas generator according to claim 30, wherein the vibrating blade electrically connected to the power supply by way of both at least one of the plurality of vibrating rod and the electrically conductive line connected thereto functions as the anode member, and/or the vibrating blade electrically connected to the power supply by way of both at least the other one of the plurality of vibrating rod and the electrically conductive line connected thereto functions as the cathode member.

36. A hydrogen-oxygen gas generator according to claim 30, wherein an electrode support blade is installed on the plurality of vibrating rod on the side of the electrically insulated area where the vibrating blade is installed on the vibrating rod, and the electrode support blade connected electrically to the power supply by way of both at least one of the plurality of vibrating rod and the electrically conductive line connected thereto functions as an anode member, and/or the electrode support blade electrically connected to the power supply by way of both at least the other one of the plurality of vibrating rod and the electrically conductive line connected thereto functions as the cathode member.

37. A hydrogen-oxygen gas generator according to claim 30, wherein the gap between the anode member and the cathode member is 5 to 400 millimeters.

38. A hydrogen-oxygen gas generator according to claim 30, wherein the power supply of the electrolysis means (B) is a direct current pulse power supply.

39. A hydrogen-oxygen gas generator according to claim 30, wherein at least one of the anode member and cathode member of the electrolysis means (B) is porous.

40. A hydrogen-oxygen gas generator according to claim 30, wherein the vibration generating means of the insulated vibration-stirring means (C') contains a vibration motor, and the insulated vibration-stirring means (C') contains an inverter to regulate the motor to rotate at a frequency of 10 to 500 hertz.

41. A hydrogen-oxygen gas generator according to claim 30, wherein the gas trapping means (D) is comprised of a lid member installed on the electrolytic cell, and a hydrogen-oxygen gas extraction tube connected to a hydrogen-oxygen gas extraction outlet formed on the lid member.

42. A hydrogen-oxygen gas generator according to claim 41, wherein the vibrating rod extends through the lid member, and a sealing means is provided between the lid member and the vibrating rod so as to allow vibration of the vibrating rod and to prevent the passage of hydrogen-oxygen gas.

43. A hydrogen-oxygen gas generating method comprising:
(i) utilizing a hydrogen-oxygen gas generator comprising an electrolytic cell (A);
an electrolysis means (B) containing an electrode pair made up of an anode member and a cathode member installed to contact an electrolytic fluid stored within the electrolytic cell and, a power supply to apply a voltage across the anode and the cathode;
a vibration-stirring means (C) for stirring and agitating the electrolytic fluid stored in the electrolytic cell and comprising at least one vibration generating means and, a vibration stirring member comprised of at least one vibrating rod linked to the vibration generating means for vibrating within the electrolytic cell and at least one vibrating blade attached to a vibrating rod; or an insulated vibration stirring means (C') for stirring and agitating the electrolytic fluid stored in the electrolytic cell and comprising at least one vibration generating means and, an insulated vibration stirring member comprised of at least one vibrating rod linked to the vibration generating means for vibrating within the electrolytic cell, at least one vibrating blade attached to the vibrating rod and an electrically insulated area formed on a connecting section linking the vibration generating means with the vibrating rod or formed on a section of the vibrating rod nearer to the connecting section than a section of the vibrating rod where the vibrating blade is attached to the vibrating rod; and
a gas trapping means (D) for collecting separately or as a mixture, the hydrogen gas and oxygen gas generated by electrolysis of the electrolytic fluid stored within the electrolytic cell by the electrolysis means;
wherein the vibration stirring member of the vibration-stirring means (C) or the insulated vibration stirring member of the insulated vibration-stirring means (C') are installed so as to face at least one surface of the node member and cathode member of the electrolysis means (B);
(ii) utilizing as the electrolytic fluid one containing 5 to 30 percent by weight of electrolytic material and having pH 7 through 10; and
(c) performing electrolysis of the electrolytic fluid in the hydrogen-oxygen gas generator at a fluid temperature of 20 to 100 degrees centigrade and at an electrical current density of 7 A/dm$^2$ to 40 A/dm$^2$.

44. A hydrogen-oxygen gas generating method according to claim 43, wherein the electrolytic material is a water-soluble alkali metal hydroxide or an alkaline earth metal hydroxide.

45. A hydrogen-oxygen gas generating method according to claim 43, wherein the power supply is a direct current pulse power supply.

46. A hydrogen-oxygen gas generating method according to claim 43, wherein the vibrating blade is made to vibrate at a vibration width of 0.1 to 30 millimeters and a frequency of 200 to 12,000 times per minute.

47. A hydrogen-oxygen gas generating method comprising:
(i) utilizing a hydrogen-oxygen gas generator comprising an electrolytic cell (A);
an electrolysis means (B) formed from a pair of electrodes made up of an anode member and a cathode member mutually installed in contact with an electrolytic fluid stored in the electrolytic cell, and a power supply for applying a voltage across the anode member and the cathode member;
an insulated vibration-stirring means (C') for vibration stirring of the electrolytic fluid stored in the electrolytic cell and containing at least one vibration generating means and, an insulated vibration stirring member comprised of at least one vibrating rod linked to the vibration generating means for vibrating within the electrolytic cell, at least one vibrating blade attached to the vibrating rod and an electrically insulated area installed on a link section linking the vibrating rod with the vibration generating means or installed on a section of the vibrating rod nearer to the link section than a section of the vibrating rod where the vibrating blade is installed on the vibrating rod; and
a gas trapping means (D) for collecting separately or as a mixture the hydrogen gas and the oxygen gas generated by electrolyzing the electrolytic fluid stored within the electrolytic cell
wherein, the insulated vibration stirring member of the insulated vibration-stirring means (C') contains at least one first insulated vibration stirring member and at least one second insulated vibration stirring member, and at least a portion of the first insulated vibration stirring member on the side of the electrically insulated area where the vibrating blade is installed functions as the anode of the electrolysis means (B), and at least a portion of the second insulated vibration stirring member on the side of the electrically insulated area where the vibrating blade is installed functions as the cathode of the electrolysis means (B);
(ii) utilizing as the electrolytic fluid one containing 5 to 30 percent by weight of electrolytic material and having pH 7 through 10; and
(c) performing electrolysis of the electrolytic fluid in the hydrogen-oxygen gas generator at a fluid temperature of 20 to 100 degrees centigrade and at an electrical current density of 7 A/dm$^2$ to 40 A/dm$^2$.

48. A hydrogen-oxygen gas generating method according to claim 47, wherein the electrolytic material is a water-soluble alkali metal hydroxide or an alkaline earth metal hydroxide.

49. A hydrogen-oxygen gas generating method according to claim 47, wherein the power supply is a direct current pulse power supply.

50. A hydrogen-oxygen gas generating method according to claim 47, wherein the vibrating blade is made to vibrate at a vibration width of 0.1 to 30 millimeters and a frequency of 200 to 12,000 times per minute.

51. A hydrogen-oxygen gas generating method comprising:
(i) utilizing a hydrogen-oxygen gas generator comprising an electrolytic cell (A);

an electrolysis means (B) formed from a pair of electrodes made up of an anode member and a cathode member mutually installed in contact with an electrolytic fluid stored in the electrolytic cell, and a power supply for applying a voltage across the anode member and the cathode member;

an insulated vibration-stirring means (C') for vibration stirring of the electrolytic fluid stored in the electrolytic cell and containing at least one vibration generating means and, an insulated vibration stirring member comprised of at least one vibrating rod linked to the vibration generating means for vibrating within the electrolytic cell, at least one vibrating blade attached to the vibrating rod and an electrically insulated area installed on a link section linking the vibrating rod with the vibration generating means or installed on a section of the vibrating rod nearer to the link section than a section of the vibrating rod where the vibrating blade is installed on the vibrating rod;

and a gas trapping means (D) for collecting separately or as a mixture the hydrogen gas and the oxygen gas generated by electrolyzing the electrolytic fluid stored within the electrolytic cell;

wherein, an electrically conductive line is connected to the vibrating rod on the side of the electrically insulated area where the vibrating blade is installed on the vibrating rod of the insulated vibration stirring member of the insulated vibration-stirring means (C'), the vibrating blade is attached to a plurality of the vibrating rod, each of the cathode member and anode member of the electrolysis means (B) is attached to the plurality of vibrating rod, the anode member is electrically connected to the power supply by way of at least one of the plurality of vibrating rod and the electrically conductive line connected thereto, and the cathode member is electrically connected to the power supply by way of at least the other one of the plurality of vibrating rod and the electrically conductive line connected thereto;

(ii) utilizing as the electrolytic fluid one containing 5 to 30 percent by weight of electrolytic material and having pH 7 through 10; and (c) performing electrolysis of the electrolytic fluid in the hydrogen-oxygen gas generator at a fluid temperature of 20 to 100 degrees centigrade and at an electrical current density of 7 $A/dm^2$ to 40 $A/dm^2$.

52. A hydrogen-oxygen gas generating method according to claim 51, wherein the electrolytic material is a water-soluble alkali metal hydroxide or an alkaline earth metal hydroxide.

53. A hydrogen-oxygen gas generating method according to claim 51, wherein the power supply is a direct current pulse power supply.

54. A hydrogen-oxygen gas generating method according to claim 51, wherein the vibrating blade is made to vibrate at a vibration width of 0.1 to 30 millimeters and a frequency of 200 to 12,000 times per minute.

* * * * *